(12) United States Patent
Silvis et al.

(10) Patent No.: US 8,981,013 B2
(45) Date of Patent: Mar. 17, 2015

(54) FUNCTIONALIZED OLEFIN POLYMERS, COMPOSITIONS AND ARTICLES PREPARED THEREFROM, AND METHODS FOR MAKING THE SAME

(75) Inventors: H. Craig Silvis, Midland, MI (US); Stephen F. Hahn, Midland, MI (US); David F. Pawlowski, Midland, MI (US); Patricia Ansems, Lake Jackson, TX (US); Laura K. Mergenhagen, Lake Jackson, TX (US); Hamed Lakrout, Midland, MI (US); Ashish Batra, Lake Jackson, TX (US); Laura Bauerle Weaver, Lake Jackson, TX (US); Lawrence J. Effler, Rosharon, TX (US); Katja Oswald, Zurich (CH)

(73) Assignee: Dow Global Technologies LLC, Midland, MI (US)

( * ) Notice: Subject to any disclaimer, the term of this patent is extended or adjusted under 35 U.S.C. 154(b) by 819 days.

(21) Appl. No.: 12/520,143

(22) PCT Filed: Dec. 17, 2007

(86) PCT No.: PCT/US2007/087798
§ 371 (c)(1),
(2), (4) Date: Jun. 19, 2009

(87) PCT Pub. No.: WO2008/079784
PCT Pub. Date: Jul. 3, 2008

(65) Prior Publication Data
US 2010/0143651 A1      Jun. 10, 2010

Related U.S. Application Data

(60) Provisional application No. 60/955,450, filed on Aug. 13, 2007, provisional application No. 60/952,356, filed on Jul. 27, 2007, provisional application No. 60/952,277, filed on Jul. 27, 2007, provisional application No. 60/876,387, filed on Dec. 21, 2006.

(51) Int. Cl.
*C08L 51/06* (2006.01)
*C08F 255/00* (2006.01)
(Continued)

(52) U.S. Cl.
CPC ............... *C08F 255/00* (2013.01); *B32B 27/08* (2013.01); *B32B 27/32* (2013.01); *C08F 8/32* (2013.01);
(Continued)

(58) Field of Classification Search
CPC ............ C08F 8/32; C08F 8/46; C08F 255/02; C08L 23/36; C08L 51/06
USPC ............................ 525/333.7, 285, 259, 327.6
See application file for complete search history.

(56) References Cited

U.S. PATENT DOCUMENTS 3,471,460 A    10/1969   Rees
3,862,265 A    1/1975    Steinkamp et al.
(Continued)

FOREIGN PATENT DOCUMENTS

EP    0036949 A2    7/1985
EP    347794 A1     12/1989
(Continued)

OTHER PUBLICATIONS

Ciolino et al, Journal of Polymer Science Part A: Polymer Chemistry, vol. 40, pp. 3950-3958, 2002.
(Continued)

*Primary Examiner* — Mark Kaucher

(57) ABSTRACT

The invention provides polyolefin blend compositions of polar and/or non-polar polymers, with at least one functionalized polyolefin polymer selected from the group consisting of: amine functionalized, hydroxyl functionalized, imide functionalized, anhydride functionalized, or carboxylic acid functionalized polyolefin polymers. The invention also provides methods for making the functionalized polyolefin polymer. The invention also provides for materials and articles containing at least one component prepared from such compositions.

7 Claims, 19 Drawing Sheets

ENGAGE
(no functionality)

ENGAGE-g-MAH

ENGAGE-g-hydroxyl

ENGAGE-g-amine

(51) Int. Cl.
*B32B 27/08* (2006.01)
*B32B 27/32* (2006.01)
*C08F 8/32* (2006.01)
*C08F 255/02* (2006.01)
*C08F 287/00* (2006.01)
*C08L 23/08* (2006.01)
*C08L 51/00* (2006.01)

(52) U.S. Cl.
CPC ............. *C08F 255/02* (2013.01); *C08F 287/00* (2013.01); *C08L 23/0815* (2013.01); *C08L 51/006* (2013.01); *C08L 51/06* (2013.01)
USPC ...... 525/333.7; 525/285; 525/259; 525/327.6

(56) References Cited

U.S. PATENT DOCUMENTS

| | | |
|---|---|---|
| 4,137,185 A | 1/1979 | Gardiner et al. |
| 4,198,327 A | 4/1980 | Matsumoto et al. |
| 4,374,956 A | 2/1983 | Coran et al. |
| 4,397,916 A | 8/1983 | Nagano |
| 4,612,335 A | 9/1986 | Cuscurida et al. |
| 4,883,837 A | 11/1989 | Zabrocki |
| 5,272,236 A * | 12/1993 | Lai et al. ................... 526/348.5 |
| 5,424,367 A | 6/1995 | Auda et al. |
| 5,552,096 A | 9/1996 | Auda et al. |
| 5,578,680 A | 11/1996 | Ando et al. |
| 5,599,881 A | 2/1997 | Xie |
| 5,623,019 A | 4/1997 | Wiggins et al. |
| 5,651,927 A | 7/1997 | Auda et al. |
| 5,705,565 A | 1/1998 | Hughes et al. |
| 5,744,429 A | 4/1998 | Chung et al. |
| 5,886,194 A | 3/1999 | Ulmer et al. |
| 5,902,854 A | 5/1999 | Kelley et al. |
| 6,054,533 A | 4/2000 | Farkas et al. |
| 6,251,982 B1 | 6/2001 | Masse et al. |
| 6,414,081 B1 | 7/2002 | Ouhadi |
| 6,469,099 B1 * | 10/2002 | Farah et al. ................... 525/66 |
| 6,680,361 B1 | 1/2004 | Cady et al. |
| 6,919,407 B2 | 7/2005 | Tau et al. |
| 2004/0106744 A1 | 6/2004 | Chino et al. |
| 2004/0116569 A1 * | 6/2004 | Ward et al. ................... 524/366 |
| 2005/0158561 A1 | 7/2005 | Wang et al. |
| 2006/0025316 A1 | 2/2006 | Covitch et al. |
| 2006/0199907 A1 | 9/2006 | Chang et al. |
| 2010/0093942 A1 * | 4/2010 | Silvis et al. ................... 525/240 |

FOREIGN PATENT DOCUMENTS

| | | |
|---|---|---|
| EP | 0558048 A1 | 9/1993 |
| EP | 0614940 A2 | 9/1994 |
| EP | 0634424 A1 | 1/1995 |
| EP | 0657502 A1 | 6/1995 |
| EP | 0612800 A1 | 10/1997 |
| EP | 0734419 A1 | 2/2002 |
| EP | 1672046 A1 | 6/2006 |
| GB | 2309973 A | 9/1993 |
| WO | WO-93/02113 A1 | 2/1993 |
| WO | WO-96/27622 A1 | 9/1996 |
| WO | WO-99/02603 A1 | 1/1999 |
| WO | WO-00/63293 A1 | 10/2000 |
| WO | WO-01/29095 A1 | 4/2001 |
| WO | WO-03/008680 A1 | 1/2003 |
| WO | WO-03/008681 A1 | 1/2003 |
| WO | WO-2006/039774 A1 | 4/2006 |
| WO | 2006/102019 A2 | 9/2006 |
| WO | WO-2006/048328 A1 | 12/2006 |
| WO | WO-2006/133848 A1 | 12/2006 |

OTHER PUBLICATIONS

Lu et al, Journal of Polymer Science Part A: Polymer Chemistry, 2005, pp. 4217-4232, vol. 43, No. 18.
Lu et al, Journal of Polymer Science Part A: Polymer Chemistry, vol. 40, pp. 2310-2328, 2002.
Lu, et al, Macromolecular Symposia, Wiley VCH Verlag, Weinheim, DE, 2003, pp. 221-232,. No. 198.
PCT/ US2007/087798, International Search Report dated Oct. 2, 2008.
PCT/ US2007/087798, International Preliminary Report on Patentability dated Jun. 24, 2009.
PCT/ US2007/087798, Written Opinion of the International Searching Authority dated Jun. 21, 2009.

* cited by examiner

FUNCTIONALIZED OLEFIN POLYMERS, COMPOSITIONS AND ARTICLES PREPARED THEREFROM, AND METHODS FOR MAKING THE SAME

CROSS-REFERENCE TO RELATED APPLICATIONS

This application claims the priority benefit under 35 USC §119(e) to U.S. Provisional Patent Application No. 60/876,387, filed Dec. 21, 2006; U.S. Provisional Patent Application Nos. 60/952,277 and 60/952,356, filed Jul. 27, 2007; and U.S. Provisional Patent Application No. 60/955,450, filed Aug. 13, 2007.

FIELD OF INVENTION

The invention provides polyolefin blend compositions of polar and/or non-polar polymers, with at least one functionalized polyolefin polymer selected from the group consisting of: amine functionalized, hydroxyl functionalized, imide functionalized, anhydride functionalized, or carboxylic acid functionalized polyolefin polymers. The invention also provides methods for making functionalized polyolefin polymers. The invention also provides for materials and articles containing at least one component prepared from such compositions.

BACKGROUND OF THE INVENTION

Polyolefins, as a class of materials, have relatively poor adhesion and compatibility with more polar polymeric materials. In most cases, a separate adhesive is required in order to adhere polyolefins to polar substrates like polyesters, polyamides, and polyurethanes. Similarly, a third component compatibilizer typically has to be used to prepare satisfactory melt blends of polyolefins with other more polar thermoplastics.

Thermoplastic polyolefins, due to their nonpolar nature, generally lack adhesion to polar materials, such as polyurethanes. Thus, a flexible thermoplastic olefin sheet is conventionally surface treated with a primer solution containing one or more polar compounds to increase the adhesion to a polyurethane surface. Typical primer solutions contain a chlorinated maleated polyolefin. Such a surface treatment requires a large ventilation area, equipped to handle sheeting through a gravure application; a primer application mechanism, such as a dip tank; and a drying means to flash off the water and other solvent carriers. In addition, a flexible thermoplastic olefin skin must adhere, without voids and other visible defects, to the polyurethane foam. The polyurethane foam should adhere to the thermoplastic polyolefin surface, without delamination at the interface (or adhesive failure). A discontinuous application of a primer solution may lead to the formation of voids between the thermoplastic olefin skin and polyurethane foam in areas that lack the primer. Surface voids are a costly problem for manufacturers, since parts that have surface voids cannot be used in an automotive assembly, and are instead scraped.

Polymeric sheeting for certain consumer end product applications may have to meet several end-use requirements. Requirements may include a low gloss value, a high surface scratch/mar resistance, high heat resistance, and a good cold temperature impact resistance. In addition, polymeric sheeting may be required to have good adhesion to an intermediate polyurethane (PU) foam layer, for example a foam layer used to provide a softening or cushioning effect.

SUMMARY OF THE INVENTION

The invention provides for a process for preparing a functionalized polyolefin, said process comprising the following steps:

A) grafting onto the backbone of a polyolefin at least one compound comprising at least one amine-reactive group to form a grafted polyolefin; and B) reacting a primary-secondary diamine with the grafted polyolefin;

wherein step B) takes place subsequent to step A) without the isolation of the grafted polyolefin, and wherein both steps A) and B) take place in a melt reaction.

In yet another aspect, the invention provides a process for preparing a functionalized polyolefin, said process comprising the following steps:

A) grafting onto the backbone of a polyolefin at least one compound comprising at least one amine-reactive group to form a grafted polyolefin;

B) reacting a alkanolamine with the grafted polyolefin; and wherein step B) takes place subsequent to step A) without the isolation of the grafted polyolefin, and wherein both steps A) and B) take place in a melt reaction.

In another embodiment, a process for preparing an imide functionalized polyolefin, said process comprising the following steps:

A) grafting onto the backbone of a polyolefin, in a melt reaction, at least one compound of the following structure (IV) to form a grafted polyolefin:

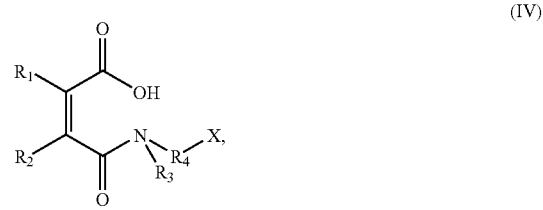

(IV)

and

B) thermally treating the grafted polyolefin to form the imide functionalized polyolefin, and wherein $R_1$ and $R_2$ are, independently, either hydrogen or a $C_1$-$C_{20}$ hydrocarbyl radical, which is linear or branched; $R_3$ is hydrogen or a $C_1$-$C_{20}$ hydrocarbyl radical, which is linear or branched; $R_4$ is a divalent hydrocarbyl radical, which is linear or branched; X is OH or $NHR_5$, where $R_5$ is a hydrocarbyl radical, which is linear or branched, or a hydroxyethyl group.

In another embodiment, a process for preparing an imide functionalized polyolefin, said process comprising the following steps:

A) functionalizing the polyolefin with at least one compound comprising at least one amine-reactive group to form a grafted polyolefin;

B) blending the grafted polyolefin, in a solid, non-molten form, with at least one primary-secondary diamine;

C) imbibing the primary-secondary diamine into the grafted polyolefin;

D) reacting the primary-secondary diamine with the grafted polyolefin to form an imide functionalized polyolefin.

In yet another aspect, the invention provides a composition comprising the following:
- A) at least one polyolefin polymer, at least one halogenated ethylene-based polymer, or at least one elastomeric rubber;
- B) at least one thermoplastic polyurethane; and
- C) at least one functionalized polyolefin.

In another aspect, the invention provides a composition comprising the following:
- A) at least one polyolefin polymer;
- B) at least one thermoplastic polyurethane; and
- C) at least one functionalized polyolefin polymer formed from a polyolefin polymer and at least one anhydride-containing compound or at least one carboxylic acid-containing compound; and
- wherein the at least one polyolefin polymer of Component A is selected from one of the following:
  - (1) a propylene-based polymer, or
  - (2) an ethylene/α-olefin interpolymer that has a PRR greater than, or equal to, 4.

In another aspect, the invention provides a composition comprising the following:
- A) at least one polyolefin polymer, and
- B) at least one functionalized polyolefin polymer,
- wherein the at least one polyolefin polymer is selected from the group consisting of the following: a propylene-based interpolymer, a homogeneously branched linear ethylene-based interpolymer, a homogeneously branched substantially linear ethylene-based interpolymer, and a ethylene-based interpolymer with a PRR greater than or equal to 4; and
- wherein the least one functionalized polyolefin polymer is selected from the group consisting of an amine-functionalized polyolefin polymer, an hydroxyl-functionalized polyolefin polymer and an imide-functionalized polyolefin polymer.

In another aspect, the invention provides a composition comprising:
- A) a first polyolefin polymer,
- B) a second polyolefin polymer, and
- C) a surface modified filler, and
- wherein the second polyolefin polymer differs from the first polyolefin polymer in one or more of the following aspects: olefin-base, density, melt index (I2), melt flow rate, weight percent comonomer, or combinations thereof.

In yet another aspect, the invention comprises a composition of:
- A) at least one polyolefin polymer;
- B) at least one thermoplastic polyurethane; and
- C) at least one functionalized polyolefin polymer formed from a polyolefin polymer and at least one anhydride-containing compound or at least one carboxylic acid-containing compound; and
- wherein the at least one polyolefin polymer of Component A has a melt strength of at least 5 cN.

DETAILED DESCRIPTION OF THE ILLUSTRATIVE EMBODIMENTS

Figure 1:
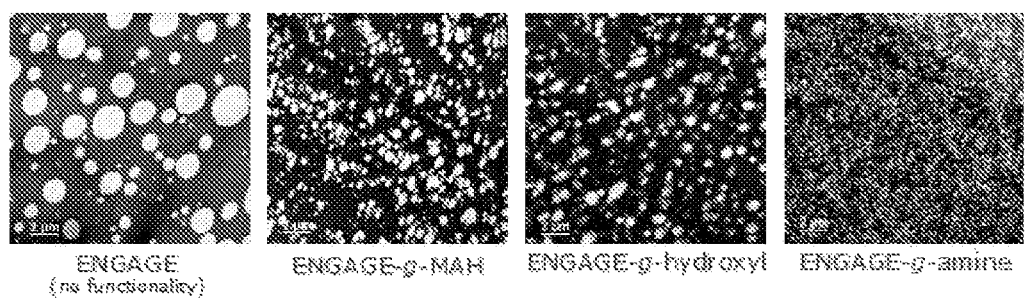
FIG. 1 depicts electron micrographs showing particle sizes and shapes of several functionalized polyethylene/polyurethane blends.

Olefin-based polymers (polyolefins), due to their nonpolar nature, generally lack adhesion to polar materials, such as polyurethanes. Thus, a flexible thermoplastic olefin sheet is conventionally surface treated with a primer solution, containing one or more polar compounds, to increase the adhesion to a polar polymer such as a polyurethane surface. Typical primer solutions contain a chlorinated maleated polyolefin. Such a surface treatment requires a large ventilation area, equipped to handle sheeting through a gravure application; a primer application mechanism, such as a dip tank; and a drying means to flash off the water and other solvent carriers. In addition, the flexible thermoplastic olefin skin must adhere, without voids and other visible defects, to the polyurethane foam. The polyurethane foam should adhere to the thermoplastic polyolefin surface, without delamination at the interface (or adhesive failure). A discontinuous application of a primer solution may lead to the formation of voids between the thermoplastic olefin skin and polyurethane foam in areas that lack the primer. Surface voids are a costly problem for automotive parts manufacturers, since parts that have surface voids cannot be used in an automotive assembly, and are instead scraped.

In some embodiments, the invention relates to a composition containing an amine-functionalized polyolefin polymer. In some embodiments, the invention relates to a composition containing a hydroxyl-functionalized polyolefin polymer. In some embodiments, the invention relates to a composition containing an imide-functionalized polyolefin polymer. The weight percent of the functionalized polyolefin based upon the total weight of a composition may be varied as necessary to express the inherent properties of the inventive polyolefins as part of a total composition. In some embodiments, the composition further comprises a polar polymer. In some other embodiments, the composition further comprises a non-polar polymer.

This invention also relates to the preparation of amine, hydroxyl, or imide functionalized polyolefin polymers. In some embodiments, an in-situ melt reaction may be used. These functionalized polyolefin polymers are useful as either compatibilizers or to provide polar functionality to polyolefin compositions to improve adhesion to polar polymers.

It has been discovered that polyolefin blend compositions containing less than or equal to 10 wt percent functionalized polyolefin polymer and a polyurethane have excellent adhesive properties towards a broad variety of polar polymers such as polyurethanes and foamed polar polymers.

It has also been discovered that polyolefin blend compositions containing at least one functionalized polyolefin polymer selected from the group consisting of an amine-functionalized polyolefin polymer, a hydroxyl-functionalized polyolefin polymer, and an imide-functionalized polyolefin polymer, have superior adhesion properties than anhydride or acid functionalized polyolefin polymers.

The invention also provides for a painted substrate, wherein the substrate is formed from an inventive composition. In a further embodiment, the paint comprises at least one additive of selected from the group consisting of an acrylic polymer, an alkyd resin, a cellulose-based material, a melamine resin, a urethane resin, a carbamate resin, a polyester resin, a vinyl acetate resin, a polyol and an alcohol. In another embodiment, the paint is a water-based paint. In another embodiment, the paint is an organic solvent based paint.

The invention also provides an over-molded article comprising the following: (a) a substrate formed from a composition comprising a polar polymer, and (b) a molded overlay formed from an inventive composition.

The invention also provides an over-molded article comprising the following: (a) a substrate formed from an inventive composition, and (b) a molded overlay formed from a composition comprising a polar polymer. In a further embodiment, the article is in the form of a grip, handle or belt.

The invention also provides a laminated structure comprising a first layer and a second layer, and wherein the first layer is formed from an inventive composition, and wherein the second layer is formed from a composition comprising a polar polymer. In a further embodiment, one of the layers is in the form of a foam. In another embodiment, one of the layers is in the form of a fabric. In another embodiment, the laminated structure is in the form of an awning, a tarp, an automobile skin, or a steering wheel. In another embodiment, the second layer is formed from a composition comprising a polycarbonate.

The invention also provides a molded article comprising a first component and a second component, and wherein the first component is formed from a composition comprising a polar polymer, and wherein the second component is formed from an inventive composition. In a further embodiment, the article is in the form of an automobile skin, an appliqué, a footwear component, a conveyor belt, a timing belt or a consumer durable.

The invention also provides a footwear article comprising at least one component formed from an inventive composition. In a further embodiment, the article is selected from the group consisting of a shoe outsole, a shoe midsole, a shoe unitsole, an overmolded article, a natural leather article, a synthetic leather article, an upper, a laminated article, a coated article, a boot, a sandal, galoshes, a plastic shoe, and combinations thereof.

The invention also provides artificial leather comprising at least one component formed from an inventive composition.

The invention also provides artificial turf comprising at least one component formed from an inventive composition.

An inventive article may comprise a combination of two or more suitable embodiments as described herein.

Polyolefin Polymers

1. Ethylene-Based Polymers

Examples of suitable polyolefin polymers include high density polyethylene (HDPE), low density polyethylene (LDPE), linear low density polyethylene (LLDPE), homogeneously branched linear ethylene/α-olefin interpolymers or homogeneously branched substantially linear ethylene/α-olefin interpolymers, and combinations thereof. The term interpolymer includes both copolymers and terpolymers.

The ethylene/α-olefin interpolymers have comonomer(s) incorporation in the final polymer greater than 5 weight percent, preferably greater than 10 weight percent, based on the total weight of polymerizable monomers. The amount of comonomer(s) incorporation can be greater than 15 weight percent, and can even be greater than 20 or 25 weight percent, based on the total weight of polymerizable monomers.

Comonomers include, but are not limited to, propylene, isobutylene, 1-butene, 1-pentene, 1-hexene, 3-methyl-1-pentene, 4-methyl-1-pentene, and 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically and preferably, the ethylene is copolymerized with one $C_3$-$C_{20}$ α-olefin. Preferred comonomers include propene, 1-butene, 1-pentene, 1-hexene, 1-heptene and 1-octene, and more preferably include propene, 1-butene, 1-hexene and 1-octene.

Illustrative interpolymers include ethylene/propylene (EP) copolymers, ethylene/butene (EB) copolymers, ethylene/hexene (EH) copolymers, ethylene/octene (EO) copolymers, ethylene/α-olefin/diene (EAODM) interpolymers, such as ethylene/propylene/diene (EPDM) interpolymers and ethylene/propylene/octene terpolymers. Preferred copolymers include EP, EB, EH and EO polymers.

Suitable diene and triene comonomers include 7-methyl-1,6-octadiene; 3,7-dimethyl-1,6-octadiene; 5,7-dimethyl-1,6-octadiene; 3,7,11-trimethyl-1,6,10-octatriene; 6-methyl-1,5heptadiene; 1,3-butadiene; 1,3-pentadiene, norbornadiene, 1,6-heptadiene; 1,7-octadiene; 1,8-nonadiene; 1,9-decadiene; 1,10-undecadiene; norbornene; tetracyclododecene; or mixtures thereof; and preferably butadiene; hexadienes; and octadienes; and most preferably 1,4-hexadiene; 1,9-decadiene; 4-methyl-1,4-hexadiene; 5-methyl-1,4-hexadiene; dicyclopentadiene; and 5-ethylidene-2-norbornene (ENB).

Additional unsaturated comonomers include 1,3-butadiene, 1,3-pentadiene, norbornadiene, and dicyclopentadiene; $C_8$-$C_{40}$ vinyl aromatic compounds including sytrene, o-, m-, and p-methylstyrene, divinylbenzene, vinylbiphenyl, vinylnapthalene; and halogen-substituted $C_8$-$C_{40}$ vinyl aromatic compounds such as chlorostyrene and fluorostyrene.

The homogeneously branched linear ethylene/α-olefin interpolymers or homogeneously branched substantially linear ethylene/α-olefin interpolymers of this invention have a melt index ("$I_2$") from 0.01 g/10 min to 30 g/10 min, preferably from 0.1 g/10 min to 20 g/10 min, and more preferably from 0.1 g/10 min to 15 g/10 min. All individual values and subranges from 0.01 g/10 min to 30 g/10 min are included herein and disclosed herein.

Preferred ethylene-based polymers are the homogeneously branched substantially linear ethylene/α-olefin ("EAO") interpolymers which contain long chain branching, as compared to linear (short chain branches or no branches) ethylene/α-olefin interpolymers. The "long-chain branching" ("LCB") means a chain length that exceeds that of a short chain that results from incorporation of the α-olefin into the backbone of an ethylene/α-olefin polymer. In another embodiment, the ethylene/α-olefin interpolymers are prepared from at least one catalyst that can form long chain branches within the interpolymer backbone.

LCB polymers are disclosed in U.S. Pat. No. 5,272,236, in which the degree of LCB is from 0.01 LCB/1000 carbon atoms to 3 LCB/1000 carbon atoms, and in which the catalyst is a constrained geometry catalyst. According to P. Doerpinghaus and D. Baird, in *The Journal of Rheology*, 47(3), pp 717-736 May/June 2003, "Separating the Effects of Sparse Long-Chain Branching on Rheology from Those Due to Molecular Weight in Polyethylenes," free radical processes, such as those used to prepare low density polyethylene (LDPE), produce polymers having extremely high levels of LCB. For example, the resin NA952 in Table I of Doerpinghaus and Baird is a LDPE prepared by a free radical process, and, according to Table II, contains 3.9 LCB/1000 carbon atoms. Ethylene α-olefins (ethylene-octene copolymers), available from The Dow Chemical Company (Midland, Mich., USA), that are considered to have average levels of LCB, include resins Affinity PL1880 and Affinity PL1840 and contain 0.018 and 0.057 LCB/1000 carbon atoms, respectively.

There are various methods that can be used to define the degree of LCB in a molecule such as Processing Rheology ratio ("PRR"), which uses interpolymer viscosities to calculate estimated levels of LCB in a polymer.

Interpolymer viscosity is conveniently measured in poise (dyne-second/square centimeter (d-sec/cm$^2$)) at shear rates within a range of 0.1-100 radian per second (rad/sec) and at 190° C. under a nitrogen atmosphere, using a dynamic mechanical spectrometer (such as a RMS-800 or ARES from Rheometrics), under a dynamic sweep made from 0.1 to 100 rad/sec. The viscosities at 0.1 rad/sec and 100 rad/sec may be represented, respectively, as $V_{0.1}$ and $V_{100}$, with a ratio of the two referred to as RR and expressed as $V_{0.1}/V_{100}$.

The PRR value is calculated by the formula:

$$PRR=RR+[3.82-\text{interpolymer Mooney viscosity} \\ (ML_{1+4} \text{ at } 125° \text{ C.})] \times 0.3 \quad \text{(Eq. 1)}$$

PRR determination is described in U.S. Pat. No. 6,680,361. Homogeneously branched linear ethylene/α-olefin interpolymers have PRR values of approximately −6.

For applications requiring superior processability, the ethylene/α-olefin interpolymer has a PRR from 4 to 70, preferably from 8 to 70, more preferably from 12 to 60, even more preferably from 15 to 55, and most preferably from 18 to 50. Examples of ethylene/α-olefin interpolymers having high levels of LCB are ENGAGE 7086 (PRR 19) and ENGAGE 6386 (PRR 70), both available from The Dow Chemical Company.

In another embodiment of the invention, especially for applications requiring improved melt strength of the polyolefin, such as automotive interior skins, the ethylene/α-olefin interpolymers have a melt strength (MS) of 5 cN or greater, preferably 6 cN or greater, and more preferably 7 cN or greater. Melt strength as here used is a maximum tensile force in cN measured on a molten filament of a polymer melt, extruded from a capillary rheometer die at a constant shear rate of 33 reciprocal seconds (sec$^{-1}$), while the filament is being stretched by a pair of nip rollers that are accelerating the filament at a rate of 0.24 centimeters per second (cm/sec), from an initial speed of 1 cm/sec. The molten filament is preferably generated by heating 10 grams (g) of a polymer that is packed into a barrel of an Instron capillary rheometer, equilibrating the polymer at 190° C. for five minutes (min), and then extruding the polymer at a piston speed of 2.54 cm/min, through a capillary die with a diameter of 0.21 cm and a length of 4.19 cm. The tensile force is preferably measured with a Goettfert Rheotens melt tensile tester that is located so that the nip rollers are 10 cm directly below a point at which the filament exits the capillary die. An example of an EAO interpolymer having excellent melt strength is ENGAGE™ 7086 or ENR 7086.01, a random ethylene/1-butene copolymer having a density of 0.901 g/cc, and a melt index ($I_2$) of less than 0.5 g/10 min (available from The Dow Chemical Company).

An ethylene/α-olefin interpolymer may contain a combination of two or more embodiments as described herein.

2. Propylene-Based Polymers

Suitable propylene-based polymers include propylene homopolymers and propylene interpolymers. The propylene interpolymer can be a random or block copolymer, branched polypropylene, or a propylene-based terpolymer.

Suitable comonomers for polymerizing with propylene include ethylene, 1-butene, 1-pentene, 1-hexene, 1-heptene, 1-octene, 1-nonene, 1-decene, 1-unidecene, 1dodecene, as well as 4-methyl-1-pentene, 4-methyl-1-hexene, 5-methyl-1-hexene, vinylcyclohexane, and styrene. Typically and preferably, the propylene is copolymerized with ethylene or one $C_4$-$C_{20}$ α-olefin. The preferred comonomers include ethylene, 1-butene, 1-hexene, and 1-octene, and more preferably ethylene.

The propylene interpolymers of particular interest include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene.

Suitable polypropylenes are formed by means within the skill in the art, for example, using single site catalysts (metallocene or constrained geometry) or Ziegler-Natta catalysts. The propylene and optional comonomers, such as ethylene or α-olefin monomers are polymerized under conditions within the skill in the art, for instance, as disclosed by Galli, et al., Angew. Macromol. Chem., Vol. 120, 73 (1984), or by E. P. Moore, et al. in Polypropylene Handbook, Hanser Publishers, New York, 1996, particularly pages 11-98. Polypropylene polymers include Shell's KF 6100 homopolymer polypropylene; Solvay's KS 4005 polypropylene copolymer; Solvay's KS 300 polypropylene terpolymer; and INSPIRE™ polymers and VERSIFY™ polymers both available from The Dow Chemical Company.

The polypropylene homopolymers or propylene/α-olefin interpolymers of this invention have a melt flow rate ("MFR") less than 100 g/10 min, and more preferably less than, or equal to 50 g/10 min, and even more preferably less than, or equal to 30 g/10 min, as measured in accordance with ASTM D 1238 at 230° C./2.16 kg.

The propylene-based polymer used in the present invention may be of any molecular weight distribution ("MWD"). Propylene-based polymers of broad or narrow MWD are formed by means within the skill in the art. Propylene-based polymers having a narrow MWD can be advantageously provided by visbreaking, or by manufacturing reactor grades (non visbroken) using single-site catalysis, or by both methods.

The propylene-based polymer can be reactor-grade, visbroken, branched, or coupled, to provide increased nucleation and crystallization rates. The term "coupled" is used to refer to propylene-based polymers which are rheology-modified, such that they exhibit a change in the resistance of the molten polymer to flow during extrusion (for example, in the extruder immediately prior to the annular die). Whereas "visbroken" is in the direction of chain-scission, "coupled" is in the direction of crosslinking or networking. As an example of coupling, a couple agent (for example, an azide compound) is added to a relatively high melt flow rate polypropylene polymer, such that after extrusion, the resultant polypropylene polymer composition attains a substantially lower melt flow rate than the initial melt flow rate. Preferably, for coupled or branched polypropylene, the ratio of subsequent MFR to initial MFR is less than, or equal, to 0.7:1, more preferably less than or equal to 0.2:1.

Suitable branched propylene-based polymers for use in the present invention are commercially available, for instance from Basell North America, under the trade designations Profax PF-611 and PF-814. Alternatively, suitable branched or coupled propylene-based polymers can be prepared by means, within the skill in the art, such as by peroxide or electron-beam treatment, for instance as disclosed by DeNicola et al., in U.S. Pat. No. 5,414,027 (the use of high energy (ionizing) radiation in a reduced oxygen atmosphere); European Patent No. 0190889 (Himont; electron beam irradiation of isotactic polypropylene at lower temperatures); U.S. Pat. No. 5,464,907 (Akzo Nobel NV); European Patent No. 0754711 (Solvay; peroxide treatment); and U.S. patent application Ser. No. 09/133,576 (filed Aug. 13, 1998) (azide coupling agents).

Other suitable polypropylene base polymers include VERSIFY™ polymers (The Dow Chemical Company) and VISTAMAXX™ polymers (ExxonMobil Chemical Co.), LICOCENE™ polymers (Clariant), EASTOFLEX™ polymers (Eastman Chemical Co.), REXTAC™ polymers (Hunstman), and VESTOPLAST™ polymers (Degussa). Other suitable polymers include propylene-α-olefins block copolymers and interpolymers, and other propylene based block copolymers and interpolymers known in the art.

In another embodiment, the propylene-based polymer is a propylene/α-olefin interpolymer, which has a molecular weight distribution less than, or equal to, 5, and preferably less than, or equal to, 4, and more preferably less than, or equal to 3. More preferably the propylene/α-olefin interpolymer has a molecular weight distribution from 1.1 to 5, and more preferably from 1.5 to 4.5, and more preferably from 2 to 4. In another embodiment, the molecular weight distribution is less than 3.5, preferably less than 3.0, more preferably less than 2.8, more preferably less than 2.5, and most preferably less than 2.3. All individual values and subranges from about 1 to 5 are included herein and disclosed herein.

In another embodiment, the propylene-based polymers comprise units derived from propylene in an amount of at least about 60, preferably at least about 80 and more preferably at least about 85, weight percent of the interpolymer (based on the total weight of polymerizable monomers). The typical amount of units derived from ethylene in propylene/ethylene copolymers is at least about 0.1, preferably at least about 1 and more preferably at least about 5 weight percent, and the maximum amount of units derived from ethylene present in these copolymers is typically not in excess of about 35, preferably not in excess of about 30 and more preferably not in excess of about 20, weight percent of the interpolymer (based on the total weight of polymerizable monomers). The amount of units derived from an additional unsaturated comonomer(s), if present, is typically at least about 0.01, preferably at least about 1 and more preferably at least about 5, weight percent, and the typical maximum amount of units derived from the unsaturated comonomer(s) typically does not exceed about 35, preferably it does not exceed about 30 and more preferably it does not exceed about 20, weight percent of the interpolymer (based on the total weight of polymerizable monomers). The combined total of units derived from ethylene and any unsaturated comonomer(s) typically does not exceed about 40, preferably it does not exceed about 30, and more preferably it does not exceed about 20, weight percent of the interpolymer (based on the total weight of polymerizable monomers).

In another embodiment, the propylene-based polymers comprise propylene and one or more unsaturated comonomers, other than ethylene, also typically comprise units derived from propylene in an amount of at least about 60, preferably at least about 70 and more preferably at least about 80, weight percent of the interpolymer (based on the total weight of polymerizable monomers). The one or more unsaturated comonomers of the copolymer comprise at least about 0.1, preferably at least about 1, and more preferably at least about 3, weight percent, and the typical maximum amount of unsaturated comonomer does not exceed about 40, and preferably it does not exceed about 30, weight percent of the interpolymer (based on the total weight of polymerizable monomers).

A propylene-based polymer may have a combination of two or more embodiments as described.

A propylene/α-olefin interpolymer may have a combination of two or more embodiments as described.

A propylene/ethylene interpolymer may have a combination of two or more embodiments as described.

3. Polyolefin Blends for Use as Polyolefin Polymer

In another embodiment of the invention, a blend of two of more polyolefins may be used as the olefin polymer component, such as, for example, a blend of an ethylene-base polymer, as discussed above, and a propylene-base polymer, as discussed above.

Halogenated Ethylene-Based Polymers

A halogenated polymer may comprise a combination of two or more appropriate embodiments as described herein.

Suitable halogenated ethylene-based polymers include chlorinated ethylene-based polymers and fluorinated ethylene-based polymers. Suitable chlorinated ethylene-based polymers include Tyrin™ chlorinated polymers available from The Dow Chemical Company.

Examples of chlorinated ethylene interpolymers include those prepared from copolymers comprising ethylene and at least one ethylenically unsaturated monomer, selected from the group consisting of $C_3$-$C_{10}$ α monoolefins. Chlorinated graft interpolymers are included as well. Specific examples of suitable chlorinated ethylene copolymers, which may be employed in the compositions of this invention, include copolymers of ethylene with propylene, 1-butene, 3-methyl-1-pentene, 1-pentene, 1-hexene, 1-heptene or 1-octene. The interpolymers may be copolymers, terpolymers, or higher order copolymers. Chlorinated polyethylene is a preferred chlorinated ethylene-based polymer. Some particular examples of chlorinated ethylene-based polymers are described further below. Chlorinated ethylene ester copolymers, such as chlorinated ethylene methyl acrylate and chlorinated ethylene methyl methacrylate, may also be suitable for used in the invention.

Suitable chlorinated ethylene-based polymers may be selected from the group consisting of a) chlorinated polyethylene homopolymers prepared from polyethylenes having an $I_{10}$ value of from 0.01 to 120 dg/min, and more preferably from 0.05 to 100 dg/min, and b) chlorinated ethylene copolymers prepared from ethylene copolymers having an I10 value of from 0.01 to 120 dg/min, and that comprise copolymerized units of i) ethylene and ii) up to 25 weight percent (based on the total weight of polymerizable monomers) of a copolymerizable monomer. Such polymers preferably have a chlorine content from 15 to 48 weight percent by weight, and more preferably from 25 to 38 weight percent, based on total weight of the polymer. In another embodiment, the molecular weights of the non-chlorinated polyolefin base resins range from 400,000 to 1,000,000 g/mole.

In another embodiment, the chlorinated ethylene-based polymers may be prepared from ethylene-based polymers that are branched or unbranched. The ethylene-based polymer may be prepared by free radical processes, Ziegler-Natta catalysis, or single-site catalyst systems, for example, constrained geometry catalysts, such as disclosed in U.S. Pat. Nos. 5,272,236 and 5,278,272.

Elastomeric Rubbers

Another useful class of polyolefin polymers includes elastomeric rubbers. An elastomeric rubber may comprise a combination of two or more appropriate embodiments as described.

Examples of applicable elastomeric rubbers include homopolymers of conjugated dienes, especially butadiene or isoprene, and random, or block, copolymers and terpolymers of at least one conjugated diene, especially butadiene or isoprene, with at least one aromatic α-olefin, especially styrene and 4-methylstyrene, aromatic diolefin, especially divinylbenzene. Especially preferred is the random copolymerization, optionally terpolymerization, of at least one conjugated diene with at least one aromatic α-olefin, and optionally, at least one aromatic diolefin or aliphatic α-olefin, especially butadiene, or isoprene, with styrene, 4-methylstyrene, or divinylbenzene.

Preferred elastomeric polymers (or modified polymers) include polybutadiene, polyisoprene, styrene-butadiene copolymer, styrene-isoprene copolymer, butadiene-isoprene copolymer, and isoprene-styrene copolymer. More preferred elastomers (or polymers) include polybutadiene and styrene-butadiene copolymer.

In one embodiment, the elastomeric rubber is selected from the group consisting of homopolymers of isoprene, homopolymers of butadiene, copolymers of butadiene with styrene, copolymers of isoprene with styrene, terpolymers butadiene with isoprene and styrene, and combinations thereof. In another embodiment, the elastomeric rubber is selected from the group consisting of homopolymers of butadiene and copolymers of butadiene with styrene.

Preferred elastomeric rubbers include: cis-1.4-isoprene polymer, natural rubber, 3,4-isoprene polymer, styrene/butadiene copolymer polymer, styrene/isoprene/butadiene terpolymer, cis-1,4-butadiene polymer, trans-1,4-butadiene polymer, low to high vinyl butadiene polymers (having a vinyl content of 10-90 percent), acrylonitrile/butadiene copolymers, and chloroprene polymers. Of these, styrene-butadiene copolymer, natural rubbers, polyisoprene, and polybutadiene are very preferable. In one embodiment, the rubber has a Mooney viscosity (ML 1+4, 100° C.) in the range from 20 to 200, and preferably from 25 to 150 (measured in accordance with ASTM D 1646 (2004).

Additional examples of applicable elastomeric rubbers include the following: BR—polybutadiene; ABR—butadiene/$C_1$-$C_4$-alkyl acrylate copolymers; HIPS—butadiene/styrene copolymers; CR—polychloroprene; IR—polyisoprene; SBR—styrene/butadiene copolymers, with styrene contents of 1 to 60, and preferably 20 to 50 wt percent; IIR—isobutylene/isoprene copolymers; NBR—butadiene/acrylonitrile copolymers with acrylonitrile contents of 5 to 60, preferably 20 to 50 wt percent; HNBR—partially hydrogenated or fully hydrogenated NBR rubber; EPDM—ethylene/propylene/diene copolymers and mixtures of theses rubbers.

Additional preferred rubbers are as follows: (a) polybutadiene having a Mooney range from 30 to 80, and a vinyl bond content ranging from 5 to 30 weight percent, based on the conjugation diolefin portion of the elastomeric rubber; (b) polybutadiene having a Mooney range from 30 to 80, and a vinyl bond content ranging from 45 to 80 weight percent, based on the conjugation diolefin portion of the elastomeric rubber; (c) butadiene-styrene copolymer having a Mooney range from 45 to 80, a vinyl bond content ranging from 50 to 80 weight percent, based on the conjugation diolefin portion of the elastomeric rubber, and a styrene content of 15 to 30 weight percent (in the copolymer), having 50 weight percent or more of the styrene units linked singly, and 10 weight percent, or less, linked to "blocks" of eight or more styrene units; and (d) modified butadiene-styrene copolymer having a Mooney range from 45 to 80, a vinyl bond content ranging from 5 to 50 weight percent, based on the conjugation diolefin portion of the elastomeric rubber, and a styrene content of 30 to 55 weight percent (in the copolymer), having 40 weight percent or more of the styrene units linked singly, and 10 weight percent or less linked to "blocks" of eight or more styrene units.

1. Polyisoprene

Polyisoprenes include both natural polyisprene and synthetic polyisoprene. Suitable polyisoprenes include, but are not limited to, natural cis-1,4-polyisoprene, synthetic cis-1, 4-polyisoprene, high vinyl 3,4-polyisoprene and 3,4-polyisoprene. In one embodiment, the polyisoprene has a Mooney Viscosity (ML 1+4 at 100° C.) from 20 to 100, and preferably from 40 to 80.

Suitable examples of polyisoprenes include the following technical grades: SMR (Standard Malaysian Rubber), such as SRM 5 and SMR 20; TSR (Technical Specified Rubber) and RSS (Ribbed Smoked Sheets).

A polyisoprene may comprise a combination of two or more appropriate embodiments as described.

2. Polybutadiene

Suitable polybutadienes includes, but is not limited to, natural cis-1,4-polybutadiene, trans-1,4-polybutadiene, vinyl-1,2-polybutadiene, copolymers of styrene and butadiene, copolymers of isoprene and butadiene, and interpolymers of styrene, isoprene and butadiene. In one embodiment, the polybutadiene has a Mooney Viscosity (ML 1+4 at 100° C.) from 10 to 100, preferably from 15 to 90, and more preferably from 20 to 80. Examples of suitable polybutadienes include EUROPRENE NEOCIS BR 40 from POLIMERI EUROPA, and BUNA CB 24 from LANXESS.

A polybutadiene may comprise a combination of two or more appropriate embodiments as described.

Additional Polymers

The polyolefin polymer can also be any styrenic based polymer such as SEBS, and ABS.

Functionalized Polyolefin Polymers

The functionalized polyolefin polymers have utility in applications where improved compatibility, adhesion, or paintability to polar polymers, such as polyurethane, polyester, polyvinylchloride, polyamides, polyacrylates, polyacrylonitrile, polycarbonate, and cellulosics, is required. The inventive functionalized polyolefin polymers find particular use in shoe soles, automotive instrument panel skins, blends with thermoplastic polyurethanes. This invention also provides various in-situ melt processes that can be used to prepare said functionalized polyolefin polymers, avoiding the need to prepare and isolate an anhydride grafted polyolefin precursor.

The functionalize polyolefin polymer may also be used as tie layers between extruded sheets, films or profiles, for fibers or dispersions, in automotive skins, awnings, tarps, roofing construction (for example, adhesives to epoxy, urethane or acrylic-based substrates for all roofing applications, such as insulation bonding, liquid roofing, façade sealant, expansion joints, wet-room sealants, pitched roof, acrylics-adhered roof, bitumen bonding, and PUR-adhered refurbishment), paintable automotive skins and steering wheels, paintable injection molded toys, powder coatings, powder slush moldings or rotational cast moldings, consumer durables, grips, computer components, belts, adhesives, fabrics, carpets, artificial turf, coatings, wire and cable, raincoats and similar protective apparel.

The functionalized polyolefin polymers of this invention, when blended with both a polyolefin and a polar polymer such as polyurethane, the functionalized polyolefin polymer acts as a compatibilizer. When the functionalized polyolefin polymer is blended only with non-polar polymers such as polyolefins, the functionalized polyolefin polymer is behaving as an adhesion promoter.

The invention also provides a process for preparing a functionalized polyolefin polymer, said process comprising the following steps:
A) grafting onto the backbone of a polyolefin at least one compound comprising at least one amine-reactive group to form a grafted polyolefin;
B) reacting a primary-secondary diamine with the grafted polyolefin; and wherein step B) takes place subsequent to step A), without the isolation of the grafted polyolefin, and wherein both steps A) and B) take place in a melt reaction.

In a preferred embodiment, the primary-secondary diamine is selected from N-ethylethylenediamine, N-phenylethylenediamine, N-phenyl-1,2-phenylene-diamine, N-phenyl-1,4-phenylenediamine, or 4-(aminomethyl)piperidine.

In one embodiment, both steps A and B take place in a batch reactor.

In another embodiment, both steps A and B take place in a Brabender mixer, a Busch mixer or a Farrel mixer.

In another embodiment, step A takes place in an extruder, and step B takes place in a gear pump.

In another embodiment, step A takes place in an extruder, and step B takes place in a batch mixer. In a further embodiment, the batch mixer is of commercial dimensions. In another embodiment, the batch mixer is of lab scale or pilot plant dimensions.

In another embodiment, step A takes place in an extruder, and step B takes place in a separate extruder.

In another embodiment, there is no purification step between steps A and B.

In another embodiment, there is no venting of volatiles between steps A and B.

In another embodiment, the invention provides a process for preparing a functionalized polyolefin, said process comprising the following steps:
A) grafting onto the backbone of a polyolefin at least one compound comprising at least one "amine-reactive" group to form a grafted polyolefin;
B) reacting a alkanolamine with the grafted polyolefin; and wherein step B) takes place subsequent to step A), without the isolation of the grafted polyolefin, and wherein both steps A) and B) take place in a melt reaction.

In a preferred embodiment, the alkanolamine is selected from 2-aminoethanol, 2-amino-1-propanol, 3-amino-1-propanol, 2-amino-1-butanol, 2-(2-aminoethoxy)-ethanol or 2-aminobenzyl alcohol.

In one embodiment, both steps A and B take place in a batch reactor.

In another embodiment, both steps A and B take place in a Brabender mixer, a Busch mixer or a Farrel mixer.

In another embodiment, step A takes place in an extruder, and step B takes place in a gear pump.

In another embodiment, step A takes place in an extruder, and step B takes place in a batch mixer. In a further embodiment, the batch mixer is of commercial dimensions. In another embodiment, the batch mixer is of lab scale or pilot plant dimensions.

In another embodiment, step A takes place in an extruder, and step B takes place in a separate extruder.

In another embodiment, there is no purification step between steps A and B.

In another embodiment, there is no venting of volatiles between steps A and B.

In another aspect, the invention provides a process for preparing a functionalized polyolefin, said process comprising the following steps:
A) grafting onto the backbone of a polyolefin at least one compound comprising at least one amine-reactive group to form a grafted polyolefin;
B) reacting a primary-secondary diamine or an alkanolamine with the grafted polyolefin; and
wherein step B) takes place subsequent to step A), without the isolation of the grafted polyolefin, and wherein both steps A) and B) take place in a melt reaction.

In a preferred embodiment, the primary-secondary diamine is selected from N-ethylethylenediamine, N-phenylethylenediamine, N-phenyl-1,2-phenylene-diamine, N-phenyl-1,4-phenylenediamine, or 4-(aminomethyl)piperidine.

In a preferred embodiment, the alkanolamine is selected from 2-aminoethanol, 2-amino-1-propanol, 3-amino-1-propanol, 2-amino-1-butanol, 2-(2-aminoethoxy)-ethanol or 2-aminobenzyl alcohol.

In one embodiment, both steps A and B take place in a batch reactor.

In another embodiment, both steps A and B take place in a Brabender mixer, a Busch mixer or a Farrel mixer.

In another embodiment, step A takes place in an extruder, and step B takes place in a gear pump.

In another embodiment, step A takes place in an extruder, and step B takes place in a batch mixer. In a further embodiment, the batch mixer is of commercial dimensions. In another embodiment, the batch mixer is of lab scale or pilot plant dimensions.

In another embodiment, step A takes place in an extruder, and step B takes place in a separate extruder.

In another embodiment, there is no purification step between steps A and B.

In another embodiment, there is no venting of volatiles between steps A and B.

In another embodiment, the invention provides a process for preparing an imide functionalized polyolefin, said process comprising the following steps:
grafting onto the backbone of a polyolefin, in a melt reaction, at least one compound of the following structure (IV) to form a grafted polyolefin:

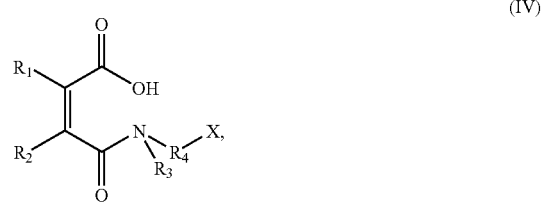

(IV)

and thermally treating the grafted polyolefin to form the imide functionalized polyolefin,
and wherein $R_1$ and $R_2$ are, independently, either hydrogen or a C1-C20 hydrocarbyl radical, which is linear or branched; $R_3$ is hydrogen or a C1-C20 hydrocarbyl radical, which is linear or branched; $R_4$ is a hydrocarbyl di-radical, which is linear or branched; X is OH or NHR$_5$, where R$_5$ is a hydrocarbyl radical, which is linear or branched, or a hydroxyethyl group.

In another embodiment, the invention provides a process for preparing an imide functionalized polyolefin, said process comprising the following steps:
- A) functionalizing the polyolefin with at least one compound comprising at least one amine-reactive group to form a grafted polyolefin;
- B) blending the grafted polyolefin, in a solid, non-molten form, with at least one primary-secondary diamine;
- C) imbibing the primary-secondary diamine into the grafted polyolefin;
- D) reacting the primary-secondary diamine with the grafted polyolefin to form an imide functionalized polyolefin.

In a further embodiment, the imbibing step takes place at room temperature. In another embodiment, the blending step takes place at room temperature.

The invention also provides a composition comprising a functionalized polyolefin.

The invention also provides a composition comprising a functionalized polyolefin as described herein, and wherein the functionalized polyolefin is present in an amount less than, or equal to, 20 weight percent, based on the total weight of the composition. In a further embodiment, the composition further comprises at least one polar polymer or at least one nonpolar polymer.

In another embodiment, the composition further comprising a polar polymer selected from polyesters, polyamides, polyethers, polyetherimides, polyvinylalcohols, polylactic acids, polyurethanes, polycarbonatates, polyamide esters, or polyvinylchlorides. In another embodiment, the functionalized polyolefin is dispersed in the polar polymer to form particles thereof. In a further embodiment, the particles have a mean size less than, or equal to, 0.40 µm, preferably less than, or equal to 0.30 µm, and more preferably less than, or equal to, 0.20 µm.

In another embodiment, the composition is in the form of particles, and wherein the polar polymer is a dispersed phase. In a further embodiment, the particles have a mean size less than, or equal to, 0.40 µm, preferably less than, or equal to 0.30 µm, and more preferably less than, or equal to, 0.20 µm.

The inventive compositions may comprise a combination of two or more embodiments.

The invention also provides an over-molded article, the article formed from a substrate comprising an inventive composition, and a molded overlay comprising a polar material. In a further embodiment, the article is in the form of a grip, handle or belt.

The invention also provides an over-molded article, the article formed from a polar substrate, and a molded overlay formed from an inventive composition. In another embodiment the polar substrate is formed from a composition comprising a polycarbonate, and in a further embodiment, the polar substrate has a textured surface at an interface of the substrate and the molded overlay The invention also provides a laminated structure comprising a first layer and a second layer, and wherein the first layer is formed from an inventive composition, and the second layer is formed from a composition comprising a polar material. In a further embodiment, one of the layers is in the form of a foam. In another embodiment one of the layers is in the form of a fabric. In another embodiment, laminated structure is in the form of an awning, tarp or automobile skin or steering wheel. In another embodiment, the second layer is formed from a composition comprising a polycarbonate, and in a further embodiment, the second layer has a textured surface at an interface of the second layer and first layer.

The invention also provides a molded article comprising a first component and a second component, and wherein the first component is formed from a polar material, and the second component formed from an inventive composition. In a further embodiment, the article is in the form of an automobile skin, appliqué, footwear, conveyor belt, timing belt or consumer durable.

The invention also provides an article comprising at least one component formed from an inventive composition. In a further embodiment, the article is a carpet, an adhesive, a wire sheath, a cable, a protective apparel, a coating or a foam laminate. In another embodiment, the article is a tie layer between extruded sheets, films or profiles; a tie layer between cast sheets, films or profiles; an automotive skin; an awning; a tarp; a roofing construction article; a steering wheel; a powder coating; a powder slush molding; a consumer durable; a grip; a handle; a computer component; a belt; an appliqué, a footwear component, a conveyor or timing belt, or a fabric.

The inventive articles and laminated structures may comprise a combination of two or more embodiments.

In-Situ Functionalization Reactions Using of a Grafted Polyolefin

1. Grafting Reactions

The polyolefins disclosed may be modified by typical grafting, hydrogenation, nitrene insertion, epoxidation, or other modification reactions, well known to those skilled in the art. Preferred modifications are grafting reactions using a free radical mechanism, and more preferably, grafting reactions that result in the formation of "amine-reactive groups" and "hydroxyl-reactive groups." Such groups include, but are not limited to, anhydride groups, ester groups and carboxylic acid groups, and preferably the reactive group is an anhydride group.

Examples of reactive compounds that can be grafted onto the polymeric hydrocarbon backbone include ethylenically unsaturated carboxylic acids such as maleic acid, fumaric acid, itaconic acid, acrylic acid, methacrylic acid, and crotonic acid; acid anhydrides such as maleic anhydride and itaconic anhydride; vinyl benzyl halides such as vinyl benzyl chloride and vinyl benzyl bromide; alkyl acrylates and methacrylates such as methyl acrylate, ethyl acrylate, butyl acrylate, lauryl acrylate, methyl methacrylate, ethyl methacrylate, butyl methacrylate, and lauryl methacrylate; and ethylenically unsaturated oxiranes, such as glycidyl acrylate, glycidyl methacrylate, and glycidyl ethacrylate. Preferred ethylenically unsaturated amine-reactive compounds include maleic anhydride, acrylic acid, methacrylic acid, glycidyl acrylate, glycidyl methacrylate, with maleic anhydride being more preferred. Polypropylene grafted with maleic anhydride is a more preferred modified polymeric hydrocarbon.

The degree of incorporation or grafting of the reactive group is "application dependent", but is preferably not more than 10 weight percent, more preferably not more than 5 weight percent, more preferably not more than 2 weight percent, and most preferably not more than 1 weight percent; and preferably not less than 0.01 weight percent, more preferably not less than 0.1 weight percent, and most preferably not less than 0.2 weight percent, based on the weight of the grafting agent.

A thermal grafting process is one method for reaction; however, other grafting processes may be used, such as photo initiation, including different forms of radiation, e-beam, or redox radical generation. The functionalization may also occur at the terminal unsaturated group (for example, vinyl group) or an internal unsaturation group, when such groups are present in the polymer.

In accordance with some embodiments, the polymers with unsaturation are functionalized, for example, with carboxylic acid producing moieties (preferably acid or anhydride moieties) selectively at sites of carbon-to-carbon unsaturation on the polymer chains, preferably in the presence of a free-radical initiator, to randomly attach carboxylic acid producing moieties, that is, acid or anhydride or acid ester moieties, onto the polymer chains.

The amine-reactive group or hydroxyl-reactive group can be grafted to the polymer by any conventional method, typically in the presence of a free radical initiator, for example peroxides and azo compounds, or by ionizing radiation. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy)hexane, lauryl peroxide, and tert-butyl peracetate, t-butyl α-cumyl peroxide, di-t-butyl peroxide, di-t-amyl peroxide, t-amyl peroxybenzoate, 1,1-bis(t-butylperoxy)-3,3,5-trimethylcyclohexane, α,α'-bis(t-butylperoxy)-1,3-diisopropylbenzene, α,α'-bis(t-butylperoxy)-1,4-diisopropylbenzene, 2,5-bis(t-butylperoxy)-2,5-dimethylhexane, and 2,5-bis(t-butylperoxy)-2,5-dimethyl-3-hexyne. A suitable azo compound is azobisisobutyl nitrite.

The grafting reaction should be performed under conditions that maximize grafts onto the polyolefin backbone, and minimize side reactions, such as the homopolymerization of the grafting agent, which is not grafted to the polyolefin. The grafting reaction may be performed in the melt, in solution, in the solid-state, in a swollen-state, and is preferably performed in the melt. The grafting reaction may be performed in a wide-variety of equipment, such as, but not limited to, twin screw extruders, single screw extruders, Brabender mixers, and batch reactors.

It has been found that mixing the resin with the grafting agent and initiator in the first stage of an extruder, at melt temperatures typically from 120° C. to 260° C., preferably from 130° C. to 250° C., has produced sufficiently grafted polymers.

2. In-Situ Amine Functionalization and In-Situ Hydroxyl Functionalization

The process to produce amino-functionalize or hydroxy-functionalize polyolefin can be carried out as one extrusion step, that is, maleic anhydride can be grafted to the polyolefin in the first section of the extruder, followed by imidization with either a primary-secondary diamine or alkanolamine in the latter section before pelletization.

Alternatively, two extruders, or melt mixing devises could be operated in series to carry out both chemical steps.

In order to prepare an amino-functionalized polyolefin, without competing crosslinking reactions, in the melt, from anhydride-grafted polyolefin, it is necessary to employ a primary-secondary diamine of the general formula H$_2$N—R—NH—R, where R is at least a C$_2$ hydrocarbyl radical. The diamine can be used in a stoichiometric excess or stoichiometric equivalence.

Suitable primary-secondary diamines include compounds of structure (I):

H$_2$N—R$_1$—NH—R$_2$           (I).

In structure (I), R$_1$ is a divalent hydrocarbon radical, and preferably a linear hydrocarbon of the formula —(CH$_2$)$_n$—, where n is greater than, or equal to, 2, and preferably n is from 2 to 10, more preferably from 2 to 8, and even more preferably from 2 to 6. R$_2$ is a monovalent hydrocarbon radical containing at least 2 carbon atoms, and optionally may be substituted with a heteroatom containing group, such as OH or SH. Preferably, R$_2$ a linear hydrocarbon of the formula —(CH$_2$)$_n$CH$_3$, where n is from 1 to 10, and preferably n is from 1 to 9, more preferably from 1 to 7, and even more preferably from 1 to 5.

Additional primary-secondary diamines include, but are not limited to N-ethylethylenediamine, N-phenylethylenediamine, N-phenyl-1,2-phenylenediamine, N-phenyl-1,4-phenylenediamine, and N-(2-hydroxyethyl)-ethylenediamine. Examples of preferred primary-secondary diamines of structure (I):

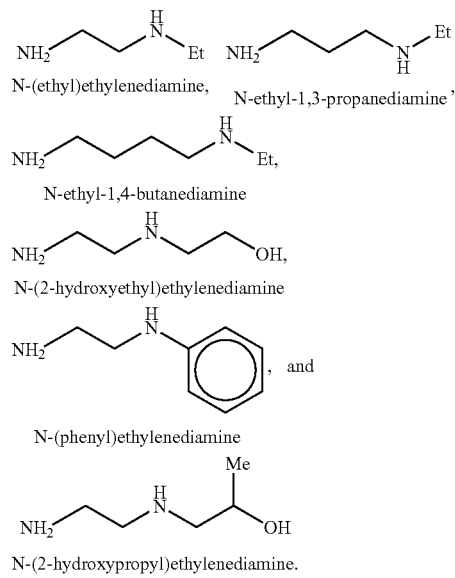

The alkanolamine is a compound containing an amine group and at least one hydroxyl group, preferably only one hydroxyl group. The amine can be a primary or a secondary amine, and is preferably a primary amine. The polyamine is a compound that contains at least two amine groups, preferably only two amine groups.

Suitable alkanolamines are those of structure (II):

H$_2$N—R$_1$—OH           (II).

In structure (II), R$_1$ is a divalent hydrocarbon radical, and preferably a linear hydrocarbon of the formula —(CH$_2$)$_n$—, where n is greater than, or equal to, 2, and preferably n is from 2 to 10, more preferably from 2 to 8, and even more preferably from 2 to 6.

Additional alkanolamines include, but are not limited to, ethanolamine, 2-amino-1-propanol, 3-amino-1-propanol, 2-amino-1-butanol and 2-aminobenzyl alcohol.

Examples of preferred alkanolamines of structure (II) are shown:

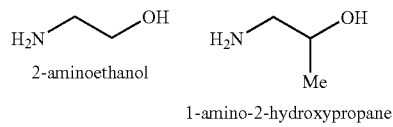

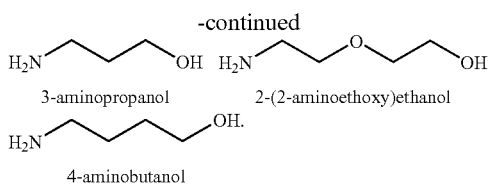

3-aminopropanol        2-(2-aminoethoxy)ethanol 4-aminobutanol

Additional examples of suitable alkanolamines and suitable diamines, are represented by structure (III):

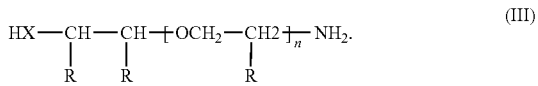

In structure (III), X is O, or X=NR' (R'=alkyl); and each R is independently H, $CH_3$, or $CH_2CH_3$; and n is from 0 to 50. The disclosure and preparation of hydroxylamines can be found in U.S. Pat. Nos. 3,231,619; 4,612,335; and 4,888,446. Examples of preferred alkanolamines include 2-aminoethanol, 1-amino-2-propanol, 2-amino-1-propanol, 3-amino-1-propanol, 2-(2-aminoethoxy)ethanol, 1-amino-2-butanol, 2-amino-3-butanol, and polyoxyalkylene glycol amines. A preferred alkanolamine is 2-aminoethanol.

In one embodiment, a maleic anhydride polyolefin is functionalized with a primary-secondary diamine or with an alkanolamine.

In a further embodiment, the level of maleic anhydride used, is from 0.10 weight percent to 5.0 weight percent, preferably from 0.50 weight percent to 3.0 weight percent, and more preferably from 1.0 weight percent to 2.0 weight percent, based on the weight of the unfunctionalized grafted polyolefin.

In a further embodiment, the level of peroxide used, is from 0.01 weight percent to 0.5 weight percent, preferably from 0.05 weight percent to 0.3 weight percent, and more preferably from 0.1 weight percent to 0.2 weight percent, based on the weight of the unfunctionalized grafted polyolefin.

In yet a further embodiment, the level of primary-secondary diamine or alkanolamine used, is from 1 to 10 mole equivalents, preferably from 2 to 8 mole equivalents, and more preferably from 4 to 6 mole equivalents of amine, relative to grafted anhydride.

In-Situ Functionalization Reactions Using Maleamic Acid

Hydroxy- and amino-functionalized ethylene-octene copolymers can also be prepared in one step by peroxide-initiated grafting of the corresponding maleamic acids, or derivative thereof, which is formed by reaction of maleic anhydride and alkanolamine or primary-secondary diamine.

Maleamic acids are shown in structure (IV):

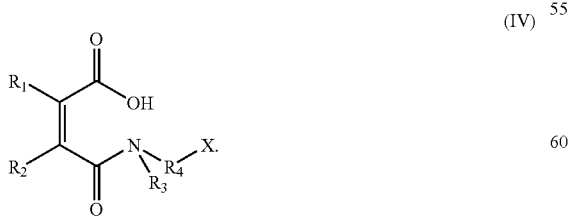

In structure (IV), $R_1$ and $R_2$ are, independently, either hydrogen or a $C_1$-$C_{20}$ hydrocarbyl radical, which is linear or branched; $R_3$ is hydrogen or a $C_1$-$C_{20}$ hydrocarbyl radical, which is linear or branched; $R_4$ is a hydrocarbyl di-radical, which is linear or branched; X is OH or $NHR_5$, where $R_5$ is a hydrocarbyl radical, which linear or branched, or a hydroxyethyl group. In a preferred embodiment, $R_1$ and $R_2$ are, independently, either hydrogen, or a $C_1$-$C_{10}$, preferably a $C_1$-$C_8$, and more preferably a $C_1$-$C_6$, hydrocarbyl radical, which is linear or branched. In a preferred embodiment, $R_3$ is either hydrogen, or a $C_1$-$C_{10}$, preferably a $C_1$-$C_8$, and more preferably a $C_1$-$C_6$, hydrocarbyl radical, which is linear or branched. In a preferred embodiment, $R_4$ is a $C_1$-$C_{20}$, preferably a $C_1$-$C_{10}$, and more preferably a $C_1$-$C_8$, and even more preferably a $C_1$-$C_6$ hydrocarbyl radical, which is linear or branched.

In a preferred embodiment, $R_5$ is a $C_1$-$C_{20}$, preferably a $C_1$-$C_{10}$, and more preferably a $C_1$-$C_8$, and even more preferably a $C_1$-$C_6$ hydrocarbyl radical, which is linear or branched. In another embodiment, $R_5$ is a linear —$(CH_2)_n$—$CH_3$, where n is greater than, or equal to 1, and preferably n is from 1 to 9, more preferably from 1 to 7, and even more preferably from 1 to 5. Additional examples of $R_5$, include, but are not limited to, the following structures: —$CH_3$, —$CH_2CH_3$, —$CH_2CH_2CH_3$, —$CH_2CH_2CH_2CH_3$, —$CH_2(CH_3)CH_3$, —$CH_2(CH_3)CH_2CH_3$, —$CH_2CH_2(CH_3)CH_3$, —$CH_2(CH_3)CH_2CH_2CH_3$, —$CH_2CH_2(CH_3)CH_2CH_3$, and —$CH_2CH_2CH_2(CH_3)CH_3$.

Additional maleamic acid structures encompassed by structure (IV):

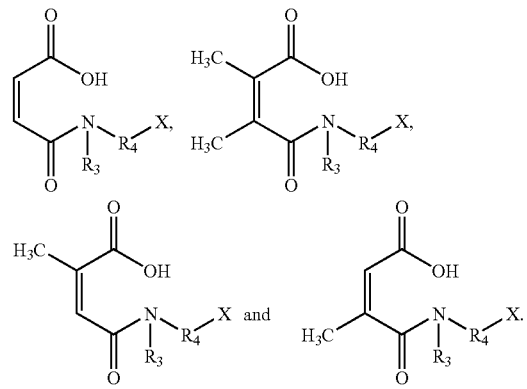

Preferably, the maleamic acid is of structure (V):

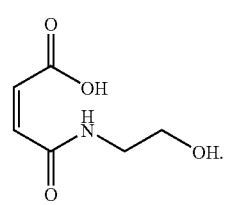

The polyolefin is functionalized with a maleamic acid as shown in structure (V).

In one embodiment, the level of maleamic acid used, is from 0.10 weight percent to 5.0 weight percent, preferably from 0.50 weight percent to 3.0 weight percent, and more preferably from 1.0 weight percent to 2.0 weight percent, based on the weight of the unfunctionalized grafted polyolefin.

In a further embodiment, the level of peroxide used, is from 0.01 weight percent to 1 weight percent, preferably from 0.01 weight percent to 0.5 weight percent, and more preferably from 0.05 weight percent to 0.3 weight percent, and even more preferably from 0.1 weight percent to 0.2 weight percent, based on the amount of unfunctionalized grafted polyolefin.

Diamine Imbibe Process

The polyolefins as described may also be functionalized using a diamine imbibing process. Here, a polyolefin is first functionalized with a group reactive with amine functionality. Preferably, the polyolefin is functionalized with an anhydride group. At least one diamine is mixed with the functionalized polyolefin at a temperature below the melting point of the polyolefin, and preferably at room temperature. The diamine is allowed to absorb or imbibe into the polyolefin, and reacts with diamine reactive group to form a succinamic acid. The reaction of the diamine with the diamine reactive functional group to form the imide ring, can then be completed by subjecting the mixture to a thermal treatment, such as in a melt extrusion process. Suitable diamines include those diamines previously discussed. The imbibing process helps to ensure that the diamine is thoroughly mixed with the polyolefin for an efficient functionalization reaction.

Suitable primary-secondary diamines include compounds of structure (I), as previously discussed:

$$H_2N—R_1—NH—R_2 \quad (I).$$

For use of structure (I) in this instance, $R_1$ is a divalent hydrocarbon radical, and preferably a linear hydrocarbon of the formula $—(CH_2)_n—$, where n is greater than, or equal to, 2, and preferably n is from 2 to 10, more preferably from 2 to 8, and even more preferably from 2 to 6. $R_2$ is a monovalent hydrocarbon radical containing at least 1 carbon atom, and optionally may be substituted with a heteroatom containing group, such as OH or SH. Preferably, $R_2$ a linear hydrocarbon of the formula $—(CH_2)_n—CH_3$, where n is from 0 to ten, and preferably n is from 0 to 9, more preferably from 0 to 7, and even more preferably from 0 to 5.

Suitable primary-secondary diamines include, but are not limited to, N-methyl-ethylenediamine, N-ethylethylenediamine, N-phenylethylenediamine, N-methyl-1,3-propanediamine, N-methylethylenediamine, N-phenyl-1,2-phenylenediamine, N-phenyl-1,4-phenylenediamine, 1-(2-aminoethyl)-piperazine, and N-(2-hydroxyethyl)-ethylenediamine. Examples of preferred primary-secondary diamines of structure (I) for use in the imbibing process are shown:

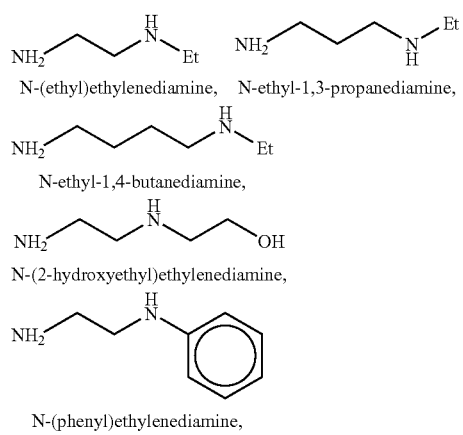

N-(ethyl)ethylenediamine, N-ethyl-1,3-propanediamine,

N-ethyl-1,4-butanediamine,

N-(2-hydroxyethyl)ethylenediamine,

N-(phenyl)ethylenediamine,

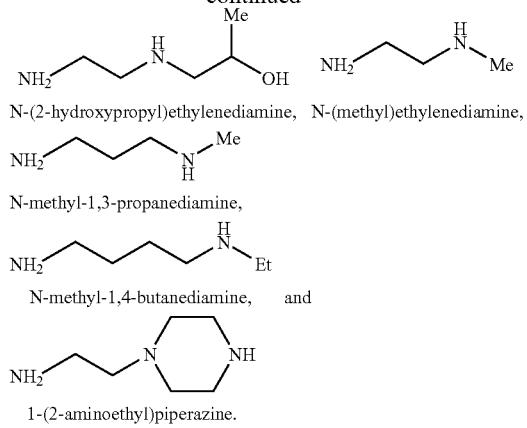

N-(2-hydroxypropyl)ethylenediamine, N-(methyl)ethylenediamine,

N-methyl-1,3-propanediamine,

N-methyl-1,4-butanediamine, and 1-(2-aminoethyl)piperazine.

Polyolefin Polymers Used as Base Polymer in the Grafting and Functionalization Reactions Examples of polyolefins include high density polyethylene (HDPE), low density polyethylene (LDPE), linear low density polyethylene (LLDPE), linear ethylene/α-olefin interpolymers, or substantially linear ethylene/α-olefin interpolymers.

Suitable base polymers also include polypropylene homopolymers and propylene copolymers, and other polyolefins, such as those formed from one or more C4-C20 α-olefins. The polyolefins may optionally contain copolymerizable conjugated dienes, non-conjugated dienes and/or vinyl monomers. Such polyolefins may be crystalline, partially crystalline or amorphous.

An ethylene-based polymer may comprise a combination of two or more embodiments as described.

1. Ethylene-Base Polymers

As discussed previously, suitable ethylene-base polymers include, for example, high density polyethylene (HDPE), linear low density polyethylene (LLDPE), ultra low density polyethylene (ULDPE), homogeneously branched linear ethylene polymers, and homogeneously branched substantially linear ethylene polymers (that is homogeneously branched long chain branched ethylene polymers).

High density polyethylene (HDPE), useful as a polyolefin resin, typically has a density of 0.94 to 0.97 g/cc. Commercial examples of HDPE are readily available in the market. Other suitable ethylene polymers include low density polyethylene (LDPE), linear low density polyethylene (LLDPE), and linear very low density polyethylene (VLDPE). Typically the low density polyethylene (LDPE) is made under high-pressure, using free-radical polymerization conditions. Low density polyethylene typically has a density from 0.91 to 0.94 g/cc.

Linear low density polyethylene (LLDPE) is characterized by little, if any, long chain branching, in contrast to conventional LDPE. The processes for producing LLDPE are well known in the art and commercial grades of this polyolefin resin are available. Generally, LLDPE is produced in gas-phase fluidized bed reactors or liquid phase solution process reactors, using a Ziegler-Natta catalyst system.

The linear low density polyethylene (LLDPE), ultra low density polyethylene (ULDPE), homogeneously branched linear ethylene interpolymers, or homogeneously branched substantially linear ethylene interpolymer, typically have polymerized therein at least one α-olefin. The term "interpolymer" used herein indicates the polymer can be a copolymer, a terpolymer or any polymer having more than one polymerized monomer. Monomers usefully copolymerized with ethylene to make the interpolymer include the $C_3$-$C_{20}$ α-olefins, and especially propylene, 1-butene, 1-pentene, 1-hexene, 4-methyl-1-pentene, 1-heptene and 1-octene. Especially preferred comonomers include propylene, 1-butene, 1-hexene and 1-octene.

Overall, suitable ethylene polymers have a melt index, $I_2$, less than, or equal to, 1000 g/10 min, preferably less than, or equal to, 500 g/10 min, more preferably less than, or equal to, 100 g/10 min, most preferably less than, or equal to, 50 g/10 min, as measured in accordance with ASTM 1238, Condition 190° C./2.16 kg.

Commercial examples of suitable ethylene-base interpolymers include ATTANE™, AFFINITY™, DOWLEX™, ELITE™, all available from The Dow Chemical Company; and EXCEED™ and EXACT™ available from Exxon Chemical Company.

The terms "homogeneous" and "homogeneously-branched" are used in reference to an ethylene/α-olefin interpolymer, in which the α-olefin comonomer is randomly distributed within a given polymer molecule, and substantially all of the polymer molecules have the same ethylene-to-comonomer ratio. The homogeneously branched ethylene interpolymers that can be used in the practice of this invention include linear ethylene interpolymers, and substantially linear ethylene interpolymers.

Included amongst the homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, made using uniform branching distribution polymerization processes, as described, for example, by Elston in U.S. Pat. No. 3,645,992. Commercial examples of homogeneously branched linear ethylene/α-olefin interpolymers include TAFMER™ polymers supplied by the Mitsui Chemical Company and EXACT™ polymers supplied by ExxonMobil Chemical Company.

The substantially linear ethylene interpolymers used in the present invention are described in U.S. Pat. Nos. 5,272,236; 5,278,272; 6,054,544; 6,335,410 and 6,723,810. The substantially linear ethylene interpolymers are those in which the comonomer is randomly distributed within a given interpolymer molecule, and in which substantially all of the interpolymer molecules have the same ethylene/comonomer ratio within that interpolymer. In addition, the substantially linear ethylene interpolymers are homogeneously branched ethylene interpolymers having long chain branching. The long chain branches have the same comonomer distribution as the polymer backbone, and can have about the same length as the length of the polymer backbone. "Substantially linear," typically, is in reference to a polymer that is substituted, on average, with 0.01 long chain branches per 1000 total carbons (including both backbone and branch carbons) to 3 long chain branches per 1000 total carbons. The length of a long chain branch is longer than the carbon length of a short chain branch formed from the incorporation of one comonomer into the polymer backbone.

In contrast to "substantially linear ethylene polymer," "linear ethylene polymer" means that the polymer lacks measurable or demonstrable long chain branches, that is, the polymer is substituted with an average of less than 0.01 long chain branch per 1000 total carbons.

In a preferred embodiment, an ethylene-based interpolymer is used as the base polymer in the grafting reaction. In a further embodiment, the ethylene-based interpolymer is an ethylene/α-olefin interpolymer, comprising at least one α-olefin.

2. Propylene-Based Polymers

Suitable propylene-based interpolymers include propylene homopolymers, propylene interpolymers, as well as reactor copolymers of polypropylene (RCPP), which can contain 1 to 20 weight percent ethylene or an α-olefin comonomer of 4 to 20 carbon atoms. The polypropylene homopolymer can be isotactic, syndiotactic or atactic polypropylene. The propylene interpolymer can be a random or block copolymer, or a propylene-based terpolymer.

The propylene polymer may be crystalline, semi-crystalline or amorphous. A crystalline polypropylene polymer typically has at least 90 mole percent of its repeating units derived from propylene, preferably at least 97 percent, more preferably at least 99 percent.

Suitable comonomers for polymerizing with propylene include ethylene, 1-butene, 1-pentene, 1-hexene, 1-heptene, 1-octene, 1-nonene, 1-decene, 1-unidecene, 1dodecene, as well as 4-methyl-1-pentene, 4-methyl-1-hexene, 5-methyl-1-hexene, vinylcyclohexane, and styrene. The preferred comonomers include ethylene, 1-butene, 1-hexene, and 1-octene, and more preferably ethylene.

The propylene interpolymers of particular interest include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene.

Polypropylene polymers include Shell's KF 6100 homopolymer polypropylene; Solvay's KS 4005 polypropylene copolymer; Solvay's KS 300 polypropylene terpolymer; and INSPIRE™ polypropylene resins available from The Dow Chemical Company.

The propylene-based polymer used in the present invention may be of any molecular weight distribution ("MWD"). Propylene-based polymers of broad or narrow MWD are formed by means within the skill in the art. Propylene-based polymers having a narrow MWD can be advantageously provided by visbreaking or by manufacturing reactor grades (non visbroken) using single-site catalysis, or by both methods.

The propylene-based polymer can be reactor-grade, visbroken, branched or coupled to provide increased nucleation and crystallization rates. Suitably branched propylene-based polymers for use in the present invention are commercially available, for instance from Montell North America, under the trade designations Profax PF-611 and PF-814. Alternatively, suitable branched or coupled propylene-based polymers can be prepared by means, within the skill in the art, such as by peroxide or electron-beam treatment, for instance as disclosed by DeNicola et al., in U.S. Pat. No. 5,414,027 (the use of high energy (ionizing) radiation in a reduced oxygen atmosphere); European Patent No. 0190889 (Himont; electron beam irradiation of isotactic polypropylene at lower temperatures); U.S. Pat. No. 5,464,907 (Akzo Nobel NV); European Patent No. 0754711 (Solvay; peroxide treatment); and U.S. patent application Ser. No. 09/133,576 (filed Aug. 13, 1998; azide coupling agents).

Suitable propylene/α-olefin interpolymers, containing at least 50 mol percent polymerized propylene, fall within the invention. Suitable polypropylene base polymers include VERSIFY™ polymers (The Dow Chemical Company) and VISTAMAXX™ polymers (ExxonMobil Chemical Co.), LICOCENE™ polymers (Clariant), EASTOFLEX™ polymers (Eastman Chemical Co.), REXTAC™ polymers (Hunstman), and VESTOPLAST™ polymers (Degussa). Other suitable polymers include propylene-α-olefins block copolymers and interpolymers, and other propylene based block copolymers and interpolymers known in the art.

3. Polyolefin Blends

In another embodiment, a blend of two of more polyolefins is subject to functionalization reactions, such as a blend of an ethylene-base polymer, as discussed above, and a propylene-base polymer, as discussed above. The functionalized polymers may also be used as a concentrate that can be mixed or blended with unfunctionalized polyolefin to achieve lower net levels of functionality in the final product.

4. Additional Reactions and Blends

The amine functionalized polyolefin or hydroxyl functionalized polyolefin, each according to the invention, may be reacted or blended with a second polymer by melt reaction, for example, in a Brabender mixer or an extruder. This may be conducted in the same reactor as the functionalization reaction, or subsequently, in another melt reactor. The reaction time and temperature will depend on the polymers present. Thus, for example, amino functionalized polypropylene (amino-PP) may be melt reacted/blended with a blend of styrene-maleic acid polymer in polypropylene.

Similarly, polyolefin blends containing a polyolefin, an aminated polyolefin and other polymer, such as an engineering thermoplastic that is reactive with, or otherwise compatible with, the aminated polyolefin, can be prepared having improved overall blend compatibility between the polyolefin, other polymer, and aminated polyolefin. In addition, the functionalized polyolefins or blends can be blended with one or more thermoplastic or thermosetting polymers, and used in other applications.

Thermoplastic polymers include the natural or synthetic resins, such as, for example, styrene block copolymers, rubbers, linear low density polyethylene (LLDPE), high density polyethylene (HDPE), low density polyethylene (LDPE), ethylene/vinyl acetate (EVA) copolymer, ethylene-carboxylic acid copolymers (EAA), ethylene acrylate copolymers, polybutylene, polybutadiene, nylons, polycarbonates, polyesters, polypropylene, ethylene-propylene interpolymers such as ethylene-propylene rubber, ethylene-propylene-diene monomer rubbers, chlorinated polyethylene, thermoplastic vulcanates, ethylene ethylacrylate polymers (EEA), ethylene styrene interpolymers (ESI), polyurethanes, as well as graft-modified olefin polymers, and combinations of two or more of these polymers.

The blend compositions of the present invention can be used in a variety of applications including thermoforming, blow molding, injection molding and overmolding, calendering, fiber forming processes, wire and cable, extrusion coatings and dispersions.

Processing aids, such as plasticizers, can also be included in either the individual blend components or added to the final blend. These include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil such as Kaydol™ oil (available from and a registered trademark of Witco) and Shellflex™ 371 naphthenic oil (available from and a registered trademark of Shell Oil Company). Another suitable oil is Tuflo™ oil (available from and a registered trademark of Lyondell).

Additives

Typically polymers and resins used in the invention are treated with one or more stabilizers, for example, antioxidants, such as Irganox™ 1010 and Irgafos™ 168, both supplied by Ciba Specialty Chemicals. Polymers are typically treated with one or more stabilizers before an extrusion or other melt processes. Other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents.

Thermoplastic Polyurethanes

The polyurethane component has no limitation in respect of its formulation, other than the requirement that it be thermoplastic in nature, which means it is prepared from substantially difunctional ingredients, for example, organic diisocyanates and components being substantially difunctional in active hydrogen containing groups. However, sometimes minor proportions of ingredients with functionalities higher than two may be employed. This is particularly true when using extenders such as glycerin or trimethylolpropane. Such thermoplastic polyurethane compositions are generally referred to as "TPU" materials. Accordingly, any of the TPU materials known in the art can be employed in the present compositions. For representative teaching on the preparation of TPU materials, see Polyurethanes: Chemistry and Technology, Part II, Saunders and Frisch, 1964 pp 767 to 769, Interscience Publishers, New York, N.Y. and Polyurethane Handbook, Edited by G. Oertel 1985, pp 405 to 417, Hanser Publications, distributed in U.S.A. by Macmillan Publishing Co., Inc., New York, N.Y. For particular teaching on various TPU materials and their preparation, see U.S. Pat. Nos. 2,929,800; 2,948,691; 3,493,634; 3,620,905; 3,642,964; 3,963,679; 4,131,604; 4,169,196; Re 31,671; 4,245,081; 4,371,684; 4,379,904; 4,447,590; 4,523,005; 4,621,113; and 4,631,329.

The preferred TPU is a polymer prepared from a mixture comprising an organic diisocyanate, at least one polymeric diol and at least one difunctional extender. The TPU may be prepared by the prepolymer, quasi-prepolymer, or one-shot methods in accordance with the methods described in the incorporated references above.

Diisocyanates suitable for use in preparing the hard segment of the polyurethanes according to this invention include aromatic, aliphatic, and cycloaliphatic diisocyanates and combinations of two or more of these compounds. An example of a structural unit derived from diisocyanate (OCN—R—NCO) is represented by structure (VI):

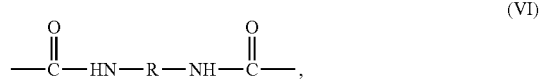

(VI)

in which R is an alkylene, cycloalkylene, or arylene group. Representative examples of these diisocyanates can be found in U.S. Pat. Nos. 4,385,133; 4,522,975; and 5,167,899. Preferred diisocyanates include, but are not limited to, 4,4'-diisocyanatodiphenylmethane, p-phenylene diisocyanate, 1,3-bis(isocyanatomethyl)-cyclohexane, 1,4-diisocyanato-cyclohexane, hexamethylene diisocyanate, 1,5-naphthalene diisocyanate, 3,3'-dimethyl-4,4'-biphenyl diisocyanate, 4,4'-diisocyanato-dicyclohexylmethane, and 2,4-toluene diisocyanate. More preferred are 4,4'-diisocyanato-dicyclohexylmethane and 4,4'-diisocyanato-diphenylmethane. A preferred is 4,4'-diisocyanatodiphenylmethane.

Diisocyanates also include aliphatic and cycloaliphatic isocyanate compounds, such as 1,6-hexamethylene-diisocyanate; ethylene diisocyanate; 1-isocyanato-3,5,5-trimethyl-1-3-isocyanatomethylcyclohexane; 2,4- and 2,6-hexahydrotoluenediisocyanate, as well as the corresponding isomeric mixtures; 4,4'-, 2,2'- and 2,4'-dicyclohexyl-methanediisocyanate, as well as the corresponding isomeric mixtures. Also, 1,3-tetramethylene xylene diisocyanate can be used with the present invention. The isocyanate may be selected from organic isocyanates, modified isocyanates, isocyanate-based pre-polymers, and mixtures of two or more of these isocyanates.

Any of the organic diisocyanates previously employed in TPU preparation can be employed, including aromatic, aliphatic, and cycloaliphatic diisocyanates, and mixtures thereof. Illustrative isocyanates include, but are not limited to, methylenebis(phenyl isocyanate), including the 4,4'-isomer, the 2,4'-isomer and mixtures thereof; m- and p-phenylene diisocyanates; chlorophenylene diisocyanates; $\alpha,\alpha'$-xylylene diisocyanate; 2,4- and 2,6-toluene diisocyanate and the mixtures of these latter two isomers, which are available commercially; tolidine diisocyanate; hexamethylene diisocyanate; 1,5-naphthalene diisocyanate; isophorone diisocyanate; cycloaliphatic diisocyanates, such as methylenebis(cyclohexyl isocyanate), including the 4,4'-isomer, the 2,4'-isomer and mixtures thereof, and all the geometric isomers thereof, including trans/trans, cis/trans, cis/cis, and mixtures thereof; cyclohexylene diisocyanates (1,2-; 1,3-; or 1,4-); 1-methyl-2,5-cyclohexylene diisocyanate; 1-methyl-2,4-cyclohexylene diisocyanate; 1-methyl-2,6-cyclohexylene diisocyanate; 4,4'-isopropylidenebis-(cyclohexyl isocyanate); 4,4'-diisocyanatodicyclohexyl, and all geometric isomers and mixtures thereof.

Also included are the modified forms of methylenebis(phenyl isocyanate). By the latter are meant those forms of methylenebis(phenyl isocyanate) which have been treated to render them stable liquids at ambient temperature (circa 20° C.). Such products include those which have been reacted with a minor amount (up to about 0.2 equivalents per equivalent of polyisocyanate) of an aliphatic glycol or a mixture of aliphatic glycols, such as the modified methylenebis(phenyl isocyanates) described in U.S. Pat. Nos. 3,394,164; 3,644,457; 3,883,571; 4,031,026; 4,115,429; 4,118,411; and 4,299,347. The modified methylenebis(phenyl isocyanates) also include those, which have been treated so as to convert a minor proportion of the diisocyanate to the corresponding carbodiimide, which then interacts with further diisocyanate to form uretone-imine groups, the resulting product being a stable liquid at ambient temperatures as described, for example, in U.S. Pat. No. 3,384,653. Mixtures of any polyisocyanates can be employed if desired.

Suitable classes of organic diisocyanates include the aromatic and cycloaliphatic diisocyanates. Preferred species within these classes are methylenebis(phenyl isocyanate) including the 4,4'-isomer, the 2,4'-isomer, and mixtures thereof, and methylenebis(cyclohexyl isocyanate), inclusive of the isomers described above. In a preferred embodiment the isocyanate is a mixture of 1,3-bis(isocyanatomethyl)cyclohexane and 1,4-bis(isocyanatomethyl)cyclohexane. In a further embodiment, these two isocyanates are present in a weight ratio of about 1 to 1.

The polymeric diols which can be used include those conventionally employed in the art for the preparation of TPU elastomers. The polymeric diols are responsible for the formation of soft segments in the resulting polymer, and preferably have molecular weights (number average) falling in the range from 200 to 10,000 g/mole, preferably from 400 to 4,000 g/mole, and, more preferably from 500 to 3,000 g/mole. It is not unusual, and, in some cases, it can be advantageous, to employ more than one polymeric diol. Exemplary of the diols are polyether diols, polyester diols, hydroxy-terminated polycarbonates, hydroxy-terminated polybutadienes, hydroxy-terminated polybutadiene-acrylonitrile copolymers, hydroxy-terminated copolymers of dialkyl siloxane and alkylene oxides, such as ethylene oxide, propylene oxide, and mixtures, in which any of the above polyols are employed as major component (greater than 50 percent w/w) with amine-terminated polyethers and amino-terminated polybutadiene-acrylonitrile copolymers. Additional examples of the diols include the natural oil diols.

Suitable polyether polyols include polyoxyethylene glycols, polyoxypropylene glycols, which, optionally, have been capped with ethylene oxide residues; random and block copolymers of ethylene oxide and propylene oxide; polytetramethylene glycol; random and block copolymers of tetrahydrofuran and ethylene oxide and/or propylene oxide; and products derived from any of the reactions with di-functional carboxylic acids or esters derived from said acids, in which latter case, ester interchange occurs, and the esterifying radicals are replaced by polyether glycol radicals. The preferred polyether polyols are random and block copolymers of ethylene and propylene oxide of functionality about 2.0 and polytetramethylene glycol polymers of functionality about 2.0.

Suitable polyester polyols include those prepared by polymerizing ε-caprolactone using an initiator such as ethylene glycol, ethanolamine; and those prepared by esterification of polycarboxylic acids such as phthalic, terephthalic, succinic, glutaric, adipic azelaic, acids, with polyhydric alcohols, such as ethylene glycol, butanediol, and cyclohexanedimethanol.

Suitable amine-terminated polyethers are the aliphatic primary diamines structurally derived from polyoxypropylene glycols. Polyether diamines of this type were available from Jefferson Chemical Company under the trademark JEFFAMINE (now available from Basell).

Suitable polycarbonates containing hydroxyl groups include those prepared by reaction of diols, such as propane-1,3-diol, butane-1,4-diol, hexan-1,6-diol, 1,9-nonanediol, 2-methyloctane-1,8-diol, diethylene glycol, triethylene glycol, dipropylene glycol, with diarylcarbonates, such as diphenylcarbonate, or with phosgene.

Suitable silicon-containing polyethers include the copolymers of alkylene oxides with dialkylsiloxanes, such as dimethylsiloxane, (see, for example, U.S. Pat. Nos. 4,057,595 and 4,631,329.

Suitable hydroxy-terminated polybutadiene copolymers include the compounds available under the trade name Poly BD Liquid Resins from Arco Chemical Company. Hydroxy-terminated polybutadiene copolymers are also available from Sartomer. Illustrative of the hydroxy- and amine-terminated butadiene/acrylonitrile copolymers are the materials available under the trade name HYCAR hydroxyl-terminated (HT) Liquid Polymers and amine-terminated (AT) Liquid Polymers, respectively. Preferred diols are the polyether and polyester diols set forth previously.

The difunctional extender employed can be any of those known in the TPU art. Typically the extenders can be aliphatic straight and branched chain diols having from 2 to 10 carbon atoms, inclusive, in the chain. Illustrative of such diols are ethylene glycol, 1,3-propanediol, 1,4-butanediol, 1,5-pentanediol, 1,6-hexanediol, neopentyl glycol; 1,4-cyclohexanedimethanol; hydroquinonebis-(hydroxyethyl)ether; cyclohexylenediols (1,4-, 1,3-, and 1,2-isomers), isopropylidenebis(cyclohexanols); diethylene glycol, dipropylene glycol, ethanolamine, N-methyl-diethanolamine; and mixtures of any of the above. As noted previously, in some cases, minor proportions (less than about 20 equivalent percent) of the difunctional extender may be replaced by trifunctional extenders, without detracting from the thermoplasticity of the resulting TPU; illustrative of such extenders are glycerol, trimethylolpropane.

While any of the diol extenders, described previously, can be employed alone, or in admixture, it is preferred to use 1,4-butanediol, 1,6-hexanediol, neopentyl glycol, 1,4-cyclohexanedimethanol, ethylene glycol, and diethylene glycol, either alone, or in admixture, with each other, or with one or more aliphatic diols previously named. Particularly preferred diols are 1,4-butanediol, 1,6-hexanediol and 1,4-cyclohexanedimethanol.

The chain extender is incorporated into the polyurethane in amounts determined by the selection of the specific reactant components, the desired amounts of the hard and soft segments, and the index sufficient to provide good mechanical properties, such as modulus and tear strength. The polyurethane compositions used in the practice of this invention may contain from 2 to 25, preferably from 3 to 20 and more preferably from 4 to 18, wt percent of the chain extender component.

If desired, optionally, small amounts of monohydroxyl-functional or monoaminofunctional compounds, often termed "chain stoppers," may be used to control molecular weight. Illustrative of such chain stoppers are the propanols, butanols, pentanols, and hexanols. When used, chain stoppers are typically present in minor amounts from 0.1 to 2 weight percent of the entire reaction mixture leading to the polyurethane composition.

The equivalent proportions of polymeric diol to said extender can vary considerably depending on the desired hardness for the TPU product. Generally speaking, the proportions fall within the respective range of from 1:1 to 1:20, preferably from 1:2 to 1:10. At the same time the overall ratio of isocyanate equivalents to equivalents of active hydrogen containing materials is within the range of 0.90:1 to 1.10:1, and preferably, 0.95:1 to 1.05:1.

The TPU forming ingredients can be reacted in organic solvents, but are preferably reacted, in the absence of solvent, by melt-extrusion, at a temperature of from 125° C. to 250° C., preferably from 160° C. to 225° C.

It is frequently desirable, but not essential, to include a catalyst in the reaction mixture employed to prepare the compositions of the invention. Any of the catalysts, conventionally employed in the art, to catalyze the reaction of an isocyanate with a reactive hydrogen containing compound, can be employed for this purpose; see, for example, Saunders et al., Polyurethanes, Chemistry and Technology, Part I, Interscience, New York, 1963, pages 228-232; see also, Britain et al., J. Applied Polymer Science, 4, 207-211, 1960. Such catalysts include organic and inorganic acids salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin dioctoate, and dibutyltin dilaurate. Representative tertiary organic amine catalysts are triethylamine; triethylenediamine; N,N,N',N'-tetramethylethylenediamine; N,N,N',N'-tetraethylethylenediamine; N-methylmorpholine; N-ethylmorpholine; N,N,N',N'-tetramethylguanidine; N,N,N',N'-tetramethyl-1,3-butanediamine; N,N-dimethylethanolamine; N,N-diethylethanolamine. The amount of catalyst employed, is generally within the range of 0.02 to 2.0 percent by weight, based on the total weight of the reactants.

As discussed previously, the polyurethanes can be prepared by mixing all ingredients, at essentially the same time in a "one-shot" process, or can be prepared by step-wise addition of the ingredients in a "prepolymer process," with the processes being carried out in the presence of, or without the addition of, optional additives. The polyurethane forming reaction can take place in bulk, or in solution, with, or without, the addition of a suitable catalyst that would promote the reaction of isocyanates with hydroxyl or other functionality. Examples of a typical preparation of these polyurethanes are described in U.S. Pat. No. 5,864,001.

As discussed previously, the other main component of the hard segment of the polyurethanes of the present invention is at least one chain extender, which are well know in this technology field. As is known, when the chain extender is a diol, the resulting product is a thermoplastic polyurethane (TPU). When the chain extender is a diamine or an amino alcohol, the resulting product is technically a thermoplastic polyurea (TPUU).

The chain extenders that may be used in the invention are characterized by two or more, preferably two, functional groups, each of which contains "active hydrogen atoms." These functional groups are preferably in the form of hydroxyl, primary amino, secondary amino, or mixtures of two or more of these groups. The term "active hydrogen atoms" refers to hydrogen atoms that, because of their placement in a molecule, display activity according to the Zerewitinoff test as described by Kohler in *J. Am. Chemical Soc.*, 49, 31-81 (1927).

The chain extenders may be aliphatic, cycloaliphatic, or aromatic and are exemplified by diols, diamines, and amino alcohols. Illustrative of the difunctional chain extenders are ethylene glycol, diethylene glycol, propylene glycol, dipropylene glycol, 1,3-propanediol, 1,3-butanediol, 1,4-butanediol, 1,5-pentanediol and other pentane diols, 2-ethyl-1,3-hexanediol, 2-ethyl-1,6-hexanediol, other 2-ethyl-hexanediols, 1,6-hexanediol and other hexanediols, 2,2,4-trimethylpentane-1,3-diol, decanediols, dodecanediols, bisphenol A, hydrogenated bisphenol A, 1,4-cyclohexanediol, 1,4-bis(2-hydroxyethoxy)-cyclohexane, 1,3-cyclohexanedimethanol, 1,4-cyclohexanediol, 1,4-bis(2-hydroxyethoxy)benzene, Esterdiol 204 (propanoic acid, 3-hydroxy-2,2-dimethyl-, 3-hydroxy-2,2-dimethylpropyl ester available from TCI America), N-methylethanolamine, N-methyl isopropylamine, 4-aminocyclo-hexanol, 1,2-diaminotheane, 1,3-diaminopropane, diethylenetriamine, toluene-2,4-diamine, and toluene-1,6-diamine. Aliphatic compounds containing from 2 to 8 carbon atoms are preferred. If thermoplastic or soluble polyurethanes are to be made, the chain extenders will be difunctional in nature. Amine chain extenders include, but are not limited to, ethylenediamine, monomethanolamine, and propylenediamine.

Commonly used linear chain extenders are generally diol, diamine or amino alcohol compounds characterized by having a molecular weight of not more than 400 g/mol (or Dalton). In this context, by "linear" it is meant that no branching from tertiary carbon is included. Examples of suitable chain extenders are represented by the structures such as HO—$(CH_2)_n$—OH, $H_2N$—$(CH_2)_n$—$NH_2$, and $H_2N$—$(CH_2)_n$—OH, where "n" is typically a number from 1 to 50.

One common chain extender is 1,4-butane diol ("butane diol" or "BDO"), and is represented by the structure HO—$CH_2CH_2CH_2CH_2$—OH. Other suitable chain extenders include ethylene glycol; diethylene glycol; 1,3-propanediol; 1,6-hexanediol; 1,5-heptanediol; triethyleneglycol;

1,2-ethyl hexenediol (EHD diol); and combinations of two or more of these extenders. In one embodiment, the chain extender is 1,2-ethyl hexenediol (EHD diol).

Also suitable, are cyclic chain extenders which are generally diol, diamine or amino alcohol compounds characterized by having a molecular weight of not more than 400 g/mol. In this context, by "cyclic" it is meant a ring structure, and typical ring structures include, but are not limited to, the 5 to 8 member ring structures with hydroxyl-alkyl branches. Examples of cyclic chain extender are represented by structures such as HO—R-(ring)-R'—OH and HO—R—O-(ring)-O—R'—OH, where R and R' are one to five carbon alkyl chains, and each ring has 5 to 8 members, preferably all carbons. In these examples, one or both of the terminal —OH can be replaced with —NH$_2$. Suitable cyclic chain extenders include cyclohexane dimethanol ("CHDM") and hydroquinone bis-2-hydroxyethyl ether (HQEE). A structural unit of CHDM, a preferred cyclic chain extender, is represented by the structure HO—CH$_2$-(cyclohexane ring)-CH$_2$—OH.

The chain extender is incorporated into the polyurethane in amounts determined by the selection of the specific reactant components, the desired amounts of the hard and soft segments and the index sufficient to provide good mechanical properties, such as modulus and tear strength. The polyurethane compositions used in the practice of this invention may contain from 2 to 25, preferably from 3 to 20 and more preferably from 4 to 18, wt percent of the chain extender component.

If desired, optionally, small amounts of monohydroxyl-functional or monoaminofunctional compounds, often termed "chain stoppers," may be used to control molecular weight. Illustrative of such chain stoppers are the propanols, butanols, pentanols, and hexanols. When used, chain stoppers are typically present in minor amounts from 0.1 to 2 wt percent of the entire reaction mixture leading to the polyurethane composition.

As is well known to those skilled in the art, the ratio of isocyanate to total functional groups determines the $M_n$ of the polymer. In some cases it is desirable to use a very slight excess of isocyanate.

For linear, high $M_n$ polymers, starting materials with two functional groups per chain are desirable. However, it is possible to accommodate starting materials with a range of functionality. For example, a polydiene with one functional end could be used to cap both ends of a polyurethane with the middle portion consisting of repeating isocyanate-chain extender moieties. Polydienes with more than two functional groups will form branched polymers. Although crosslinking and gels can be a problem, if the degree of functionality is too high, this can usually be controlled by process conditions. Such branched polymers will exhibit some rheological characteristics that are desirable in some cases, such as high melt strength.

As discussed previously, catalysts that will promote or facilitate the formation of urethane groups may optionally be used in the formulation. Illustrative of useful catalysts are stannous octanoate, dibutyltin dilaurate, stannous oleate, tetrabutyltin titanate, tributyltin chloride, cobalt naphthenate, dibutyltin oxide, potassium oxide, stannic chloride, N,N,N N'-tetramethyl-1,3-butanediamine, bis[2-(N,N-dimethylamino)ethyl]ether, 1,4-diazabicyclo[2.2.2]octane; zirconium chelates, aluminum chelates and bismuth carbonates. The catalysts, when used, are typically employed in catalytic amounts that may range from 0.001 wt percent, and lower, to 2 wt percent, and higher, based on the total amount of polyurethane-forming ingredients.

Additives may be used to modify the properties of the polyurethane used in the practice of this invention. Additives may be included in the conventional amounts as already known in the art and literature. Usually additives are used to provide specific desired properties to the polyurethanes such as various antioxidants, ultraviolet inhibitors, waxes, thickening agents and fillers. When fillers are used, they may be either organic or inorganic, but are generally inorganic such as clay, talc, calcium carbonate, silica. Also, fibrous additives, such as glass or carbon fiber, may be added to impart certain properties.

The polyurethane used in the practice of the illustrative embodiments is preferably prepared by reacting the functional polyester with an isocyanate, and optionally a chain extender. In the prepolymer method, typically one or more functional polydienes are reacted with one or more isocyanates to form a prepolymer. The prepolymer is further reacted with one or more chain extenders. Alternatively, the polyurethanes may be prepared by a one-shot reaction of all of the reactants. Typical polyurethanes have a number average molecular weight from 5,000 to 1,000,000 g/mol, and more preferably from 20,000 to 100,000 g/mol.

In a preferred embodiment, the polyurethane is formed from a polyester, an isocyanate and a chain extender, and preferably an aliphatic chain extender. In a preferred embodiment, these polyesters have at least one, and more preferably at least two ester groups in the molecule, and typically have a Mn from 500 to 10,000, more preferably from 1,000 to 5,000 and even more preferably from 1,500 to 3,000 g/mol.

In another embodiment, the polyurethane is formed from a composition comprising 10 to 40 wt percent of diisocyanate, preferably 15 to 35 wt percent of diisocyanate; 50 to 85 wt percent of a polyester, preferably 55 to 80 wt percent of a polyester, and more preferably 60 to 80 wt percent of a polyester; and 2 to 15 wt percent of a chain extender, preferably 2 to 10 wt percent of a chain extender (each weight percentage based on the total weight of reactants). In a further embodiment, the diisocyanate is an aliphatic or aromatic diisocyanate, and more preferably 4,4'-diphenylmethane diisocyanate. In yet a further embodiment, the chain extender is an aliphatic diol. In another embodiment, the polydiene diol has a Mn from 500 to 10,000, more preferably from 1,000 to 5,000 and even more preferably from 1,500 to 3,000, g/mol.

In one embodiment, the polyurethane has a density greater than, or equal to, 0.90 g/cc, preferably greater than, or equal to, 0.95 g/cc, and more preferably greater than, or equal to, 1.00 g/cc. In another embodiment, the polyurethane has a density less than, or equal to, 1.30 g/cc, preferably less than, or equal to, 1.25 g/cc, and more preferably less than, or equal to, 1.20 g/cc. In another embodiment, the polyurethane has a density from 0.90 g/cc to 1.30 g/cc, preferably from 0.95 g/cc to 1.25 g/cc, and more preferably from 1.00 g/cc to 1.20 g/cc.

In another embodiment, the polyurethane has a melt index greater than, or equal to, 0.1 g/10 min, preferably greater than, or equal to, 0.5 g/10 min, and more preferably greater than, or equal to, 1 g/10 min (ASTM D-1238-04, 190° C., 8.7 kg). In another embodiment, the polyurethane has a melt index less than, or equal to, 100 g/10 min, preferably less than, or equal to, 50 g/10 min, more preferably less than, or equal to, 20 g/10 min, and even more preferably less than, or equal to, 10 g/10 min (ASTM D-1238-04, 230° C., 8.7 kg). In another embodiment, the polyurethane has a melt index from 0.1 g/10 min to 100 g/10 min, preferably from 0.5 g/10 min to 50 g/10 min, more preferably from 1 g/10 min to 20 g/10 min, and even more preferably from 1 g/10 min to 10 g/10 min. In a preferred embodiment, the polyurethane has a melt index from 6 g/10 min to 10 g/10 min, and preferably from 7 g/10 min to 9 g/10 min.

Preferred polyurethanes include the Pellethane™ thermoplastic polyurethane elastomers available from The Dow Chemical Company.

Additional polyurethanes suitable for use in the invention include, but are not limited to, ESTANE thermoplastic polyurethanes, TECOFLEX thermoplastic polyurethanes, CARBOTHANE thermoplastic polyurethanes, TECOPHILIC thermoplastic polyurethanes, TECOPLAST thermoplastic polyurethanes, and TECOTHANE thermoplastic polyurethanes, all available from Noveon; ELASTOLLAN thermoplastic polyurethanes and other thermoplastic polyurethanes available from BASF; and commercial thermoplastic polyurethanes available from Bayer, Huntsman and Merquinsa.

The polyurethane component of the compatibilized blends used in the practice of the embodiments may contain a combination of two or more suitable embodiments as described.

If desired, the polyurethanes can have incorporated in them, at any appropriate stage of preparation, additives such as pigments, fillers, lubricants, stabilizers, antioxidants, coloring agents, fire retardants, which are commonly used in conjunction with polyurethane elastomers.

Thermoplastic Polyurethane/Functionalized Polyolefin Polymer Compositions

Compositions of the invention contain the following: a) at least one polyolefin polymer, at least one halogenated ethylene-based polymer, or at least one elastomeric rubber; b) at least one thermoplastic polyurethane; and c) at least one functionalized polyolefin polymer.

In one embodiment, the functionalized polyolefin polymer is present in an amount less than, or equal to, 20 weight percent, preferably less than, or equal to, 15 weight percent, more preferably less than, or equal to, 10 weight percent, and even more preferably less than, or equal to, 5 weight percent based on the total weight of the composition.

In one embodiment, the functionalized polyolefin polymer is present in an amount greater than, or equal to, 20 weight percent, more preferably greater than, or equal to, 30 weight percent, and even more preferably greater than, or equal to, 40 weight percent, based on the total weight of the composition.

In another embodiment, the composition comprises from 10 to 90 weight percent of the polyurethane, preferably as described, and from 90 to 10 weight percent of at least one polyolefin polymer, at least one chlorinated ethylene-based polymer, or at least one elastomeric rubber, based on the sum weight of the two components. In a further embodiment, the composition comprises from 1 to 10 weight of the functionalized polyolefin polymer.

In another embodiment, the composition comprises from 10 to 90 weight percent of the thermoplastic polyurethane, preferably as described, and 90 to 10 weight percent of at least one polyolefin polymer, based on the sum weight of the two components. In a further embodiment, the composition comprises from 1 to 10 weight of the functionalized polyolefin polymer.

In another embodiment, the composition comprises from 10 to 55 weight percent, preferably from 15 to 50 weight percent, and more preferably from 20 to 40 weight percent of the thermoplastic polyurethane, preferably as described, based on the total weight of the composition.

In another embodiment, the composition comprises from 55 to 80 weight percent, and preferably from 60 to 75 weight percent of a polyolefin polymer, based on the total weight of the composition. Preferably the polyolefin polymer is an ethylene-based polymer, preferably as described, or a propylene-based polymer, preferably as described.

In another embodiment, the composition comprises from 55 to 80 weight percent, and preferably from 60 to 75 weight percent of a halogenated ethylene-based polymer, preferably as described, based on the total weight of the composition. Preferably the halogenated ethylene-based polymer based polymer is a chlorinated ethylene-based polymer.

In another embodiment, the composition comprises from 55 to 80 weight percent, and preferably from 60 to 75 weight percent of an elastomeric rubber, preferably as described, based on the total weight of the composition.

In another embodiment, the composition comprises from 55 to 80 weight percent, and preferably from 60 to 75 weight percent of an ethylene/α-olefin interpolymer, preferably as described, based on the total weight of the composition. Preferably, the α-olefin is selected from the group consisting of propylene, 1-butene, 1-hexene and 1-octene, and more preferably 1-octene.

In another embodiment, the composition comprises from 55 to 80 weight percent, and preferably from 60 to 75 weight percent of a propylene/ethylene interpolymer, preferably as described, based on the total weight of the composition.

In one embodiment, the composition comprises from 1 to 10 weight percent of the functionalized polyolefin polymer; from 15 to 50 weight percent of the polyurethane; preferably as described, and from 55 to 80 weight percent of an polyolefin polymer, based on the total weight of the composition. Preferably, the polyolefin polymer is an ethylene-based polymer, preferably as described, or a propylene-based polymer, preferably as described.

In another embodiment, the composition comprises from 1 to 10 weight percent of the functionalized polyolefin polymer; from 20 to 40 weight percent of the thermoplastic polyurethane, preferably as described, and from 60 to 75 weight percent of an polyolefin polymer, based on the total weight of the composition. Preferably, the polyolefin polymer is an ethylene-based polymer, preferably as described, or a propylene-based polymer, preferably as described.

In one embodiment, the composition comprises from 1 to 10 weight percent of the functionalized polyolefin polymer; from 15 to 50 weight percent of the thermoplastic polyurethane, preferably as described, and from 55 to 80 weight percent of an ethylene/α-olefin interpolymer, preferably as described, based on the total weight of the composition. Preferably, the α-olefin is selected from the group consisting of propylene, 1-butene, 1-hexene and 1-octene, and more preferably 1-octene.

In another embodiment, the composition comprises from 1 to 10 weight percent of the functionalized polyolefin polymer; from 20 to 40 weight percent of the thermoplastic polyurethane, preferably as described, and from 60 to 75 weight percent of an ethylene/α-olefin interpolymer, preferably as described, based on the total weight of the composition. Preferably, the α-olefin is selected from the group consisting of propylene, 1-butene, 1-hexene and 1-octene, and more preferably 1-octene.

In one embodiment, the composition comprises from 1 to 10 weight percent of the functionalized polyolefin polymer; from 15 to 50 weight percent of the thermoplastic polyurethane, preferably as described, and from 55 to 80 weight percent of a propylene/ethylene interpolymer, preferably as described, based on the total weight of the composition.

In another embodiment, the composition comprises from 1 to 10 weight percent of the functionalized polyolefin polymer; from 20 to 40 weight percent of the thermoplastic polyurethane, preferably as described, and from 60 to 75 weight percent of a propylene/ethylene interpolymer, preferably as described, based on the total weight of the composition.

Additives such as process oils, slip agents, anti-block, AO, UV, fillers, may be added to the inventive blends. Typically the composition will contain one or more stabilizers, for example, antioxidants, such as Irganox™ 1010 and Irgafos™ 168, both supplied by Ciba Specialty Chemicals. Polymers are typically treated with one or more stabilizers before an extrusion or other melt processes. Other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents, anti-blocking agents, release agents, flame resistant agents, abrasion and scratch mar additives, antimicrobial agents, antistatic agents, and crosslinking agents.

An inventive composition may comprise a combination of two or more suitable embodiments as described.

Applications

The functionalized polyolefins, compositions thereof, and thermoplastic polyurethane/functionalized polyolefin polymer compositions of the invention can be used in various applications, including, but not limited to adhesives to polymer substrates and foams, for example adhesives to polyurethane films and foams, and adhesives to polyesters; dyes, paint adhesives and paint adhesion enablers; weldability applications; automotive interiors and exteriors; lubricants and engine oil components; fibers; fabrics; compatibilizers for polymer compositions; toughening agents for polymer compositions; conveyor belts; films; adhesives; footwear components; artificial leather; injection molded objects, such as injection molded toys; roofing and construction materials; dispersions; carpet components, such as carpet backings; and artificial turf.

In particular, the inventive functionalized polyolefins can be used in the following applications: (a) outsoles, midsoles and stiffners, to be assembled with standard polyurethane adhesive systems currently used by footwear industry, (b) painting of soles and mid-soles with polyurethane paints, currently used by footwear industry, and (c) over-molding of polyolefins and bi-component polyurethanes for multilayered soles and midsoles. In addition, polyolefin/polyurethane blends can be used in other applications, such as automotive applications and construction applications. Automotive applications include, but are not limited to, the manufacture of bumper fascias, vertical panels, soft TPO skins, interior trim. Construction applications include, but are not limited to, the manufacture of furniture and toys.

Additional applications include adhesion of co-extruded films, where one or more substrates are compatible or reactive with hydroxyl groups, and the lamination of polyolefin based films to other polar substrates (for example, glass lamination). Further applications include artificial leather to be adhered to polar substrates, such as polyurethane, polyvinyl chloride (PVC), and others. Artificial leather is used for automotive interiors adhering to polyurethane for seating, head liners.

In another embodiment, the article is an automotive skin; an awning; a tarp; a roofing construction article (for example, adhesives to epoxy, urethane or acrylic-based substrates for all roofing applications, such as insulation bonding, liquid roofing, façade sealant, expansion joints, wet-room sealants, pitched roof, acrylics-adhered roof, bitumen bonding, and PUR-adhered refurbishment); a steering wheel; a powder coating; a powder slush molding; a consumer durable; a grip; a handle; a computer component; a belt; appliqués; a footwear component; a conveyor or timing belt; lubricants and engine oil components; fibers; films, film wraps of various sizes; fabrics; artificial leather; injection molded objects, such as injection molded toys; artificial turf; artificial leather; adhesives to Kevlar; films; film wraps of various sizes; and dispersions.

Specific applications include adhesives to polyurethane films and foams, and adhesives to polyesters; dyes, paint adhesives and paint adhesion enablers; weldability applications; automotive interiors and exteriors; compatibilizers for polymer compositions; and toughening agents for polymer compositions.

Additional applications include adhesion of co-extruded films, where one or more substrates are compatible or reactive with hydroxyl groups, and the lamination of polyolefin based films to other polar substrates (for example, glass lamination). Further applications include artificial leather to be adhered to polar substrates, such as polyurethane, polyvinyl chloride (PVC), and others. Artificial leather is used for automotive interiors adhering to polyurethane for seating, head liners.

The functionalized polyolefins are also suitable for health and hygiene products, such as wipes, cleaning tissues, foams or directly dyable fibers. The functionalized polyolefins can be used to enhance hydrophilicity of the elastomer for novel membrane structures for separation or breathability. The functionalized polyolefins are also suitable for use as self-adhearable elastomers onto metal or textile structures for automotive. As discussed previously, the functionalized polyolefins are well suited for blends and compatibilizers with enhanced interaction towards polar polymers, such as TPU, EVA, PVC, PC, PET, PLA (polylactic acid), polyamide esters, and PBT. Such bends can be used for novel compounds for footwear, automotive, consumer, durables, appliances, electronic housing, apparel, and conveyor belts. The functionalized polyolefins can also serve as compatibilizers between natural fibers and other polyolefins for use in applications, such as wood binding formulations or cellulose binding formulations. The functionalized polyolefins of the invention are also useful in blends with one or more polyether block amides, such as Pebax® polymers available from Arkema. The functionalized polyolefins may also be used as impact modifiers for nylon. In addition, amine groups of the inventive functionalized polyolefins may be protonated or alkylated to form quartnary nitrogens or ionomers for use as anti-microbials.

The functionalized polyolefins can also be used to enhance the interaction to fillers, such as silica, carbon black or clay, for use in formulations for toners, tires, coatings or other compounds. The functionalized polyolefins may also be used in engine oil viscosity modifiers, engine oil dispersants, dyable or printable fibers for apparel, paint adhesion promoters, adhesives for glass, metal and PVDC barrier resins, dispersions, components in primers and sizing agents.

Thus the invention also provides a painted substrate, the substrate formed from an inventive composition as described herein, and the paint comprising at least one of an acrylic polymer, alkyd resin, cellulose-based material, melamine resin, urethane resin, carbamate resin, polyester resin, vinyl acetate resin, polyol and alcohols. In a further embodiment, the paint is a water-based. In another embodiment, the paint is an organic solvent based.

Embodiments work well with a wide variety of paint formulations. The major components of solvent-borne paints and coatings are solvents, binders, pigments, and additives. In paint, the combination of the binder and solvent is referred to as the paint vehicle. Pigment and additives are dispersed within the vehicle. The amount of each constituent varies with the particular paint, but solvents traditionally make up about 60 percent of the total formulation. Typical solvents include toluene, xylene, methyl ethyl ketone, methyl isobutyl ketone and water. Binders account for about 30 weight percent, pigments for 7 to 8 weight percent, and additives for 2 to 3 weight percent. Some of the polymers and other additives used in paint formulations include: acrylic polymers, alkyd resins, cellulose based materials, such as cellulose acetate butyrate, melamine resins, carbamate resins, polyester resins, vinyl acetate resins, urethane resins, polyols, alcohols, inorganic materials such as titanium dioxide (rutile), mica flakes, iron oxide, silica, aluminum.

The invention also provides an over-molded article, the article formed from a polar substrate and a molded overlay formed from an inventive composition, as described herein.

In another embodiment, the invention provides an over molded article, such as a grip, handle, or belt, the over molded article comprising a polar polymer such as thermoplastic polyurethane, polycarbonates, polyesters, polyethers, or polyamide as the base sheet having variable thickness, and preferably having at least textured face on which inventive composition can be adhered, typically by a compression molding process, at a moderate temperature of 140° C. Such laminates have been shown to have excellent adhesion; for example a peel strength of 1N/mm in the case of a polyolefin functionalized with secondary amine groups at a concentration of 1.1 weight percent. This article can be further laminated with polyolefin using conventional welding techniques, for example, by pressure and heat. In addition, a second polycarbonate sheet, with a textured surface, can be laminated over the inventive blend (with textured surface at interface).

Another embodiment is a multi-laminate structure of polar polymer layer and polyolefin layer. The structure can be intercalated for increased toughness. Another embodiment would be a inventive blends elastomeric coating deposited on the surface of polycarbonate to provide a scratch resistant assembly coat that could be easily thermoformed, for example at a thermoforming temperature of 160° C. In a further embodiment, one of the layers is in the form of a foam. In another embodiment, one of the layers is in the form of a fabric.

The invention also provides a molded article comprising a first component and a second component, the first component is formed from a polar material, and the second component formed from an inventive composition, as described herein. In a further embodiment, the article is in the form of an automobile skin, appliqué, footwear, conveyor belt, timing belt or consumer durable.

The invention also provides an article comprising at least one component formed from an inventive composition, as described herein. In a further embodiment, the article is a carpet, an adhesive, a wire sheath, a cable, a protective apparel, a coating or a foam laminate. In another embodiment, the article is a tie layer between extruded sheets, films or profiles; a tie layer between cast sheets, films or profiles; an automotive skin; an awning; a tarp; a roofing construction article (for example, adhesives to epoxy, urethane or acrylic-based substrates for all roofing applications, such as insulation bonding, liquid roofing, façade sealant, expansion joints, wet-room sealants, pitched roof, acrylics-adhered roof, bitumen bonding, and PUR-adhered refurbishment); a steering wheel; a powder coating; a powder slush molding; a consumer durable; a grip; a handle; a computer component; a belt; an appliqués, a footwear component, adhesive a conveyor or timing belt, or a fabric.

"Laminates", "laminations" and like terms mean two or more layers, for example, film layers, in intimate contact with one another. Laminates include molded articles bearing a coating. Laminates are not blends, although one or more layers of a laminate may comprise a blend.

"Polar", "polar polymer" and like terms mean that the polymer molecules have a permanent dipole, that is, the polymer molecule has a positive end and a negative end. In other words, the electrons in a polar molecule are not shared equally among the atoms of the molecule. In contrast, "nonpolar", "nonpolar polymer" and like terms mean that the polymer molecules do not have a permanent dipole, that is, the polymer does not have a positive end and a negative end. The electrons in a nonpolar molecule are essentially equally shared among the atoms of the molecule. Most hydrocarbon liquids and polymers are nonpolar.

Polymers substituted with carboxyl, hydroxyl are often polar polymers. Articles prepared from nonpolar polymers have relatively low surface energy, that is, less than about 32 dyne per centimeter (dyne/cm), and articles prepared from polar polymers have relatively high surface energy, that is, 32, or more, dyne/cm. The nonpolar material of this invention typically comprises one or more nonpolar thermoplastic olefinic polymers, typically elastomers, free of any significant amount of polar functionality, for example, hydroxyl, carboxyl, carbonyl, ester, ether, amide, mercaptan, halide groups. The polar material of this invention typically comprises one or more polymers comprising one or more polar functionalities. Typical polymers comprising one more polar functionalities include, but are not limited to, polyesters, polyethers, polylactic acid, polycarbonates, nylons, polysulfides, polysulfones, polyurethanes, polyvinyl alcohol, poly (vinyl acetate), poly(vinyl chloride), acrylonitrile, ABS, polyamide esters, and polysiloxanes.

"Insignificant amount of polar functionality," and like terms, mean that a polymer does not comprise a sufficient number of polar functional groups to impart a surface energy of at least about 32 dyne/cm to an article made from it.

"Over-molding," and like terms, refer to a process in which one resin is injection into a mold containing a pre-placed substrate, and molded over this substrate. Over-molding is typically used to improve the performance and properties of a final product by over-molding one resin over another polymer substrate. Over-molding can be used to form seamless, integrated parts. Examples of over-molded parts include flexible grip handles on power tools and kitchen utensils, which provide additional gripping properties, without the hygienic concern normally associated with mechanical assemblies. The substrate may be any suitable material, such as a plastic, metal or ceramic part.

"Molded overlay," and like terms, refer to an article comprising at least two parts (an injection molded part and a substrate) that are bound together. The injection molded part is placed on top of the substrate, outside the injection mold. An adhesive may be used to bind the injection molded part to the substrate. The substrate may be any suitable material, such as a plastic, metal or ceramic part.

The substrates to which the inventive functionalized polyolefins, and compositions comprising the same, can be applied, include a wide range of materials, both polar and nonpolar, such as but not limited to, polymers, metal, wood, concrete, glass, ceramic, and various composites of two or more of these materials. Alternatively, these materials can be applied to an article formed from an inventive functionalized polyolefins, and compositions comprising the same.

Application methods include painting, printing, dying, over-molding, including the many variations on each, for example, spreading, spraying, dipping, extrusion, and other processes. The functionalized polyolefins, and compositions comprising the same, can be crosslinked before, during or after application to a substrate, and they can be crosslinked in any convenient manner, for example, peroxide, sulfur, moisture, silane, radiation, heat. In one embodiment, the functionalized polyolefins, and compositions comprising the same, is applied to a substrate, and the functionalized polyolefins is crosslinked, as it is applied, and/or after it is applied. For crosslinking, the functionalized polyolefins will usually contain unsaturation, for example, a diene-containing PO.

In one embodiment, the inventive functionalized polyolefins, and compositions containing the same, can be used to form a tie layer between polar and nonpolar materials, particularly between polar and nonpolar polymeric materials, for example, between a film layer of a nonpolar-polyolefin, such as polyethylene or polypropylene, and a film layer of a polar polymer such as polylactic acid ("PLA") or polyamide or polyester. The functionalized polyolefins of this invention are particularly well suited as tie layers for binding together a) a polyethylene or polypropylene film, or a polyethylene or polypropylene surface of a molded article, to b) a film, or surface of a molded article, of an ethylene/acrylic acid copolymer ("EAA") or a copolymer of PLA or polyethylene terephthalate ("PET"). Any processes that combine co-extrusion, extrusion lamination, adhesive lamination, and/or foam casting or extrusion can be used to create these laminated structures, including structures in which one layer comprises a foam.

In another embodiment, the invention provides a laminate structure comprising a polycarbonate, as the base sheet having variable thickness, and preferably having at least one textured surface on which a functionalized polyolefin of the invention can be adhered, typically by a compression molding process at moderate temperature of 140° C. Such laminates have been shown to have excellent adhesion; for example, a peel strength of 1N/mm in the case of a polyolefin functionalized with secondary amine groups at a concentration of 1.1 weight percent. This article can be further laminated with polyolefin using conventional welding techniques, for example, by pressure and heat. In addition, a second polycarbonate sheet with a textured surface interfacing the functionalized polyolefin film can be laminated over the functionalized polyolefin.

In another embodiment, the invention provides an over molded article comprising a polycarbonate, as the base sheet having variable thickness, and preferably having at least textured face on which functionalized polyolefin can be adhered, typically by a compression molding process, at a moderate temperature of 140° C. Such articles have excellent adhesion. This article can be further laminated with polyolefin using conventional welding techniques, such as by pressure and heat, or a second polycarbonate sheet with a textured surface can be adhered to the exposed surface of the functionalized polyolefin film.

The inventive compositions may also be used in dispersions, such as water-based dispersions for use as primers in olefinic footwear that promote adhesion to PU glues and leather; fabric coating adhesion (adhesion to PET, Nylon, PP, elastomer rich TPO comprising of POE, EPDM or other non-polar elastomers or combination thereof).

Aqueous dispersions may be prepared by melt blending the inventive compositions and water in an extruder to produce a stable, uniform dispersion with an average particle size typically around 300 nm. The solids content of the dispersions is typically from 35 to 50 weight percent, based on the total weight of the dispersion. A dispersing agent, for example, UNICID™ 350 acid (6 wt percent on a solids basis; of a synthetic $C_{26}$ carboxylic acid converted to potassium salt, and available from Baker Petrolite), is added to the dispersion. The dispersions are then applied as a cast film to biaxially-oriented polypropylene (BOPP) film, and the surface energy measured.

Additional preferred applications include automotive thermoformed skins (for PU foam adhesion without the use of current water based primers based on chlorinated maleated polyolefins), house wrap—where high Moisture Vapor Transmission Rate is required (100 percent PELLETHANE™ 2103-70A meets requirement, but so does a 50/50 blend of ENGAGE/2103-70A and POE) and good adhesion to polypropylene woven fabric (scrim); adhesive films (blown or cast); co-extruded films where the POE/TPU is used as a thin adhesive tie layer (ex. Roofing membrane that needs adhesion using PU glues). The inventive compositions with proper choice of diol, isocyanate, POE and compatibilizer may be used in coatings, paints, adhesives, glues, films, printability, dyeability, artificial leather, protective clothing, artificial turf, carpet fibers, textiles, medical (blood bags, tubing), toys, flexible overmolded goods, soft grips, sportwear where adhesion to the polyolefin is crucial and the inventive composition results in increased surface energy (>37 dyne/cm) for adhesion to polar materials. If the TPU were totally aliphatic (no aromaticity, no un-saturation)—the POE/TPU system could function as a weatherable coating layer (as opposed to adhesive tie layer).

The compositions of the invention may also be used as an adhesion promoter to polyurethane or other polar polymers, either pure or in blends, extruded to provide artificial turf (or artificial grass yarn.).

For example, an inventive composition may be extruded on a tape extrusion line and stretched 5 times. Sample tapes can then bundled, and stacked as five strands on top of each other, mimicking bundles of artificial turf yarn after being tufted into a carpet. The bundles can be held in a mold, and a polycondensating diol—isocyanate blend, for example as shown in Table 1, may be injected into the mold onto one section of the bundle. After curing for about 30 minutes at 25° C., a sample of the resultant polymer can be evaluated for adhesion to a polyurethane.

TABLE 1

| Diol formulation for artificial turf | |
|---|---|
| Voranol EP 1900 | 90 pbw |
| 1,4 BD | 10 pbw |
| Sylosiv P3 | 5 pbw |
| DABCO 33 LV | 0.2 pbw |
| Isocyanates | |
| Isonate M143 ratio | 40:100 |

The inventive composition may be used as an adhesion promotor towards polyurethane, in artificial turf, and other applications, and which can be incorporated reactively into polyolefins, the latter being used for the production for artificial turf to improve the tuft lock of the yarn in the artificial turf carpet.

Adhesion is promoted via the functional group reacting to the polyurethane coating applied as a polymerizing mixture to the carpet backing. On the carpet backing side, the tufted artificial grass yarn/tape surface is exposed and the coating thereon applied. The concentration of the adhesion promoter can be 100 percent of an inventive composition, and can extend down to 10 percent of an inventive composition in a blend with any polyethylene or propylene deemed appropriate for use in artificial grass yarn applications.

An inventive composition may also be used in the fabrication of hydrophilic artificial grass yarn, with the purpose of creating a more "player friendly" surface properties. In particular, blends of thermoplastic polyurethane with polyethylenes compatibilized with an inventive composition may be used to form artificial turf.

DEFINITIONS

The term "composition," as used, includes a mixture of materials which comprise the composition, as well as reaction products and decomposition products formed from the materials of the composition.

The terms "blend" or "polymer blend," as used, mean a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "polymer," as used, refers to a polymeric compound prepared by polymerizing monomers whether of the same or a different type. The generic term polymer thus embraces the term homopolymer, usually employed to refer to polymers prepared from only one type of monomer, and the term interpolymer as defined hereinafter. The terms "ethylene/α-olefin polymer" and "propylene/α-olefin polymer" are indicative of interpolymers as described below.

The term "interpolymer," as used, refers to polymers prepared by the polymerization of at least two different types of monomers. The generic term interpolymer thus includes copolymers, usually employed to refer to polymers prepared from two different monomers, and polymers prepared from more than two different types of monomers.

The term "ethylene-based polymer," as used, refers to a polymer that contains more than 50 mole percent polymerized ethylene monomer (based on the total amount of polymerizable monomers), and optionally may contain at least one comonomer.

The term "ethylene/α-olefin interpolymer," as used, refers to an interpolymer that contains more than 50 mole percent polymerized ethylene monomer (based on the total amount of polymerizable monomers), and at least one α-olefin.

The term "propylene-based polymer," as used, refers to a polymer that contains more than 50 mole percent polymerized propylene monomer (based on the total amount of polymerizable monomers), and optionally may contain at least one comonomer.

The term "propylene/α-olefin interpolymer," as used, refers to an interpolymer that contains more than 50 mole percent polymerized propylene monomer (based on the total amount of polymerizable monomers), and at least one α-olefin.

The term "propylene/ethylene interpolymer," as used, refers to an interpolymer that contains more than 50 mole percent polymerized propylene monomer (based on the total amount of polymerizable monomers), ethylene monomer, and, optionally, at least one α-olefin.

The term "amine-reactive group," as used, to a chemical group or chemical moiety that can react with an amine group.

The terms "hydroxyl-reactive group," or "hydroxy-reactive group," as used, refer to a chemical group or chemical moiety that can react with a hydroxy group.

The term "anhydride-containing compound," as used, refers to a chemical compound comprising at least one anhydride group.

The term "carboxylic acid-containing compound," as used, refers to a chemical compound comprising at least one carboxylic acid group.

The term "amine-containing compound," as used, refers to a chemical compound comprising at least one amine group.

The terms "hydroxyl-containing compound," or "hydroxy-containing compound, as used, refers to a chemical compound comprising at least one —OH group.

The term "functionalized polyolefin polymer," as used, refers to a polymer formed from an polyolefin polymer and one or more compounds, each containing at least one functional group, such as anhydride, carboxylic acid, amine, hydroxyl or imide.

The term "amine-functionalized polyolefin polymer," as used, refers to a polymer formed from an polyolefin polymer and one or more compounds, and wherein at least one compound contains at least one amine group.

The term "hydroxyl-functionalized polyolefin polymer," as used, refers to a polymer formed from an polyolefin polymer and one or more compounds, and wherein at least one compound contains at least one hydroxyl group.

The term "imide-functionalized polyolefin polymer," as used, refers to a polymer formed from an polyolefin polymer and one or more compounds, and wherein at least one compound contains at least one imide precursor capable of forming an imide (see for example, the experimental examples below).

The term "imbibing," and similar terms, as used, refers to the process in which a compound is absorbed into a polymer solid, particle, pellet, or article.

The term "nonpolar" polymer, as used, refers to a polymer that does not contain polar moieties, including, but not limited to, hydroxyl group, carbonyl group, ester group, amine group, amino group, amide group, imide group, cyano group, thiol group, and carboxylic acid group. Examples of nonpolar polymers include polyolefin polymers.

The term "polar" polymer, as used, refers to a polymer that contains one or more polar moieties, including, but not limited to, hydroxyl group, carbonyl group, ester group, amine group, amino group, amide group, imide group, cyano group, thiol group, and carboxylic acid group. Examples of polar polymers include polyesters, polyamides, polyimides, polyacrylic acids, polyethers, polyether block amides, polyetheramides, polyetherimides, polycarbonates, polyphenyleneoxides, polyvinylalcohols, polylactic acids, polyamide esters and polyvinylchlorides.

Articles prepared from nonpolar polymers have relatively low surface energy, that is, less than 32 dyne per centimeter (dyne/cm), and articles prepared from polar polymers have relatively high surface energy, that is, 32 or more dyne/cm. The nonpolar material of this invention typically comprises one or more nonpolar thermoplastic olefinic polymers, typically elastomers, free of any significant amount of polar functionality, for example, hydroxyl, carboxyl, carbonyl, ester, ether, amide, mercaptan, halide groups. The polar material of this invention typically comprises one or more polymers comprising one or more polar functionalities. Typical polymers comprising one more polar functionalities include polyesters, polyethers, polylactic acid, polycarbonates, nylons, polysulfides, polysulfones, polyurethanes, polyvinyl alcohol, poly(vinyl acetate), poly(vinyl chloride), acrylonitrile, ABS, and polysiloxanes. Polar materials, polar substrates, and polar films are typically formed from polar polymers as described in this paragraph. Nonpolar materials, nonpolar substrates, and nonpolar films are typically formed from nonpolar polymers as described in this paragraph.

"Insignificant amount of polar functionality" and like terms mean that a polymer does not comprise a sufficient number of polar functional groups to impart a surface energy of at least 32 dyne/cm to an article made from it.

Test Methods

Density is determined in accordance with American Society for Testing and Materials (ASTM) procedure ASTM D792-00, Method B.

Melt index ($I_2$) in g/10 min, is measured using ASTM D-1238-04 (version C), Condition 190° C./2.16 kg. The notation "$I_{10}$" refers to a melt index, in g/10 min, measured using ASTM D-1238-04, Condition 190° C./10.0 kg. The notation "$I_{21}$" refers to a melt index, in g/10 min, measured using ASTM D-1238-04, Condition 190° C./21.6 kg. Polyethylene is typically measured at 190° C. while polypropylene is typically measured at 230° C.

"MFR" means melt flow rate for propylene based polymers and is measured using ASTM D-1238 condition 230° C./2.16 kg.

For urethane based polymers, including blend comprising such polymers, except PELLETHANE™ polymers, melt index is measured according to ASTM D-1238 condition 190° C./2.16 kg. For PELLETHANE™ (Pellethane™ 2102-80A AND 2103-70A) melt index is measured according to ASTM D-1238 condition 190° C./8.7 kg.

Differential Scanning Calorimetry (DSC) can be used to measure crystallinity in polyethylene (PE) based samples and polypropylene (PP) based samples. DSC is performed using a TAI model Q1000 DSC equipped with an RCS cooling accessory and an auto-sampler. A nitrogen purge gas flow of 50 cc/min is used. The sample is pressed into a thin film and melted in the press at about 175° C. and then air-cooled to room temperature (25° C.). Material (3-10 mg) is then cut into a 3 mm diameter disk, accurately weighed, placed in a light aluminum pan (ca 50 mg), and then crimped shut. The thermal behavior of the sample is investigated with the following temperature profile. The sample pan is placed in a DSC cell, and then heated, at a rate of approximately 10° C./min, to a temperature of 180° C. for PE (230° C. for PP). The sample is held isothermally for 3 minutes in order to remove any previous thermal history. Then the sample is cooled at a rate of 10° C./min to −60° C. for PE (−40° C. for PP), and held at −90° C. for 3 minutes. The sample is then heated to 150° C. at 10° C./min heating rate. The cooling and second heating curves are recorded. The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, percent cryst.=($H_f$/292 J/g)×100 (for PE)).

Ultimate tensile strength and elongation at break are measured according to ASTM D-638-03. Both measurements are performed at 23° C. on die-cut D638-type IV specimens. Melting temperature ($T_m$) is determined from the second heating curve. Crystallization temperature ($T_c$) is determined from the first cooling curve.

Surface tension is measured in accordance with ASTM D2578-04a, Method B, and DIN 53364 (1986). ARCOTEC™ test inks are used, which are fluids of defined surface tension, and are available in ranges from 28 to 56 mN/m. Tests are run at room temperature (23° C.).

Surface energy is measured using ARCOTEC™ test inks and test pens available from Lotar Enterprises. As a starting point for each check, a test ink or test pen with a medium value should be applied, for example, 38 mN/m (dyne/cm). If the line of ink stays unchanged, for at least 2 seconds on the surface of the material, without turning into droplets, the surface energy of the material is the same, or higher, than the surface tension of the fluid. In this case, the test ink/test pen with the next higher value is applied to the surface, for example, 40 mN/m (dyne/cm). This check has to be repeated with the next higher value of surface tension, up to the point, at which, within 2 seconds, the line of fluid turns into separate droplets. If already at the starting point (38 mN/m (dyne/cm)) droplets are formed from the line of fluid, the check is continued with test inks/test pens of lower values, which is often the case with metals. As a general limit often 32 mN/m (dyne/cm) are mentioned. If the surface energy level of a polymer composition is below this value, the adhesion of the material to polar substrates will be poor; above this value the adhesion to polar substrates will be good or sufficient.

Sheet hardness properties are measured according to ASTM D2240-05. The tensile properties are determined according to standard test method ASTM D638-03.

Melt tension is measured on selected polymer samples on a Goettfert Rheotens melt tensile tester at a temperature of 190° C. The Rheotens tester is composed of two counter rotating wheels, which pull a molten strand, extruded from a capillary die, at a constant velocity. The wheels are equipped with a balance to measure the stress response of the melt, as the wheels accelerate. The wheels are allowed to accelerate until strand rupture. The force to break the strand is taken as the melt tension in centiNewton (cN).

The RR (V0.1/V100) is determined by examining samples using melt rheology techniques on a Rheometric Scientific, Inc. ARES (Advanced Rheometric Expansion System) dynamic mechanical spectrometer (DMS). The samples are examined at 190° C., using the dynamic frequency mode, and 25 millimeter (mm) diameter parallel plate fixtures with a 2 mm gap. With a strain rate of 8 percent, and an oscillatory rate that is incrementally increased from 0.1 to 100 rad/sec, five data points are taken for each decade of frequency analyzed. Each sample (either pellets or bale) is compression molded into 3 inch (7.62 centimeter (cm)) diameter plaques by ⅛ inch (0.049 cm) thick at 20,000 psi (137.9 megapascals (MPa)) pressure for one minute at 180° C. The plaques are quenched and cooled (over a period of 1 minute) to room temperature. The "25 mm plaques" are cut from the center portion of larger plaques. These 25 mm diameter aliquots are then inserted into the ARES, at 190° C., and allowed to equilibrate for five minutes, prior to initiation of testing. The samples are maintained in a nitrogen environment throughout the analyses to minimize oxidative degradation. Data reduction and manipulation are accomplished by the ARES2/A5:RSI Orchestrator Windows 95 based software package. RR measures the ratio of the viscosity versus shear rate curve.

As previously discussed, interpolymer Mooney viscosity ("MV") (ML 1+4 at 125° C.) is measured in accordance with ASTM D1646-04. The processing rheology ration ("PRR"), is calculated from the MV and the RR in accordance with the formula:

$$PRR = RR + [3.82 - \text{interpolymer Mooney Viscosity} \ (ML_{1+4} \text{ at } 125° \text{ C.})] \times 0.3 \quad \text{(Eq. 1)}.$$

ML refers to Mooney Large Rotor. The viscometer is a Monsanto MV2000 instrument.

Tensile strength and elongation are measured in accordance with ASTM D-882-02. The samples are extruded sheets.

Tear, Type C, is measured in accordance with ASTM D-882-02. Samples are extruded sheets.

Gloss (60 degrees) is measured in accordance with ASTM D-2457-03. Samples are extruded sheets.

For the heat aging study analysis, the sample (extruded sheet) is thermally treated at 120° C. in a convection oven (Lindberg Blue Oven, Model ESP-400C-5, forced air) for the period of time as noted in Tables 2 or 3. After this thermal treatment, the sample was equilibrated to room temperature (16 hr-96 hr 9see ASTM D573, 10.5)). The tensile strength and elongation were then measured in accordance with ASTM D-882-02.

The moisture vapor transmission test (ASTM E 96/E 96M-05, Imperial Method) is used to determine the moisture vapor transmission rate (MVT) and Permeance by the desiccant method. The temperature and relative humidity for the evaluation are at 72° F. and 50 percent, respectively. Non-laminated films are sealed to the open mouth of a test dish containing a desiccant, and the assembly placed in the controlled atmosphere of 72° F. and 50 percent relative humidity. Periodic weighings determine the rate of water vapor movement through the specimen into the desiccant. To a deviation of 13.3 of ASTM E 96/E 96M-05, the MVT and Permeance are normalized to film thickness giving the normalized MVT and permeability coefficient, respectively by multiplying the MVT and Permeance by the thickness of the film. This was done since the Permeance and MVT are directly related to the thickness of the specimen, and the thickness variability resulted in the process of the film fabrication.

Fourier transform infrared spectroscopy (FTIR) analysis is used to determine the concentration of maleic anhydride. The ratio of peak heights of the maleic anhydride at wave number 1791 $cm^{-1}$ to the polymer reference peak, which in case of polyethylene, is at wave number 2019 $cm^{-1}$. Maleic anhydride content is calculated by multiplying this ratio with the appropriate calibration constant. The equation used for maleic grafted polyolefins has the following form:

$$MAH \text{ (wt. percent)}=A*\{[FTIR\ PeakArea@1791\ cm^{-1}]/[FTIR\ PeakArea\ 2019\ cm^{-1}]+B*[FTIR\ PeakArea@1712\ cm^{-1}]/[FTIR\_PeakArea@2019\ cm^{-1}]\} \quad \text{(Eq. 2)}$$

The calibration constant A can be determined using $C^{13}$ NMR standards. The actual calibration constant may differ slightly depending on the instrument and polymer. The second component at wave number 1712 $cm^{-1}$ accounts for the presence of maleic acid, which is negligible for freshly grafted material. Over time, however, maleic anhydride is readily converted to maleic acid in the presence of moisture. Depending on surface area, significant hydrolysis can occur in just a few days under ambient conditions. The acid has a distinct peak at wave number 1712 $cm^{-1}$. The constant B in Equation 2 is a correction for the difference in extinction coefficients between the anhydride and acid groups.

The sample preparation procedure begins by making a pressing, typically 0.05 to 0.15 millimeters in thickness, in a heated press, between two protective films, at 150-180° C. for 1 hour. Mylar and Teflon are suitable protective films to protect the sample from the platens. Aluminum foil must never be used (maleic anhydride reacts with aluminum). Platens should be under pressure (~10 ton) for about 5 minutes. The sample is allowed to cool to room temperature, placed in an appropriate sample holder, and then scanned in the FTIR. A background scan should be run before each sample scan or as needed. The precision of the test is good with an inherent variability of less than ±5 percent. Samples should be stored with desiccant to prevent excessive hydrolysis. Moisture content in the product has been measured as high as 0.1 weight percent. The conversion of anhydride to acid however is reversible with temperature but may take up to one week for complete version. The reversion is best performed in a vacuum oven at 150° C. a good vacuum (near 30 inches Hg) is required. If the vacuum is less than adequate the sample tends to oxidize resulting in an infrared peak at approximately 1740 $cm^{-1}$ which will cause the values to below. Maleic anhydride and acid are represented by peaks at about 1791 $cm^{-1}$ and 1712 $cm^-1$, respectively.

EXAMPLES

The following examples illustrate the invention, but do not explicitly or implicitly limit the invention. Unless noted to the contrary, all parts and percentages are by weight.
The following polymers are used in the Examples.

Engage™ 8200 is a ethylene/octene-1 copolymer, with a density of 0.870 g/cc, and a melt index ($I_2$) of 5 g/10 min, as measured at 190° C. and 2.16 kg (available from The Dow Chemical Company).

Engage™ 8400 is a random ethylene/octene-1 copolymer, with a density of 0.870 and a melt index ($I_2$) of 30.

Engage™ 7086 or ENR 7086.01, a ethylene/1-butene copolymer with a density of 0.901 g/cc, and a melt index ($I_2$) of <0.5 g/10 min (available from The Dow Chemical Company).

Pellethane™ 2102-80A is a thermoplastic polyurethane, with a density of 1.18 g/cc, and a melt index ($I_2$) of 4 g/10 min as measured at 190° C. and 8.7 kg (available from The Dow Chemical Company).

Pellethane™ 2103-70A is a thermoplastic polyurethane, with a density 1.06 g/cc (ASTM D 792), and a melt index ($I_2$) of 11 g/10 min as measured at 190° C. and 8.7 kg (available from The Dow Chemical Company).

Engage™ 8100 is a ethylene/octene-1 copolymer, with a density of 0.870 g/cc, and a melt index ($I_2$) of 1 g/10 min, as measured at 190° C. and 2.16 kg (available from The Dow Chemical Company).

Engage™ 8130 is a random ethylene/octene-1 copolymer, with a density of 0.864 and a melt index ($I_2$) of 13.

Amplify™ GR-216 is a ethylene/octene-1 copolymer grafted with ca. (about) 0.8 wt percent maleic anhydride, and with a density of 0.875 g/cc, and a melt index ($I_2$) of 1.3 (available from The Dow Chemical Company).

Isoplast™ 2530 is an Engineering Thermoplastic Polyurethane available from The Dow chemical Company.

CAPRON is a polyamide (Nylon 6) available from BASF.

Calibre™ 200-14 is a polycarbonate available from The Dow Chemical Company.

Eastman EASTAR EN-001 is a polyethyleneterephthalate available from Eastman Chemicals.

GE Plastics 315-1001 is a polybutyleneterephthalate available from GE Plastics.

SANTOPRENE TPV 191-55PA is a thermoplastic vulcanizate available from Advanced Elastomer Systems.

SANTOPRENE TPV 8291-70PA is a thermoplastic vulcanizate available from Advanced Elastomer Systems.

SANTOPRENE TPV 8271-55B100 is a thermoplastic vulcanizate available from Advanced Elastomer Systems.

LOTADER 8900 is a terpolymer of ethylene, methyl acrylate and glycidyl methacrylate, and is available from Arkema.

POLYBD 2035 is a polybutadiene diol based TPU having a Tg of −34° C., specific gravity @25° C. of 0.995 g/cc, tensile strength of 1711 psi, $I_2$ of 1 g/10 min, hard segment content of 35 wt percent, softening point of 90° C., and 559 percent elongation (available from Sartomer Company, Inc.)

Example 1

Preparation of Functionalized Polyolefin Polymer

A poly(ethylene-co-octene) copolymer grafted with 0.80 wt percent maleic anhydride (45 grams, AMPLIFY™

GR-216) was added to the bowl of a Haake mixer, set at 160° C., and the polymer was allowed to melt and flux for two minutes. To the molten polymer was added 1.61 g (18.2 mmol; 5 equiv.) of N-ethyl-ethylenediamine in dropwise fashion. After the diamine addition, the polymer melt was allowed to mix for an additional five minutes, before being removed from the Haake mixer, and allowed to cool. Infrared analysis of the resulting product indicated essentially complete conversion of the grafted anhydride functionality (1790 $cm^{-1}$) to imide functionality (1710 $cm^{-1}$).

Comparative Example 1A

The procedure in Example 1 was repeated, only 1.35 g of N-methyl-ethylenediamine (18.2 mmole) was used in place of N-ethyl-ethylenediamine. The melt reaction product crosslinked upon addition of this diamine, affording an insoluble gel.

Comparative Example 1B

The procedure in Example 1 was repeated, only 2.35 g (18.2 mmol) of N-(2-aminoethyl)-piperazine was used in place of N-ethyl-ethylenediamine. The melt reaction product crosslinked upon addition of this diamine, affording an insoluble gel.

Example 2

The procedure detailed in Example 1 was repeated, only 1.11 g (18.2 mmol) of ethanolamine was substituted for the diamine. The resulting product likewise showed complete conversion from anhydride functionality to N-(2-hydroxyethyl)maleimide by infrared analysis.

Example 3

Preparation of Maleamic Acid

Maleic anhydride (7.84 g (80 mmol) was dissolved in 20 mL of acetone. To the maleic anhydride solution was added another solution of ethanolamine (4.88 g, 80 mmol) dissolved in 10 mL of acetone. The reaction solution was kept cool using an ice bath, and after all the ethanolamine solution was added, the solution was stripped on a rotary evaporator to afford a light yellow oil, which crystallized upon standing. Proton NMR analysis of the crystalline material was consistent with that of the desired maleamic acid product, as shown in structure (V):

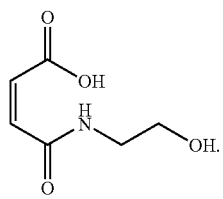

(V)

Example 4

Poly(ethylene-co-octene) copolymer (45 g, ENGAGE™ 8400) was added to a Haake mixer set at a temperature of 170° C., and allowed to melt and flux for two minutes. To the molten polymer was added 1.0 g of maleic anhydride, and the mixture was fluxed for another two minutes, and then 0.10 wt percent of Luperox™ 101 peroxide (90 percent active) was added. After an additional five minutes of reaction time, 1.21 g (19.8 mmol) of ethanolamine was added, and the reaction allowed to continue for five more minutes. The mixer was stopped, and the functionalized polymer was removed and allowed to cool. A portion of the reaction product was dissolved in hot toluene and precipitated into cold methanol to remove unreacted reagents and byproducts. Infrared analysis of the precipitated polymer indicated that the ethylene-octene copolymer was indeed functionalized with N-(2-hydroxy)-maleimide. The product appeared identical to that prepared in Examples 2 and 3 based on its infrared spectrum.

Example 5

The same procedure as described in Example 4 was repeated, only 1.63 g (18.5 mmol) of N-ethyl-ethylenediamine was used in place of ethanolamine. Again, infrared analysis of the resulting polymer after precipitation was consistent with functionalization of the ethylene-octene elastomer with N—(N-ethylaminoethyl)-maleimide. The product appeared identical to that prepared in Example 1 based on its infrared spectrum.

Example 6

Adhesion Comparison

Samples of the polymers prepared in Examples 1 and 2 were compression molded into ⅛ inch thick plaques, along with the maleic anhydride starting polymer (AMPLIFY™ GR-216), an unfunctionalized control (ENGAGE™ 8100), and a thermoplastic polyurethane (TPU; PELLETHANE™ 2102-80A). Bars, "½ inch" in width, were cut from the plaques, and were compression molded to bars of the TPU at 180° C. for two minutes. The level of adhesion between the TPU and the various polyolefins was accessed as "cohesive failure" or "adhesive failure" based on the following criteria when pulling them apart:

Cohesive failure: one or both of the polymers deforms and/or breaks before the interface between them fails.

Adhesive failure: the interface between the polymers fails first.

The samples involving TPU molded to unfunctionalized polyolefin (ENGAGE™ 8100), maleic anhydride grafted polyolefin (AMPLIFY™ GR-216), and hydroxy-functionalized polyolefin (Example 2) all failed adhesively. The sample involving TPU molded to amino-functionalized polyolefin failed cohesively.

Example 7

Direct Addition Process and Solvency

Table 2 summarizes the results of various experiments to react 0.80 wt percent maleic anhydride grafted ethylene-octene elastomer with a number of primary-secondary diamines. The diamines were added to the polymer melt. A crosslinked polymer formed when N-(methyl)ethylenediamine or N-(2-aminoethyl)piperazine was used as the diamine. The solubility of the imidization product was examined in hot toluene (80° C.-110° C.).

TABLE 2

Solubility on reaction products using toluene

| diamine | imidization product* |
|---|---|
| HN-[piperazine]-N-CH₂CH₂-NH₂ | x-linked |
| CH₃-NH-CH₂CH₂-NH₂ | x-linked |
| CH₃CH₂-NH-CH₂CH₂CH₂-NH₂ | x-linked |
| CH₃CH₂-NH-CH₂CH₂-NH₂ | soluble |
| CH₃CH₂-NH-CH₂CH₂CH₂CH₂-NH₂ | soluble |

Example 8

Preparation of Hydroxy-Functional Elastomer by Successive Maleation and Imidization

A sample of ethylene-octene elastomer (45 g, ENGAGE 8130) was mixed in a Haake melt blender for two minutes at 170° C. and 100 rpm. To this was added maleic anhydride (1.0 g, 10.2 mmol), and the resulting mixture was blended for an additional two minutes, before the addition of 0.0504 grams of active Luperox™ 101 peroxide (0.7 mmol RO.). After an additional five minutes of mixing time at 170° C., to allow grafting of the maleic anhydride to the elastomer, 1.2 grams of ethanolamine (19.7 mmol) was added, and the resulting mixture was allowed to react for an additional two minutes at 170° C., to convert maleic anhydride to hydroxy functionality. The product was removed from the Haake blender and allowed to cool.

A sample of the product was dissolved in hot toluene, and precipitated by addition to an excess of cold methanol, in order to remove unreacted maleic anhydride, ethanolamine, and any residual peroxide and its decomposition products. The precipitated sample was redissolved in hot toluene, and reprecipitated into excess methanol, a second time, to further purify the sample for analysis. A portion of the twice precipitated sample was dissolved in warm deuterated 1,1,2,2-tetrachloroethane (~30 mg polymer/2 mL solvent), and analyzed by proton NMR (300 MHz; 80° C.). The characteristic chemical shifts for the four hydrogens of the 2-hydroxyethylimide group were observed at 3.7-3.8 ppm, and the relative area of the peak was 0.81 percent compared to the total area (hydroxyethylimide+ethylene-octene signal areas).

Example 9

Preparation of Hydroxy-Functional Elastomer by Direct Grafting of Maleamic Acid

A sample of ethylene-octene elastomer (45 g, ENGAGE 8130) was mixed in a Haake melt blender for two minutes at 170° C. and 100 rpm. To this was added 1.5 gram of maleamic acid (9.4 mmol; prepared per Example 3), and the resulting mixture was blended for an additional two minutes, before the addition of 0.0504 grams of active Luperox™ 101 peroxide (0.7 mmol RO.). After an additional five minutes of mixing time at 170° C., to allow grafting of the maleamic acid to the elastomer, the product was removed from the Haake blender and allowed to cool. A sample of the product was dissolved in hot toluene and precipitated into an excess of cold methanol in order to remove unreacted maleamic acid and residual peroxide and/or its decomposition products.

The precipitated sample was redissolved in hot toluene and reprecipitated into methanol, a second time, to further purify the sample for analysis. A portion of the twice precipitated sample was dissolved in warm, deuterated 1,1,2,2-tetrachloroethane (~30 mg polymer/2 mL solvent), and analyzed by proton NMR (300 MHz; 80° C.). The characteristic chemical shifts for the four hydrogens of the 2-hydroxyethylimide group were observed at 3.7-3.8 ppm, and relative area of the peak was 1.73 percent compared to the total area (hydroxyethylimide+ethylene-octene signal areas). These data suggest that more hydroxyethylmaleimide functionality was grafted onto the elastomer backbone by the procedure in Example 9 versus that described in Example 8.

Example 10

Preparation of Amine-Functionalized Ethylene-Octene Elastomer Via Diamine Imbibe Process

Poly(ethylene-co-octene) copolymer (45 grams) grafted with 0.74 wt percent maleic anhydride (3.4 mmol anhydride) was placed in a sealed container with 0.60 grams of N-ethylethylenediamine (6.8 mmol) and allowed to stand for 4 hours, allowing the diamine to completely imbibe into the pellets of the MAH grafted copolymer. The pellets were then added to the bowl of a Haake mixer set at 180° C., and the polymer was allowed to melt and mix at that temperature for five minutes. The product was then removed from the Haake mixer, and allowed to cool to room temperature. Infrared analysis of the resulting product indicated essentially complete conversion of the grafted anhydride functionality (1790 cm⁻¹) to imide functionality (1710 cm⁻¹) in accordance with Equation 3:

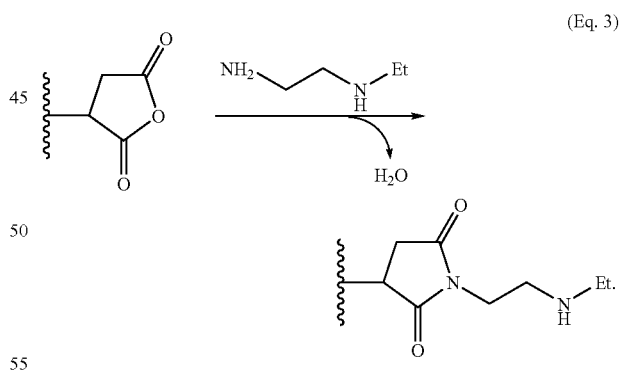

(Eq. 3)

In addition, a small compression molded film of the (ethylene-co-octene) copolymer, grafted with maleic anhydride, was characterized by FTIR, and then the film was placed in a small vial at room temperature, along with a molar excess of N-(ethyl)ethylene diamine compared to the maleic anhydride grafted to the ethylene-octene copolymer. After a period of several hours, the now-imbibed film was again characterized by FTIR, and the spectrum indicated essentially complete conversion of the original maleic anhydride groups (1790 cm⁻¹) to maleamic acid groups (1640 cm⁻¹) consistent with Equation 4:

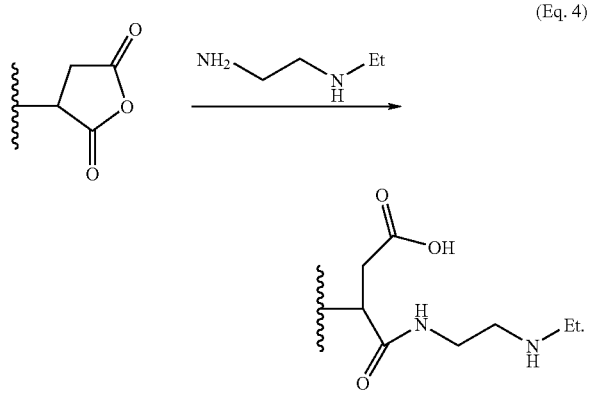

(Eq. 4)

These data suggest that partial reaction occurs between maleic anhydride and the diamine at room temperature, before the material is subjected to elevated temperature melt mixing. This process is advantaged in that no separate diamine feed system or process control needs to be added to the melt mixing equipment used to prepare these functionalized polymers.

Example 11

The procedure in Example 10 was repeated, only 0.50 g of N-methyl-ethylenediamine was used in place of N-ethyl-ethylenediamine. The reaction product was completely soluble and not crosslinked. This is in contrast to the direct addition method of Comparative Example 1A, which yielded a crosslinked product.

Example 12

The procedure in Example 10 was repeated, only 0.88 g of N-(2-aminoethyl)-piperazine was used in place of N-ethyl-ethylenediamine. The reaction product was completely soluble and not crosslinked. This is in contrast to the direct addition method of Comparative Example 1B, which yielded a crosslinked product.

Example 13

Imbibe Process and Solvency

Table 3 summarizes the results of the imbibing examples. As shown in Table 2, all of the diamines produced soluble polymer product. Primary-primary diamines typically produced crosslinked polymer. The solubility of the imidization product was examined in hot toluene (80° C.-110° C.).

TABLE 3

| Solubility of imbibing samples using toluene. | |
|---|---|
| diamine | imidization |
| HN−N−NH₂ (piperazine-ethylamine) | soluble |
| CH₃-NH-CH₂CH₂-NH₂ | soluble |
| CH₃CH₂-NH-CH₂CH₂CH₂-NH₂ | soluble |
| CH₃CH₂-NH-CH₂CH₂-NH₂ | soluble |
| CH₃CH₂-NH-CH₂CH₂CH₂CH₂-NH₂ | soluble |

Example 14

Morphology Study I

Samples of amine-functionalized and hydroxyl-functionalized ethylene-octene elastomer prepared according to Examples 1 and 2, respectively, were blended with a thermoplastic polyurethane polymer (TPU; PELLETHANE™ 2102-80A). The following controls were each blended with the TPU: unfunctionalized ethylene-octene elastomer (ENGAGE™ 8100) and maleic anhydride-functionalized ethylene-octene elastomer (AMPLIFY GR-216). The mass ratio of TPU to ethylene-octene polymer in the blends was 80/20, and the blends were prepared by mixing both polymeric components at 180° C., for five minutes, in a Haake blender. The resulting blend morphologies were examined using transmission electron microscopy, and are shown in FIG. 1.

The data clearly show that the functionality in the ethylene-octene phase improved the dispersion of the ethylene-octene polymer in the TPU phase, as compared to the unfunctionalized controls (ENGAGE™ 8100). In particular, it is advantageous to employ amine functionality to achieve the best dispersion (smallest particle size) of ethylene-octene copolymer in TPU.

The mean particles sizes, as determined from the micrographs, were as follows:
1) 80/20 TPU/ENGAGE mean size=0.84±0.79 μm (bimodal),
2) 80/20 TPU/ENGAGE-g-MAH mean size=0.35±0.28 μm,
3) 80/20 TPU/ENGAGE-g-hydroxyl mean size=0.42±0.32 μm, and
4) 80/20 TPU/ENGAGE-g-amine mean size=0.11±0.10 μm.

The smaller particle sizes may be due to better interfacial associations or compatibility between the functionalized polyolefins and the polyurethane. The amine functionalization and the hydroxyl functionalization can each react with urethane groups along the backbone of the polyurethane.

Example 15

Morphology Study II

An amine-functionalized ethylene-octene elastomer, prepared according to the procedure described in Example 1, was blended with unfunctionalized ethylene-octene elastomer at various ratios. The unfunctionalized elastomer was ENGAGE™ 8100, with a density of 0.87 g/cc, and a melt index of 1.0 g/10 min (190° C./2.16 Kg). The blending was carried out in a Haake melt mixer at a temperature of about 180° C. for five minutes. The blends had the following compositions on a relative weight basis.

Blend 1: 50 wt percent amine-functionalized elastomer+50 wt percent ENGAGE™ 8100

Blend 2: 25 wt percent amine-functionalized elastomer+75 wt percent ENGAGE™ 8100

Blend 3: 12 wt percent amine-functionalized elastomer+88 wt percent ENGAGE™ 8100

Subsequently, these blends were then compounded with a thermoplastic polyurethane (TPU), namely PELLETHANE™ 2102-80A, with a density of 1.18 g/cc, and a melt index of 4.0 g/10 min (190° C. 8.7 kg). The relative weight ratio of the amine-functionalized elastomer, or its blend with unfunctionalized elastomer, to that of the TPU was 20/80. In addition, two control samples were prepared in a similar manner. Control A was a blend of 80 wt percent TPU with 20 wt percent ENGAGE™ 8100 (0 percent amine-functionalized resin), and Control B was a blend of 80 wt percent TPU with the amine-functionalized elastomer itself (100 percent amine-functionalized resin).

Figure 2:
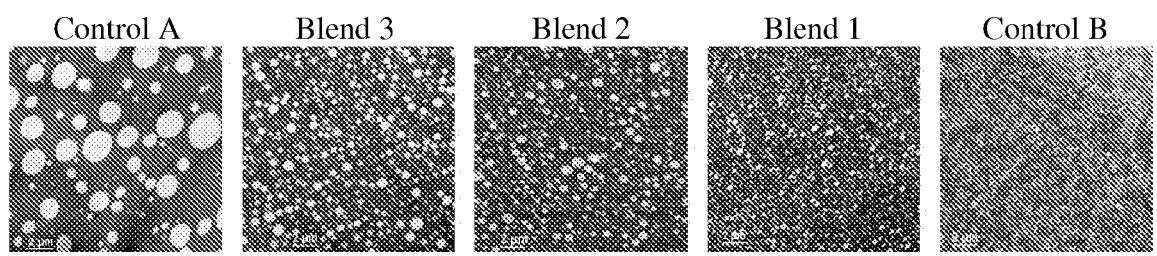
FIG. 2 depicts electron micrographs showing particle sizes and shapes of several amine-functionalized polyethylene/polyurethane blends with a thermoplastic polyurethane and two controls.

The compounding was carried out in a Haake mixer at temperature of about 180° C. for five minutes. Upon cooling, a small portion of the TPU/polyolefin elastomer blend was compression molded into a small plaque, and then the morphology of the blend was assessed using standard transmission electron microscopy techniques. The results are illustrated in FIG. 2.

These results indicate that the functionalized ethylene-octene elastomer can be diluted with unfunctionalized resin, and still give rise to a significant improvement in compatibility when blended with a polar polymer, such as TPU. In FIG. 2, the weight percent amino-functionalized elastomer in polyolefin (dispersed) phase is as follows: Control A—0 wt percent, Blend 3—12 wt percent, Blend 2—25 wt percent, Blend 1—50 wt percent, Control B—100 wt percent.

Example 16

Adhesion to Polycarbonate

Polycarbonate Substrate

Dow's Calibre™ 200-22 polycarbonate pellets were injection-molded against a textured plaque to obtain polycarbonate plaques with identical textured surfaces, and designated as CPM501. This textured feature typically provides some interlocking of the different layers.

Functionalized Engage™ Material

Three functionalized Engage™ material compounds, a maleic anhydride (MAH) Engage™, a primary-hydroxy functionalized Engage™, and secondary amine functionalized Engage™ were used in this study. Schematics for structures (VII-IX), representing each functional group, respectively, is shown:

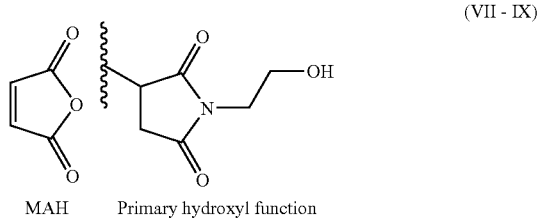

MAH     Primary hydroxyl function     (VII - IX)

-continued

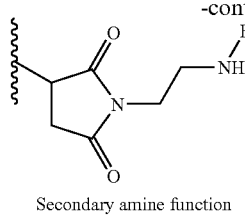

Secondary amine function

Fabrication of the Peel Test Specimen

The functionalized Engage™ materials were first pressed into thin films, less than "1/32 inch" width, using a threefold cycle of compression at 284° F., using consecutive pressures of 1,000 psi, then 40,000 psi, and then 40,000 psi, respectively, for the following dwell times: three minutes, three minutes and seven minutes, respectively.

Each film of functionalized Engage™ material was welded against a "1/8 inch" piece of regular Engage™ material using a protocol identical to the one described in the previous paragraph. A threefold cycle of compression at 284° F., using consecutive pressures of 1,000 psi, then 40,000 psi, and then 40,000 psi, respectively, for the following dwell times: three minutes, three minutes and seven minutes, respectively.

The assemble functionalized Engage™/Engage™ was then pressed against the textured polycarbonate plaque. Mylar was inserted at the edge of the plaque to create a zone with no adhesion between the functionalized Engage™ material and the polycarbonate surface. The functionalized Engage™ face was pressed against the textured polycarbonate using a threefold cycle of compression at 284° F. with consecutive pressures of 1,000 psi, then 40,000 psi, and then 40,000 psi, respectively, for nine seconds, one minute and seven minutes dwell times, respectively. The thickness of the Engage™ material was between 1.5 and 1.6 millimeter.

Figure 3:
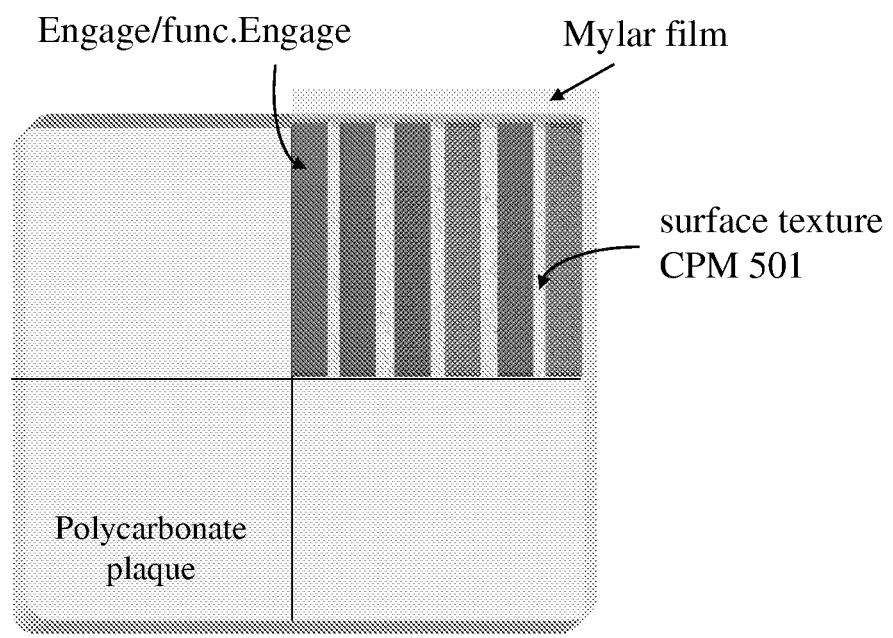
FIG. 3 is a schematic a peel test specimen.

Specimens were cooled to ambient temperature. The final step of the preparation was to stamp the Engage™/functionalized Engage™ with a one slit die to create 6 to 8 long stripes, parallel to one edge of the plaque, of about 5.2 mm width and 50 mm long. A schematic of this peel test specimen is shown in FIG. 3.

Peel Test Measurements

Figure 4:
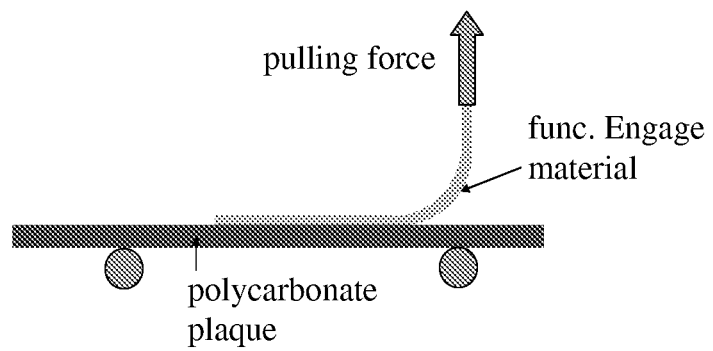
FIG. 4 is a schematic of a peel test set-up.

The free end of the (functionalized Engage™)/(Engage™) stripe was pulled using an air grip device on a 4201 Instron tensile tester machine at 23° C. and 50 percent RH (relative humidity). The polycarbonate plaque was tightly attached to an Instron peel test device, moving at the same speed as the cross-head, but in a perpendicular direction, in such a way that the pull force was always applied perpendicularly to the plaque. This specific setup is called a 90 degree peel test, referenced in ASTM D6862-04, entitled "Standard Test Method for 90 Degree Peel Resistance of Adhesives." A schematic of the test set-up is shown in FIG. 4.

The speed of the displacement was constant at 0.3 millimeter per second. Force and displacement were recorded automatically through Bluehill™ software from Instron. The load, reported in kilogram or Newton (1 kg=9.81 Newton), was then divided by the width of the stripe to obtain the peel strength in Newton per millimeter. The median value and the standard deviation of the peel strength over a range of 10 to 30 millimeters are reported in Table 3 below.

As a control, the peel strength of a polyolefin polymer containing no functionalized polyolefin polymer was tested with both a polycarbonate and a polyurethane polymer. Both tests resulted in a peel strength reading of zero.

TABLE 4

Peel Strength (N/mm) versus functionalized polyolefin polymers

| Functionalization | Maleic anhydride | Primary hydroxyl | Secondary amine |
|---|---|---|---|
| MEDIAN | 0.256 | 0.543 | 1.034 |
| STDEV | 0.028 | 0.029 | 0.062 |

Figure 5:
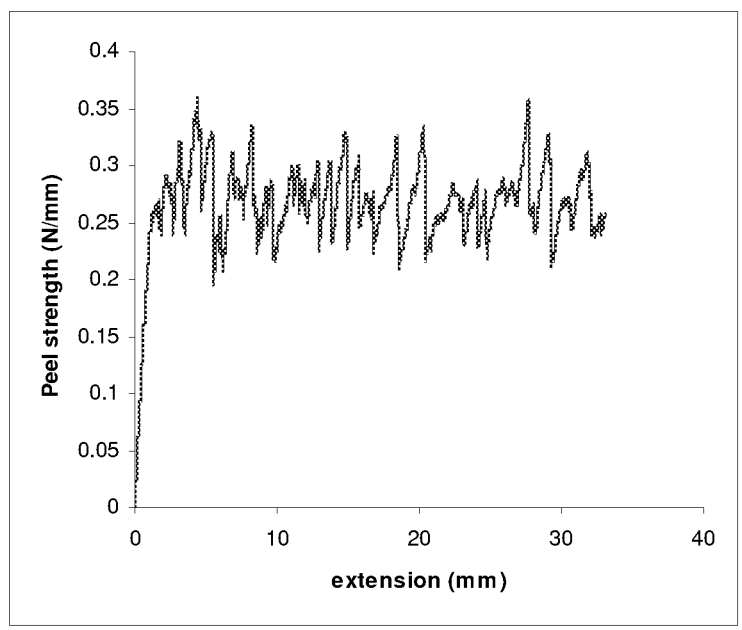
FIG. 5 represents a peel strength profile of a MAH-Engage™/polycarbonate.
Figure 6:
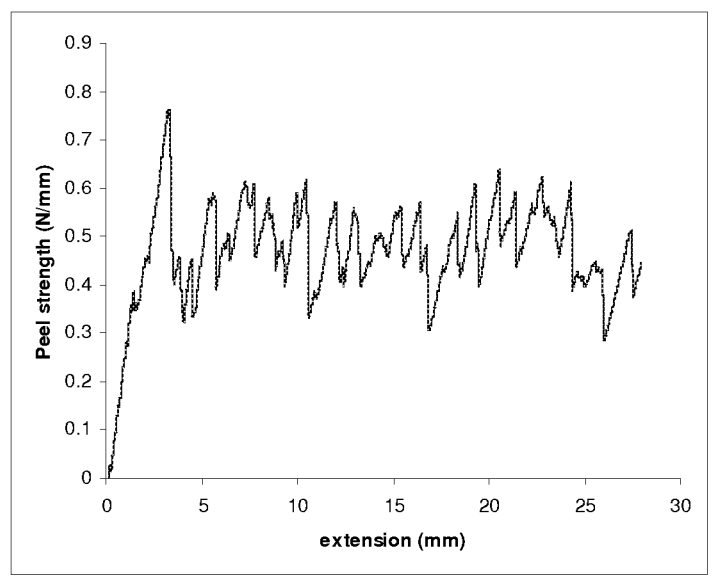
FIG. 6 represents a peel strength of profile of a primary hydroxyl functionalized Engage™/polycarbonate.
Figure 7:
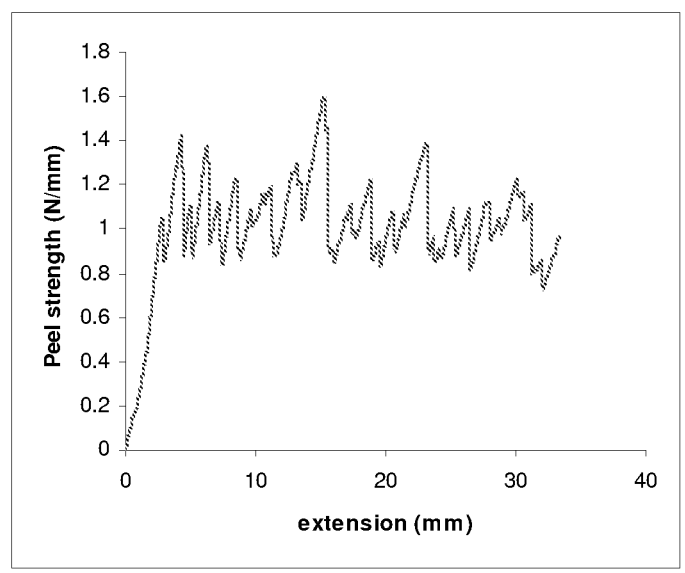
FIG. 7 represents a peel strength profile of secondary amine-functionalized Engage™/polycarbonate.

Representative peel strength profiles for the three functionalized Engage™ material compounds, the maleic anhydride (MAH) Engage™, the primary-hydroxy functionalized Engage™, and the secondary amine functionalized Engage™, are shown in FIGS. 5-7, respectively. This Example is where the functionalized ENGAGE compounds is used as a film layer between the non-polar ENGAGE material and the polar material. The results show that the amine functionality polyolefin polymer provides the best adhesion properties. However, all three functionalized polyolefin polymers give better adhesion properties than the control.

Example 17

Functionalized Polyolefin Polymers as Compatibilizers in Films

The following additive is used in this Example:

Ebony color concentrate is available from Americhem. The ID is 53169-H1-101. The carrier resin is ESCORENE AN 13K.

Reaction

The compatibilizer 8407-g-Amine (B) is an ENGAGE 8407-g-(2-[N-ethylamino]ethylsuccinimide (0.87 density; approx. 5 melt index; 1.2 wt percent [N-ethylamino]ethylsuccinimide), and has the structure as shown in structure (IX):

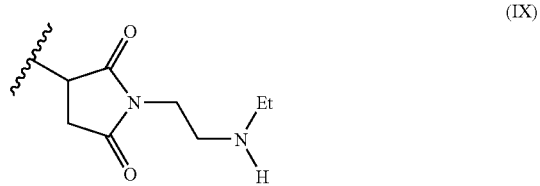 [SMILES: *C1CC(=O)N(CCNCC)C1=O]

(IX)

The grafted polymer is prepared by reacting a maleic anhydride grafted Engage 8407 (0.87 density, 5 MI, and approx. 0.74 wt percent MAH grafting level) with ethylethylenediamine using two equivalents of the diamine/anhydride. The diamine is imbibed in the pellets of the maleic anhydride grafted Engage 8407, and the imbibed pellets are melt blended in a small REX extruder.

The compatibilizer 8407-g-OH is ENGAGE-g-(2-hydroxyethylsuccinimide) (0.87 density; approx. 5 melt index; 1.0 wt percent hydroxyethylsuccinimide) is prepared by reacting, in an extruder, the maleic anhydride grafted Engage 8407 (0.87 density, 5 MI, 0.74 wt percent anhydride) with a ethanolamine using 3.5 equivalents of the ethanolamine/anhydride. The reaction is shown in Equation 5:

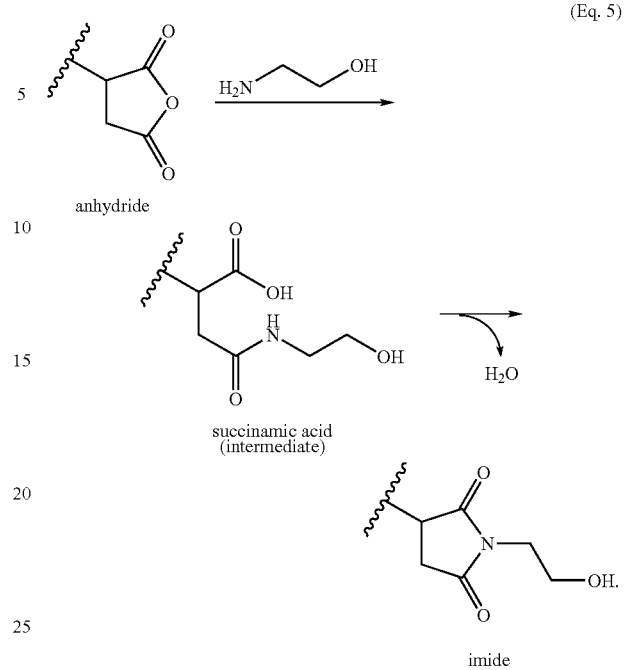

(Eq. 5)

Formation of Extruded Sheets

Extruded sheets are formed from the compatibilized compositions and the non-compatibilized compositions as shown in Tables 4 and 5. All weight percentages are based on the total weight of the composition.

Components are fed into the hopper of a WP-ZSK twin screw extruder individually, or together in a dry blend. The mode of addition does not affect the properties of the extruded sheet. The extruder speed is approximately 500 RPM, and the zone temperatures are as follows: Zone 1=~140° C. and Zones 2-8=~170° C. The extruded strand is pelletized upon exiting the extruder to form compounded pellets.

The compounded pellets are dried overnight in a conventional static oven at approximately 80° C. to remove residual moisture. The dried pellets are fed into a Killion extruder (3 roll stack), and are extruded into a sheet of thickness 20-40 mils. Sheets used in Table 2 were extruded to a thickness of 20-40 mils. The extruder speed is approximately 75-100 RPM, and the zone temperatures are as follows: zone 1=180° C., zone 2-4=190° C. The compositions are extruded at 80 lbs/hr through a flat coathanger die that is 20-40 mils thick and 2 feet in width, Shear rates of approx 96 s$^{-1}$ (for 40 mil thickness) and 385 s$^{-1}$ (for 20 mil thickness) are generated.

The surface energy, thermal stability, elongation, tear strength and gloss were measured on each film, and are reported in Tables 4 and 5. "NM" means not measured. Permeability parameters from the moisture vapor transmission test (ASTM E 96/E 96M-05, Imperial Method) are also reported in Table 5.

TABLE 5

POE/PELLETHANE/functionalized polyolefin blends with comparatives

| Composition | 1 | 2 | 3 | 4 | 5 | 6 |
|---|---|---|---|---|---|---|
| ENR7086 | 57 | 69.5 | 57 | 69.5 | 59.5 | 63.8 |
| Pellethane 2102-80A | 36 | 25 | 36 | 25 | 36 | 30 |
| 8407-g-OH | 5 | 3.5 | 0 | 0 | 0 | 0 |

TABLE 5-continued

POE/PELLETHANE/functionalized polyolefin blends with comparatives

| Composition | 1 | 2 | 3 | 4 | 5 | 6 |
|---|---|---|---|---|---|---|
| 8407-g-Amine | 0 | 0 | 5 | 3.5 | 2.5 | 4.2 |
| Dark Grey Color Conc. | 2 | 2 | 2 | 2 | 2 | 2 |
| Surface energy extruded sheets | 36 | 36 | 41 | 38 | 43 | 41 |
| Surface energy criteria Pass (>35 dyne/cm) or Fail | Pass | Pass | Pass | Pass | Pass | Pass |
| Ultimate Tensile (MPa) MD | 14.4 | 16.7 | 17.9 | 23.3 | 19.9 | 22.2 |
| Elongation (%) MD | 527.1 | 582.0 | 599.1 | 700.3 | 628.2 | 619.8 |
| Die C tear strength (N/mm) | 83.9 | 94.7 | 89.8 | 72.4 | 85.5 | 94.4 |
| 60 degree gloss | 19.3 | 5.4 | 3.4 | 30.7 | 26.8 | 4.3 |
| Heat Aging @ 120° C. | NM | NM | | NM | | NM |
| Tensile Original | | | 27.07 | | 31.56 | |
| 72 hr | | | 25.56 | | 39.56 | |
| 7 Days | | | 28.53 | | NM | |
| 14 Days | | | 26.31 | | NM | |
| 21 Days | | | | | NM | |
| Elongation Original | | | 749 | | 551 | |
| 72 hr | | | 706 | | 644 | |
| 7 Days | | | 694 | | NM | |
| 14 Days | | | 746 | | NM | |
| 21 Days | | | | | NM | |

TABLE 6

POE/PELLETHANE/functionalized polyolefin blends with comparatives

| Compositions | 7 | 8 | 9 | Comparative 1 | Comparative 2 |
|---|---|---|---|---|---|
| ENR7086 | 57 | 69.5 | 41 | 0 | |
| Pellethane 2103-70A | 36 | 25 | 50 | 100 | |
| 8407-g-Amine | 5 | 3.5 | 7 | 0 | |
| Dark Grey Color Conc. | 2 | 2 | 2 | 0 | |
| Surface energy (dyne/cm) | 40 | 40 | 39 | NM | |
| Thickness (inch) | 0.016 | 0.019 | 0.02 | 0.006 | 0.0090 |
| Permeability (Perm-inch) | 0.014 | 0.004 | 0.038 | 0.128 | 0.0000 |
| Permeability Std. Dev. | 0.002 | 0.00005 | 0.0001 | 0.015 | 0.0000 |
| Permeance (perms) | 0.878 | 0.197 | 1.914 | 23.3 | 0.2000 |
| Transmission (grains/hr*ft^2) | 0.355 | 0.079 | 0.773 | 9.284 | 0.0820 |
| Ultimate Tensile (MPa) MD | 13.5 | 13.3 | 17.6 | | |
| Elongation (%) MD | 605.0 | 581.3 | 790.9 | | |
| Die C tear Strength (N/mm) | 69.5 | 70.3 | 62.6 | | |
| 60 degree gloss | 4.1 | 3.84 | 36.5 | | |
| Heat Aging 120° C. | | NM | NM | NM | NM |
| Tensile Original | 23.48 | | | | |
| 72 hr | 23.33 | | | | |
| 7 Days | NM | | | | |
| 14 Days | NM | | | | |
| 21 Days | NM | | | | |
| Elongation Original | 653 | | | | |
| 72 hr | 700.8 | | | | |
| 7 Days | NM | | | | |
| 14 Days | NM | | | | |
| 21 Days | NM | | | | |

Table 5 shows formulations and testing results for Compositions 1-6. Compositions 1-4 are each extruded at a 40 mil thickness, and Compositions 5 and 6 are each extruded at a 20 mil thickness. Each of the Compositions provides films with relatively high surface energies.

Table 6 shows formulation Compositions 7-9 with Comparative Compositions 1 and 2, and the results of surface energy testing. Comparative Composition 1 is a neat Pellethane™ 2103-70A material. Comparative Composition 2 is a 63:37 (w/w) blend of ENGAGE 7086 and PolyBD 2035, The inventive blends shown in Tables 4 and 5 reveal very good surface energies, in addition to good mechanical properties and gloss compared to the standards provided.

Surface energy provides a qualitative estimate of the ability of a polymer composition to adhere to polar substrates. In general, surface energies greater than or equal to 34 dynes/cm should provide much better adhesion towards a broader variety of polar polymers such as polyurethanes and foamed polar polymers, than polyolefin blend compositions having a surface energy less than or equal to 32 dynes/cm.

Figure 8:
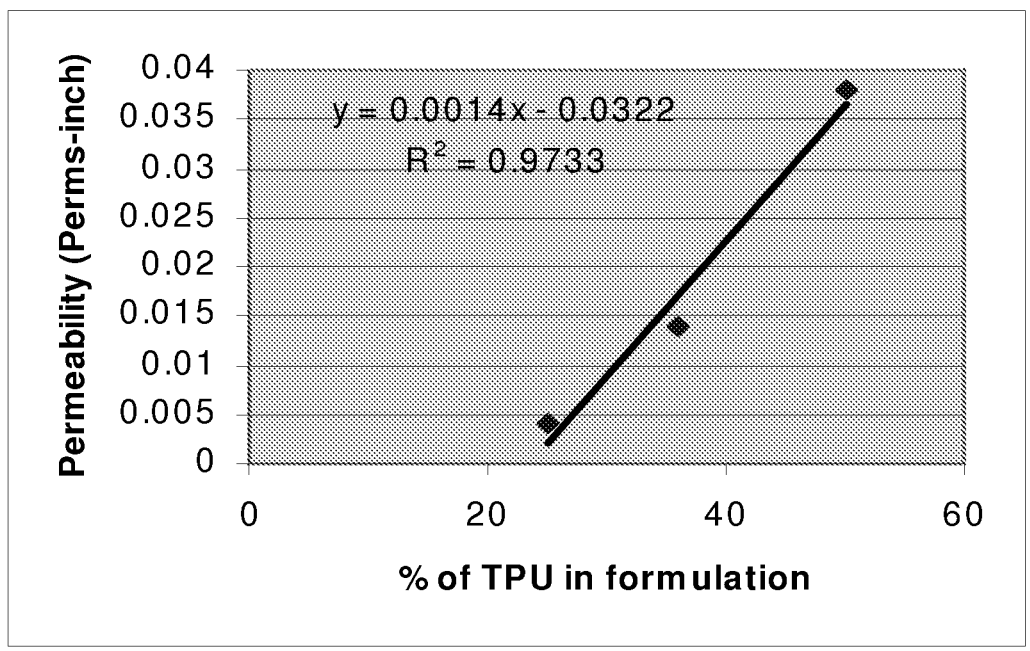
FIG. 8 depicts the dependency of the permeability on the polyurethane content in extruded sheets formed from embodiment compositions.
Figure 9:
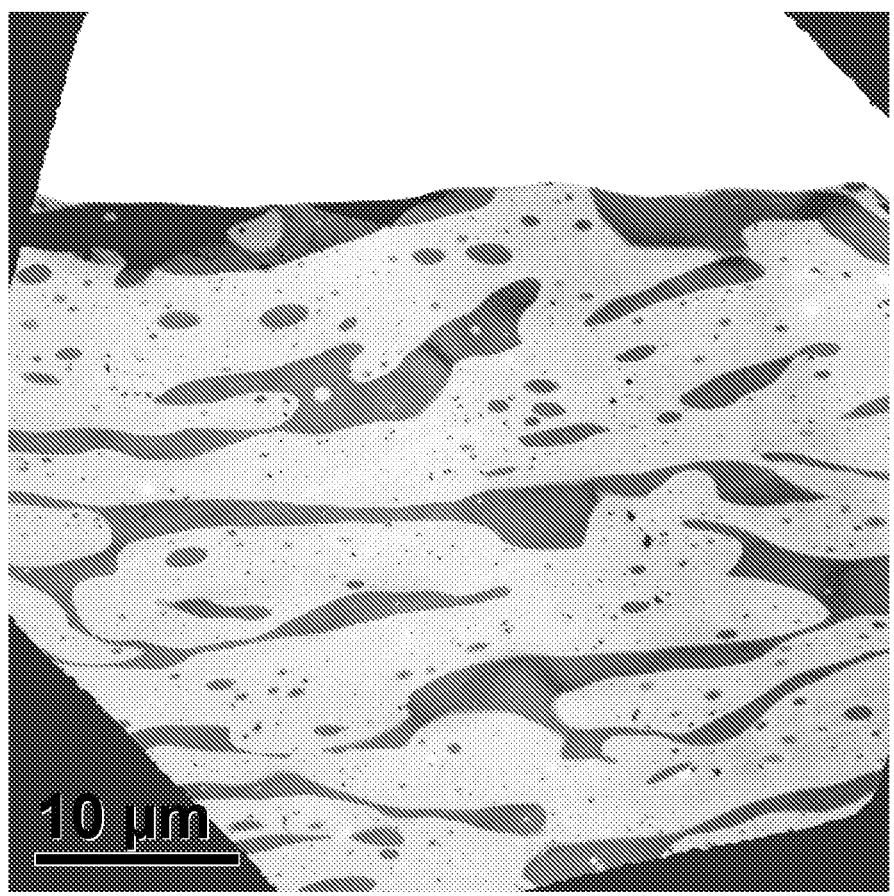
FIGS. 9-18 are micrographs (TEM) of embodiment compositions as described in Table 8.
Figure 10:
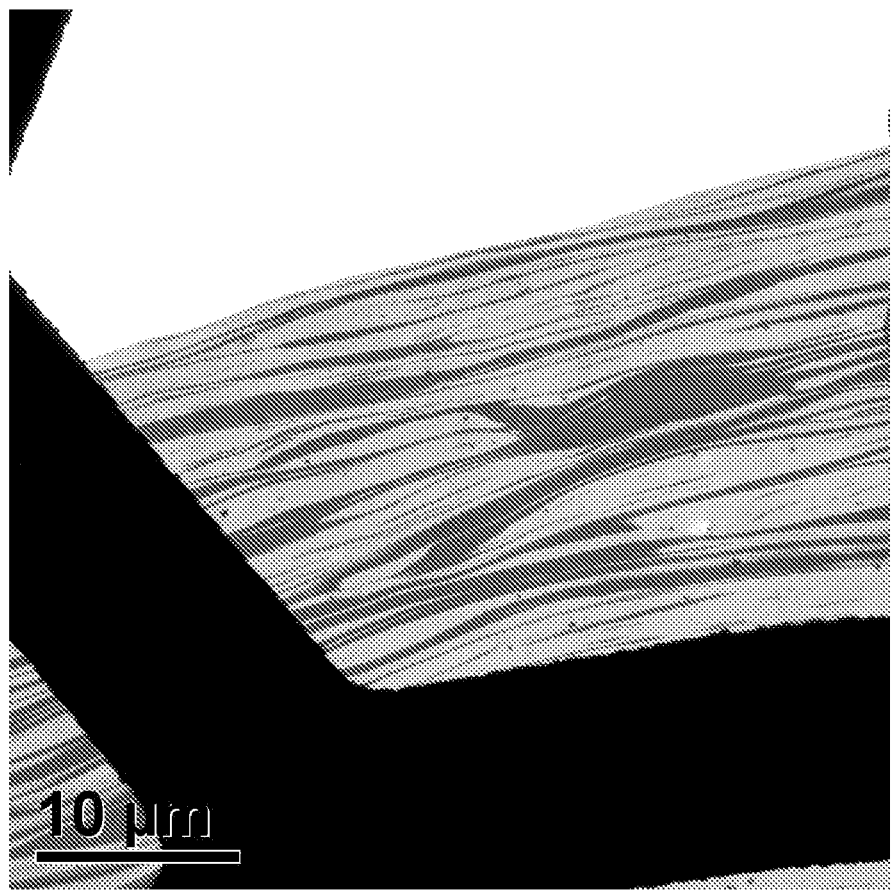
Figure 11:
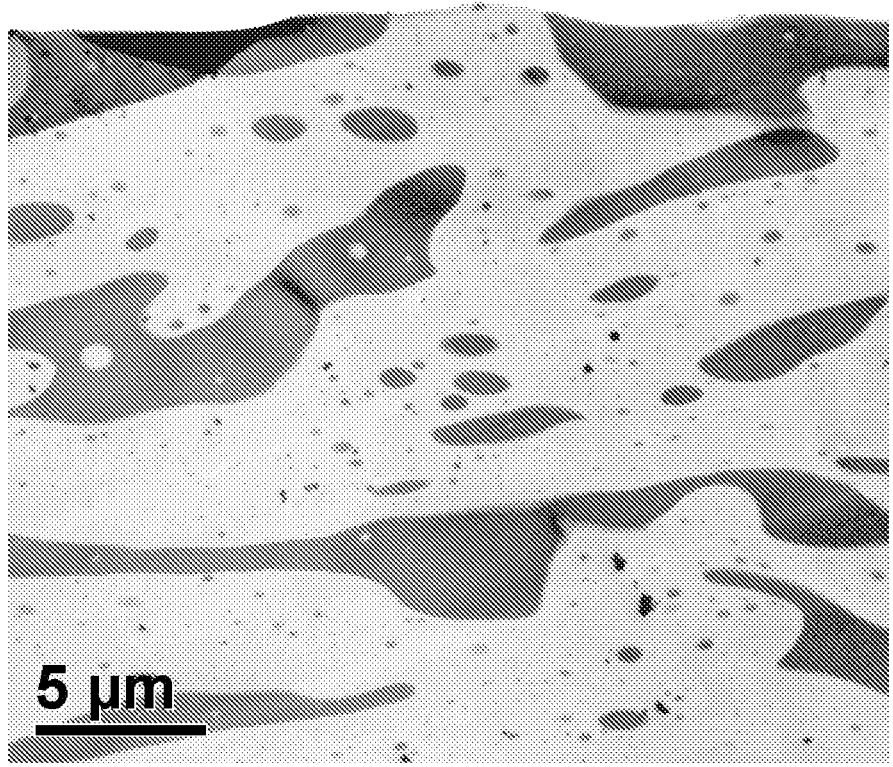
Figure 12:
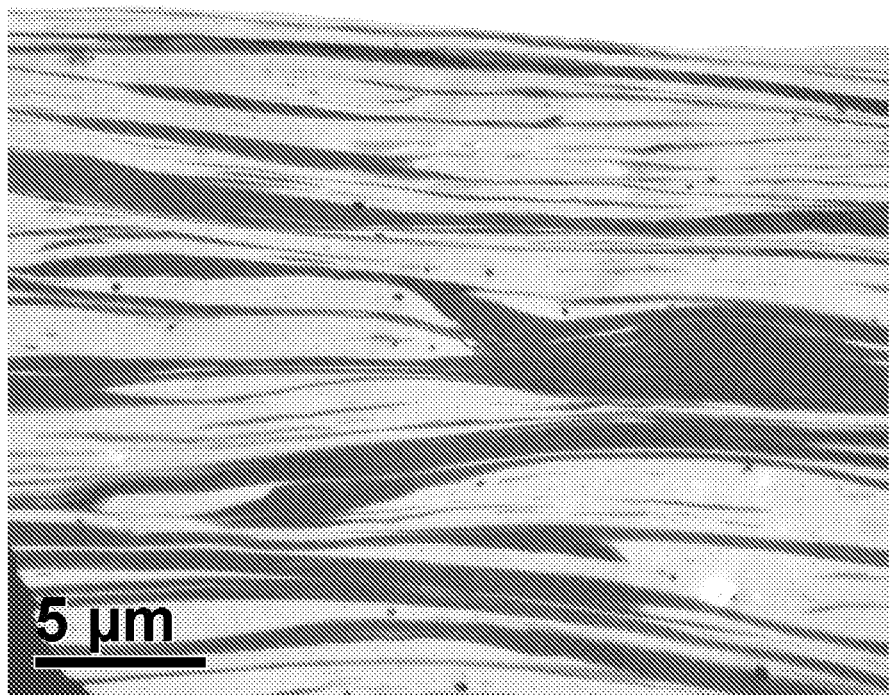
Figure 13:
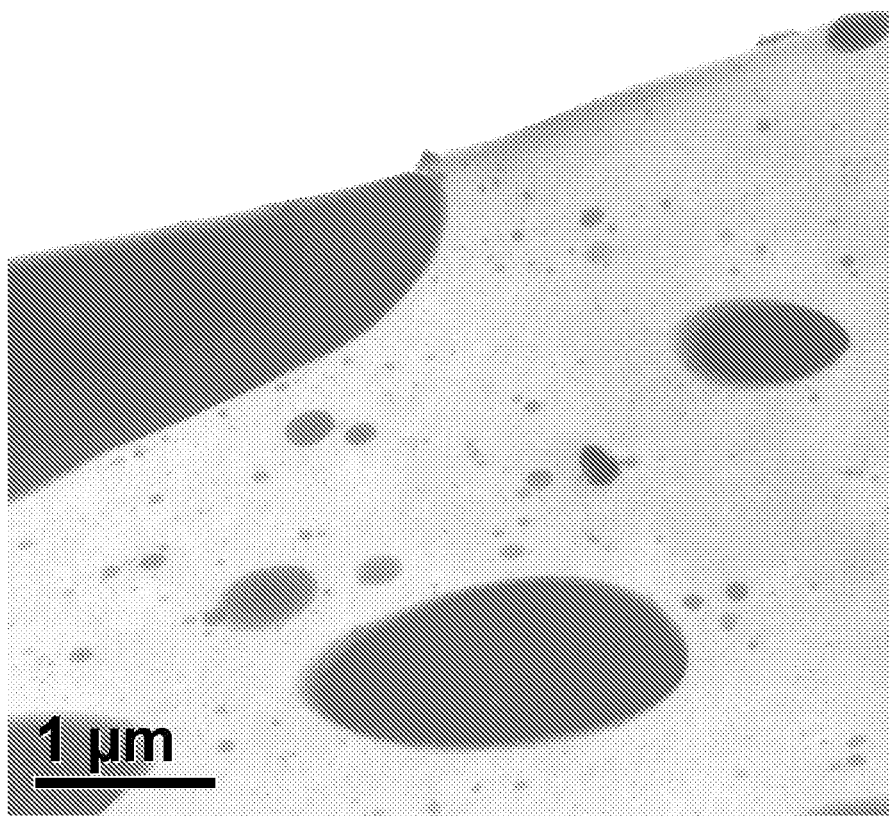
Figure 14:
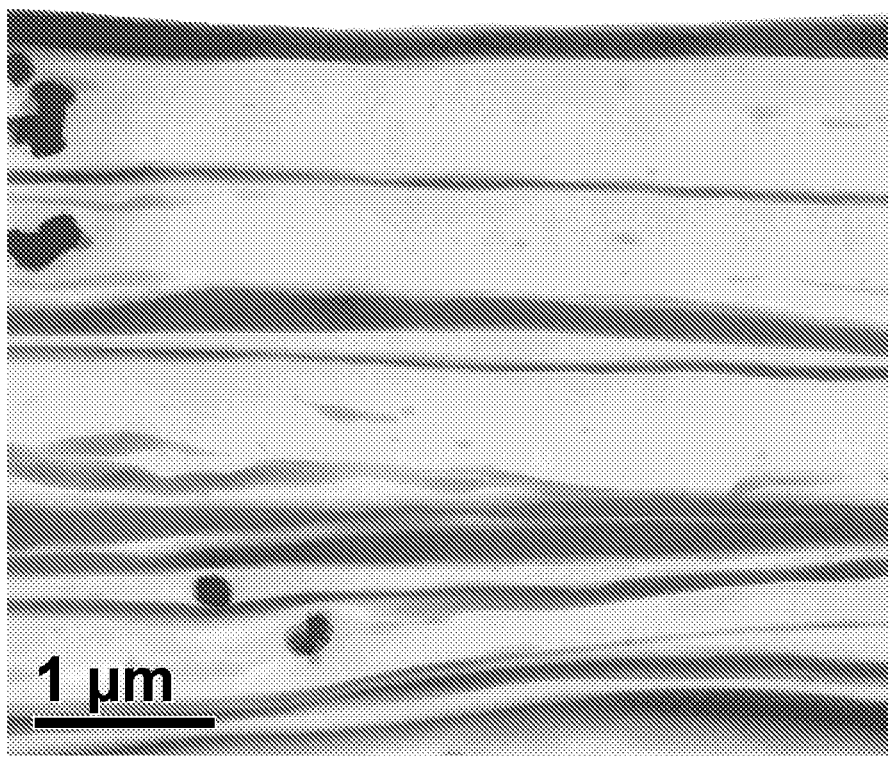
Figure 15:
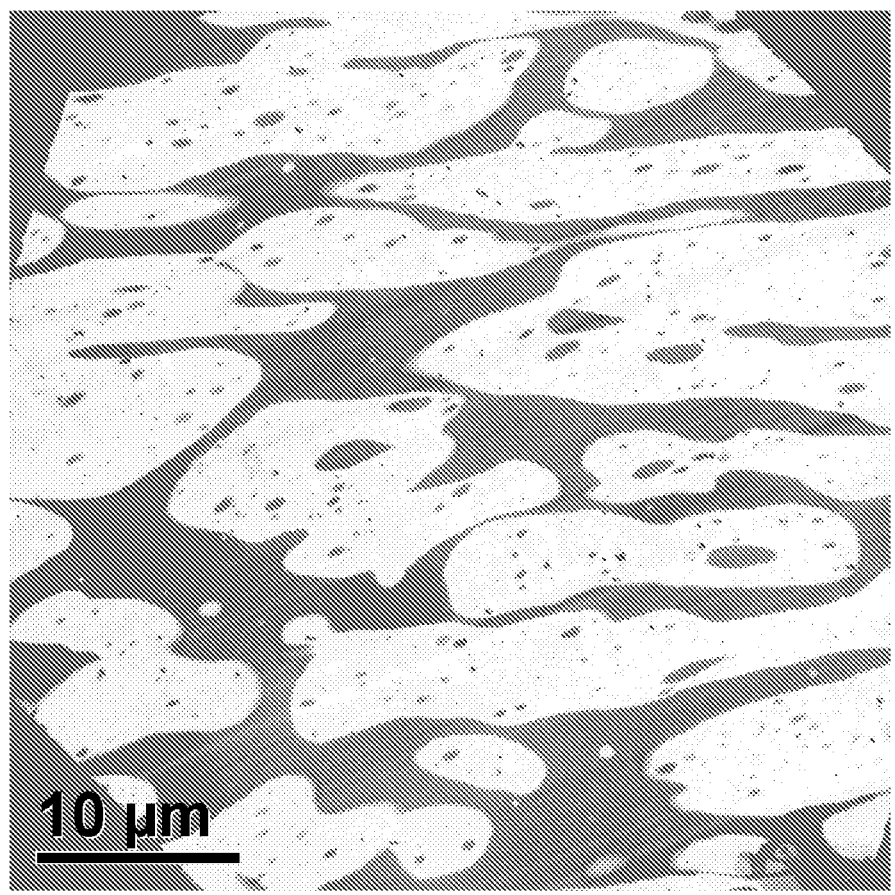
Figure 16:
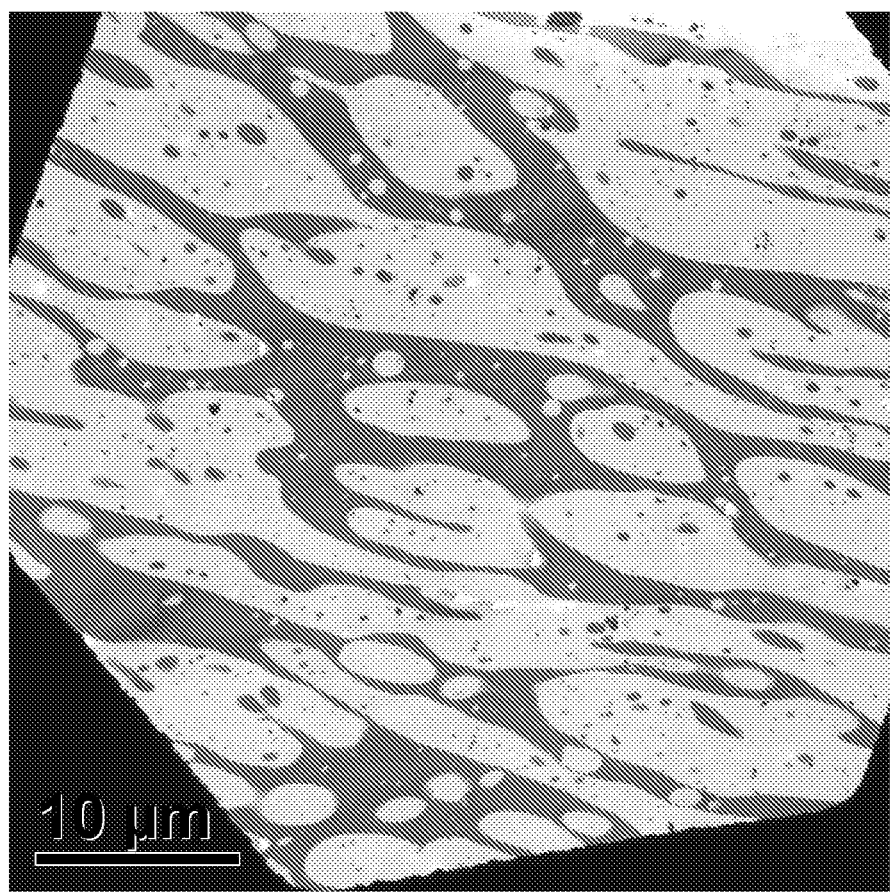
Figure 17:
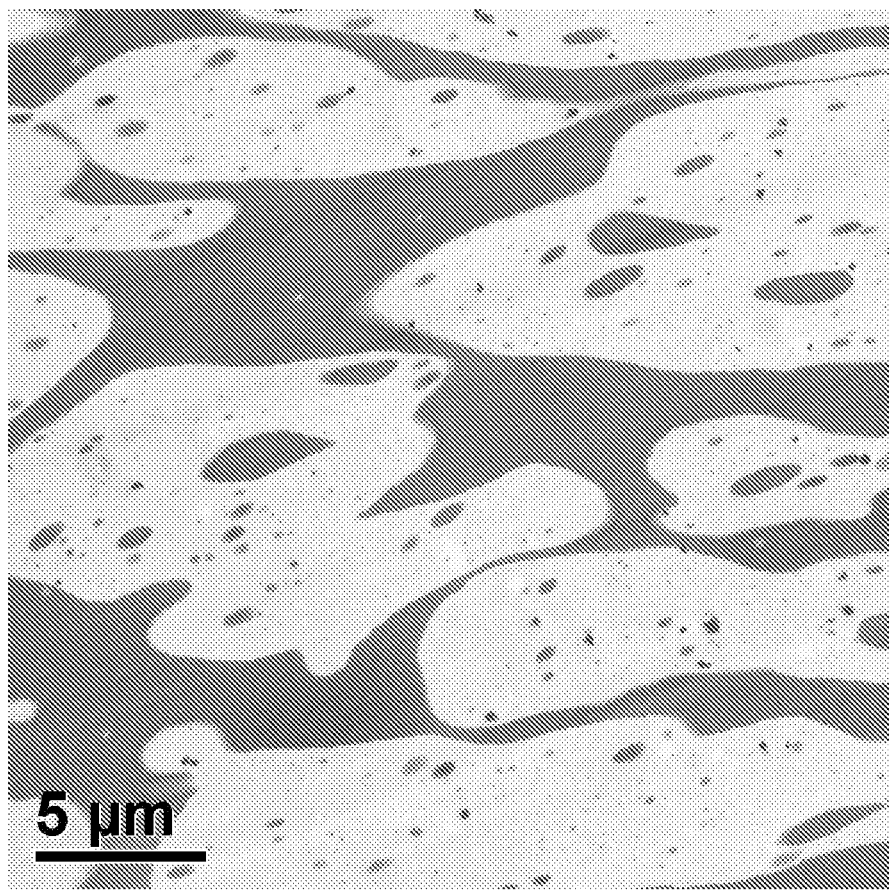
Figure 18:
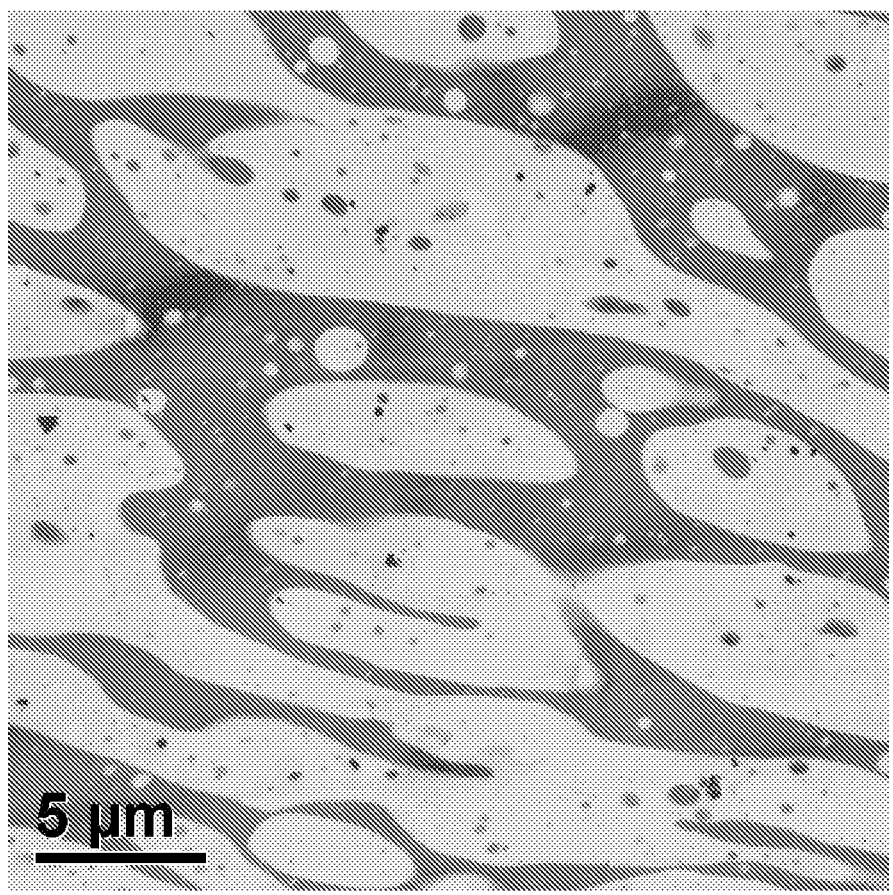

FIG. 8 shows the dependence of permeability with polyurethane content (plotted data from Compositions 7-9 of Table 6). The linear dependence quite accurately predicts the permeability of the neat Pellethane™ 2103-70A, which is around 0.13 (Perm-inch).

The inventive compositions as shown in Tables 5 and 6 can also be used in aqueous and non-aqueous dispersions.

Example 18

Morphology Study III

Extruded sheets were formed from the compatibilized compositions as shown in Table 7. All weight percentages are based on the total weight of the composition.

Formation of Extruded Sheets

TABLE 7

POE/PELLETHANE ™ Compositions for morphology study

| Compositions | 10 | 11 | 12 | Comparative 3 |
|---|---|---|---|---|
| ENR7086 | 57 | 69.5 | 59.5 | 51.74 |
| Pellethane 2102-80A | 36 | 25 | 36 | 36.26 |
| Amplify GR216 | 5 | 3.5 | 2.5 | |
| FUSABOND 493D (1% MAH graft) | | | | 10 |

TABLE 7-continued

POE/PELLETHANE ™ Compositions for morphology study

| Compositions | 10 | 11 | 12 | Comparative 3 |
|---|---|---|---|---|
| Ebony Color Conc. | 2 | 2 | 2 | 2 |
| | 100 | 100 | 100 | |
| Surface Energy extruded sheets | 36 | 36 | 41 | 32 |
| Surface Energy criteria Pass/Fail (>35 dyne/cm - pass) | Pass | Pass | Pass | Fail |
| Ultimate Tensile (MPa) MD | 22.2 | 22.9 | 25.6 | |
| Elongation (%) MD | 656.9 | 668.8 | 619.1 | |
| Die C Tear Strength (N/mm) | 93.4 | 91.8 | 94.4 | 47.3 |
| 60 degree gloss | 2.5 | 5.0 | 29.9 | 3.6 |
| Heat Aging @ 120° C. | NM | NM | | |
| Tensile Original (MPa) | | | 38.5 | 26 |
| 72 hr | | | 45.0 | NM |
| 7 Days | | | NM | 30.8 |
| 14 Days | | | NM | 27.6 |
| 21 Days | | | NM | 28 |
| Elongation Original % | | | 482 | 600 |
| 72 hr | | | 636 | NM |
| 7 Days | | | NM | 593 |
| 14 Days | | | NM | 548 |
| 21 Days | | | NM | 623 |

Table 7 shows formulation Compositions 10-12 with Comparative Composition 3, and the results of surface energy testing. The inventive blends show very good surface energies, in addition to good mechanical properties and gloss. Such compositions should have good adhesion to paints and foamed polar polymer compositions. Comparative Composition 3 failed surface energy testing.

Morphology

The morphology of two extruded sheets, prepared from the compositions 10 and 12 (see Table 7) are examined by Transmission Electron Microscopy (TEM). Micrographs are shown in FIGS. 9-18, respectively, for each sheet composition listed in Table 8.

TABLE 8

Sheet compositions for morphology study

| Figure | ENR7086 (wt %) | Pellethane ™ 2102-80A (wt %) | Amplify ™ GR-216 (wt %) | Section of film examined | Magnification (μm) |
|---|---|---|---|---|---|
| 9 | 57 | 36 | 5 | skin | 10 |
| 10 | 59.5 | 36 | 2.5 | skin | 10 |
| 11 | 57 | 36 | 5 | skin | 5 |
| 12 | 59.5 | 36 | 2.5 | skin | 5 |
| 13 | 57 | 36 | 5 | skin | 1 |
| 14 | 59.5 | 36. | 2.5 | skin | 1 |
| 15 | 57 | 36 | 5 | core | 10 |
| 16 | 59.5 | 36 | 2.5 | core | 10 |
| 17 | 57 | 36 | 5 | core | 5 |
| 18 | 59.5 | 36 | 2.5 | core | 5 |

Each weight percent given in Table 8 is based on the total weight of the composition, and each composition contained 2 weight percent of the "ebony concentrate."

Sample pieces were cut from each of the extruded sheets and trimmed in order to cut the sections parallel to the direction of orientation. Due to the thickness of the sheets, it was possible to section one location and to examine both the skin and core of the samples. The trimmed blocks were cryogenically sectioned at −120° C., to approximately 100 nm in thickness, using a diamond knife on a Leica UC6 microtome, equipped with an FC6 cryosectioning chamber. The sections were placed on 400 mesh virgin copper grids, and post stained, using the vapor phase of an aqueous 0.5 percent ruthenium tetraoxide solution for approximately 5 minutes.

Bright-field images were collected on a JEOL JEM 1230, operated at 100 kV accelerating voltage, and collected using Gatan 791 and Gatan 794 digital cameras. The images were post processed using Adobe Photoshop 7.0.

As seen from FIGS. 9-18, the composition with 2.5 weight percent Amplify™ GR 216 resulted in a layered morphology with TPU at the surface. It is the presence of the TPU at the surface which increases its surface energy and is most preferred for adhesion. The 5 weight percent composition approached co-continuity, but was not as layered. Thus, it is the combination of, polyurethane, functionalized polyolefin polymer, and polyolefin polymer that provide the best properties for good adhesion to polar polymers and paint compositions.

Example 19

Compositional Testing for Compatabilized Compositions

Extruded sheets were formed from the compatibilized compositions as shown in Table 9. All weight percentages are based on the total weight of the composition. All compositions in Table 9 are tumble blended, put though a Maddock mixing screw, a Killion sheet line, and produce a sheet 40 mil thick.

TABLE 9

Compositional testing on composition properties

| Composition | | | 13 | 14 | 15 | 16 | 17 | 18 | 19 | 20 |
|---|---|---|---|---|---|---|---|---|---|---|
| ENR 7086.01 | | | 59.00 | | | 62.00 | | | | |
| ENR 6386.00 | | | | 34.00 | | | 37.00 | 29.00 | | |
| ENGAGE 7387 | | | | | 34.00 | | | | 37.00 | 29.00 |
| Profax SR260s | | | | 25.00 | 25.00 | | 25.00 | 30.00 | 25.00 | 30.00 |
| PELLETHANE 2102-80A | | | 38.00 | 38.00 | 38.00 | 38.00 | 38.00 | 38.00 | 38.00 | 38.00 |
| Hardness Type A - 10 @ B1470 ASTM Lab | | % | 89 | 90 | 89 | 90 | 91 | 93 | 87 | 90 |
| Tear: Thermoplastic Type C- CD | Avg-Tear Strength | lbf/in | 503 | 476 | 579 | 467 | 393 | 541 | 515 | 595 |
| Tear: Thermoplastic Type C- MD | Avg-Tear Strength | lbf/in | 533 | 506 | 555 | 525 | 482 | 594 | 539 | 646 |
| Tensile - ASTM D412C CD @ B1470 ASTM Lab | Avg- Stress @ Brk | psi | 4116 | 1699 | 3534 | 3054 | 1040 | 1840 | 2725 | 3600 |
| | Avg- Strain @ Break | % | 499 | 356 | 495 | 499 | 243 | 381 | 451 | 487 |

TABLE 9-continued

Compositional testing on composition properties

| Composition | | | 13 | 14 | 15 | 16 | 17 | 18 | 19 | 20 |
|---|---|---|---|---|---|---|---|---|---|---|
| Tensile - ASTM D412C MD @ B1470 ASTM Lab | Avg- Stress @ Brk | psi | 5116 | 2601 | 4232 | 4832 | 1040 | 2587 | 4353 | 4621 |
| | Avg- Strain @ Break | % | 476 | 396 | 461 | 489 | 243 | 390 | 473 | 492 |
| Surface energy | | dyne/cm | 35 | 32 | 34 | 36 | 34 | 32 | 34 | 32 |
| Cross-hatch paint adhesion test rating for coating with PU coating AWOF-0082 from United Paint | | Rating | 5 | 5 | 5 | 3 | 3 | 4 | 3 | 5 |
| Adhesion of "Dow Great Stuff Insulating Foam" (Cohesive failure) | | Pass/Fail | Pass | Fail | Pass | Fail | Fail | Fail | Pass | Fail |

The results in Table 9 show that in order to have good physical properties and have excellent adhesion to polar polymers, a combination of polyolefin polymer, less than 10 wt percent of a functionalized polyolefin polymer which acts as a compatibilizer, and a polar polymer (for example, polyurethane) is required. Removal of any one of the three components results in either a loss in polymer performance or poor adhesion.

Example 20

Compounding and Compositional Trials

Tables 10, 11, and 12 contain Compositions processed on a ZSK-25 Werner Pfliedler twin screw extruder. A temperature profile is maintained of 140° C., 170° C., 170° C., and 170° C. in heating zones 1 through zone 4, respectively. The extruded compositions are dried and re-extruded into 20 ml thick sheets using a Killion three sheet line with a Maddock mixing screw while maintaining a temperature profile of 175° C., 185° C., and 190° C.

TABLE 10

Compounding and compositional trials, part 1

| Compositions | | | 21 | 22 | 23 | 24 | 25 |
|---|---|---|---|---|---|---|---|
| ENR 7086.01 | | | 60.5 | 60.5 | 60.5 | 60.5 | 60.5 |
| Pellethane 2103-70A | | | 37 | 0 | 0 | 0 | 0 |
| Pellethane 2355-80AE | | | 0 | 37 | 0 | 0 | 0 |
| Pellethane 2103-80AEF | | | 0 | 0 | 37 | 0 | 0 |
| Pellethane 2355-80AEI | | | 0 | 0 | 0 | 37 | 0 |
| Pellethane 2102-80A | | | 0 | 0 | 0 | 0 | 37 |
| Amplify GR216 | | | 2.5 | 2.5 | 2.5 | 2.5 | 2.5 |
| Gloss 60 deg - Film @ B-1470 ASTM Lab | Average of Five Readings | % | 13 | 18 | 14 | 62 | 63 |
| Tear: Thermoplastic Type C- CD @ B-1470 ASTM Lab | Avg-Tear Strength | lbf/in | 429 | 530 | 461 | 503 | 492 |
| Tear: Thermoplastic Type C- MD @ B-1470 ASTM Lab | Avg-Tear Strength | lbf/in | 424 | 593 | 525 | 532 | 524 |
| Tensile - CD - D638 @ B-1470 ASTM Lab | Avg-STRESS@BREAK | psi | 2716 | 4445 | 3189 | 4107 | 3874 |
| | Avg-STRAIN@BREAK | % | 583 | 530 | 579 | 525 | 530 |
| Tensile - MD - D638 @ B-1470 ASTM Lab | Avg-STRESS@BREAK | psi | 4145 | 5806 | 3990 | 6052 | 5888 |
| | Avg-STRAIN@BREAK | % | 582 | 440 | 401 | 462 | 438 |
| Surface energy | | dyne/cm | 36 | 35 | 34 | 34 | 34 |
| Cross-hatch paint adhesion test rating for coating with PU coating AWOF-0082 from United Paint | | Rating | 5 | 5 | 5 | 5 | 5 |
| Adhesion of "Dow Great Stuff Insulating Foam" (Cohesive failure) | | Pass/Fail | Pass | Pass | Pass | Pass | Pass |

TABLE 11

Compounding and compositional trials, part 2

| Compositions | | | 27 | 28 |
|---|---|---|---|---|
| Engage 7387 | | | 60.5 | 0 |
| ENR 6386 | | | 0 | 60.5 |
| Pellethane 2103-70A | | | 37 | 37 |
| Amplify GR216 | | | 2.5 | 2.5 |
| Gloss 60 deg - Film @ B-1470 ASTM Lab | Average of Five Readings | % | 14 | 43 |
| Tear: Thermoplastic Type C- CD @ B-1470 ASTM Lab | Avg-Tear Strength | lbf/in | 222 | 228 |
| Tear: Thermoplastic Type C- MD @ B-1470 ASTM Lab | Avg-Tear Strength | lbf/in | 281 | 235 |
| Tensile - CD - D638 @ B-1470 ASTM Lab | Avg-STRESS@BREAK | psi | 2022 | 1797 |
| | Avg-STRAIN@BREAK | % | 622 | 679 |

TABLE 11-continued

Compounding and compositional trials, part 2

| Compositions | | | 27 | 28 |
|---|---|---|---|---|
| Tensile - MD - D638 @ B-1470 ASTM Lab | Avg-STRESS@BREAK | psi | 2927 | 2087 |
| | Avg-STRAIN@BREAK | % | 567 | 606 |
| Surface energy | | dyne/cm | 34 | 34 |
| Cross-hatch paint adhesion test rating for coating with PU coating AWOF-0082 from United Paint | | Rating | 5 | 5 |
| Adhesion of "Dow Great Stuff Insulating Foam" (Cohesive failure) | | Pass/Fail | Pass | Pass |

TABLE 12

Compounding and compositional trials, part 3

| Compositions | | | 26 | 29 |
|---|---|---|---|---|
| Engage 8150 | | | 60.5 | 0 |
| Versify 2300 | | | 0 | 60.5 |
| Pellethane 2103-70A | | | 37 | 37 |
| Amplify GR216 | | | 2.5 | 2.5 |
| Gloss 60 deg - Film @ B-1470 ASTM Lab | Average of Five Readings | % | 34 | 57 |
| Tear: Thermoplastic Type C- CD @ B-1470 ASTM Lab | Avg-Tear Strength | lbf/in | 230 | 320 |
| Tear: Thermoplastic Type C- MD @ B-1470 ASTM Lab | Avg-Tear Strength | lbf/in | 316 | 389 |
| Tensile - CD - D638 @ B-1470 ASTM Lab | Avg-STRESS@BREAK | psi | 2770 | 3458 |
| | Avg-STRAIN@BREAK | % | 645 | 720 |
| Tensile - MD - D638 @ B-1470 ASTM Lab | Avg-STRESS@BREAK | psi | 3326 | 4776 |
| | Avg-STRAIN@BREAK | % | 614 | 684 |
| Surface energy | | dyne/cm | 34 | 32 |
| Cross-hatch paint adhesion test rating for coating with PU coating AWOF-0082 from United Paint | | Rating | 5 | 5 |
| Adhesion of "Dow Great Stuff Insulating Foam" (Cohesive failure) | | Pass/Fail | Pass | Pass |

Tables 13 and 14 contain Compositions processed on a ZSK-30 Werner Pfliedler twin screw extruder. A temperature profile is maintained of 140° C., 170° C., 170° C., and 170° C. in heating zones 1 through zone 4, respectively. They are then dried and extruded into 20 ml thick sheets using a temperature profile of 175° C., 185° C., and 190° C. on a ¾" Haake extruder.

TABLE 13

Compounding and compositional trials, part 4

| Compositions | | | 30 | 31 | 32 | 33 | 34 | 35 | 36 |
|---|---|---|---|---|---|---|---|---|---|
| ENR 7086 | | | 63 | 61.75 | 60.5 | 58 | 55.5 | 53 | 63 |
| Pellethane 2102-80A | | | 37 | 37 | 37 | 37 | 37 | 37 | 0 |
| Pellethane 2103-70A | | | 0 | 0 | 0 | 0 | 0 | 0 | 37 |
| Pellethane 2355-80AE | | | 0 | 0 | 0 | 0 | 0 | 0 | 0 |
| Amplify GR 216 | | | 0 | 1.25 | 2.5 | 5 | 7.5 | 10 | 0 |
| Gloss 60 deg - Film @ B-1470 ASTM Lab | Average of Five Readings | % | 18.96 | 28.58 | 31.66 | 6.94 | 38.02 | 38.6 | 10.64 |
| Tear: Thermoplastic Type C- MD @ B-1470 ASTM Lab | Avg-Tear Strength | lbf/in | 396.69 | 529.34 | 586 | 475.3 | 505.9 | 513.9 | 248.811 |
| Tensile - Micro @ B-3833 | Avg-ULTIMATE | psi | 940.2 | 2170.4 | 3756 | 7937 | 4313 | 4287 | 635.16 |
| | Avg-% ELONGATION | % | 217.18 | 482.74 | 618.8 | 687 | 697.6 | 703.3 | 71.08 |
| Surface energy | | dyne/cm | 36 | 34 | 34 | 32 | 32 | 32 | 36 |
| Cross-hatch paint adhesion test rating for coating with PU coating AWOF-0082 from United Paint | | Rating | 5 | 5 | 5 | 5 | 5 | 5 | 5 |
| Adhesion of "Dow Great Stuff Insulating Foam" (Cohesive failure) | | Pass/Fail | Pass | Pass | Pass | Pass | Pass | Pass | Pass |

TABLE 14

Compounding and compositional trials, part 5

| Compositions | | | 37 | 38 | 39 | 40 | 41 | 42 | 43 |
|---|---|---|---|---|---|---|---|---|---|
| ENR 7086 | | | 61.75 | 60.5 | 58 | 63 | 61.75 | 60.5 | 58 |
| Pellethane 2102-80A | | | 0 | 0 | 0 | 0 | 0 | 0 | 0 |
| Pellethane 2103-70A | | | 37 | 37 | 37 | 0 | 0 | 0 | 0 |
| Pellethane 2355-80AE | | | 0 | 0 | 0 | 37 | 37 | 37 | 37 |
| Amplify GR 216 | | | 1.25 | 2.5 | 5 | 0 | 1.25 | 2.5 | 5 |
| Gloss 60 deg - Film @ B-1470 ASTM Lab | Average of Five Readings | % | 16.74 | 19.72 | 15.38 | 6.68 | 7.44 | 6.62 | 6.16 |
| Tear: Thermoplastic Type C- MD @ B-1470 ASTM Lab | Avg-Tear Strength | lbf/in | 309.49 | 382.52 | 325.7 | 431.6 | 491.4 | 522.8 | 491.008 |
| Tensile - Micro @ B-3833 | Avg-ULTIMATE | psi | 784.88 | 1028.8 | 1229 | 850.4 | 1272 | 1927 | 25631.28 |
| | Avg-% ELONGATION | % | 263.06 | 343.16 | 425.9 | 219.2 | 348.9 | 451.6 | 522.46 |
| Surface energy | | dyne/cm | 36 | 36 | 36 | 38 | 40 | 38 | 36 |
| Cross-hatch paint adhesion test rating for coating with PU coating AWOF-0082 from United Paint | | Rating | 5 | 5 | 5 | 5 | 5 | 5 | 5 |
| Adhesion of "Dow Great Stuff Insulating Foam" (Cohesive failure) | | Pass/Fail | Pass | Pass | Pass | Pass | Pass | Pass | Pass |

The results from the five tables confirm that when one of the three polymer components of the invention are missing, the tensile strength and elongation properties of the blend composition are vastly inferior to the blend composition containing all three components—an polyolefin polymer, less than 10 wt percent of a functionalized polyolefin polymer which acts as a compatibilizer, and a polar polymer (for example, polyurethane).

Example 21

Overmolding of Compatabilized Compositions

This example demonstrates adhesion properties of several compatabilized compositions for objects that are over-molded.

Reaction

The compatibilizer 8407-g-Amine (B) is an ENGAGE 8407-g-(2[N-ethylamino]ethylsuccinimide (0.87 density; approx. 5 melt index; 1.2 wt percent [N-ethylamino]ethylsuccinimide), and has the structure as shown in structure (IX):

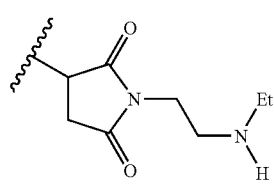

(IX)

The grafted polymer is prepared by reacting a maleic anhydride grafted Engage 8407 (0.87 density, 5 MI, and approx. 0.74 wt percent MAH grafting level) with ethylethylenediamine using two equivalents of the diamine/anhydride. The diamine is imbibed in the pellets of the maleic anhydride grafted Engage 8407, and the imbibed pellets are melt blended in a small REX extruder.

The compatibilizer 8407-g-OH is ENGAGE-g-(2-hydroxyethylsuccinimide) (0.87 density; approx. 5 melt index; 1.0 wt percent hydroxyethylsuccinimide) is prepared by reacting, in an extruder, the maleic anhydride grafted Engage 8407 (0.87 density, 5 MI, 0.74 wt percent anhydride) with a ethanolamine using 3.5 equivalents of the ethanolamine/anhydride. The reaction is shown in Equation 5:

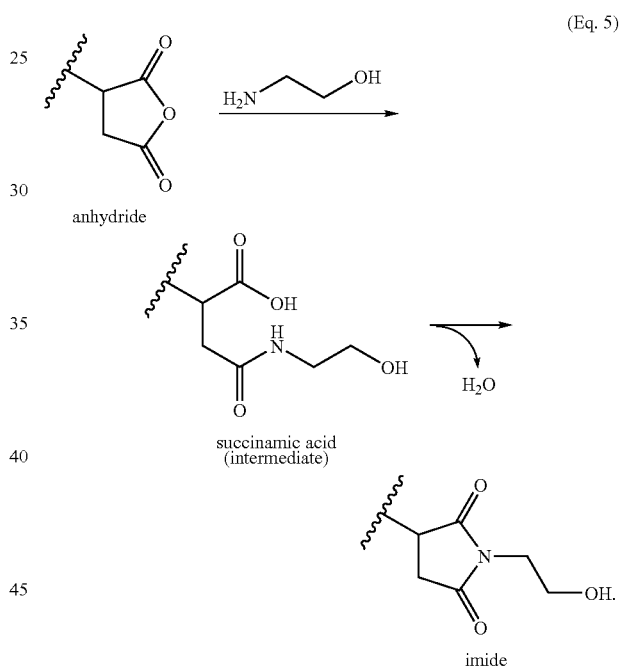

(Eq. 5)

anhydride succinamic acid (intermediate)

imide

Overmolding Testing

Each substrate (Isoplast™ 2530, Pellethane™ 2102-80A, CAPRON (Nylon 6), Polycarbonate Calibre™ 200-14, PET (Eastman EASTAR EN-001) and PBT GE plastics 315-1001) was injection molded into a plaque of dimensions: 3 in×3.5 in×0.0625 (thickness). Each plaques was then inserted into a mold (0.125" thick), and a 0.5 in wide strip of scotch tape was placed across one end (along outer edge, parallel to the 3" edge) of the plaque to create a zone with no adhesion between the substrate and the composition used for over-mold layer. The compositions used as the over-mold layer are shown in Tables 15 and 16. Each composition was over-molded onto each of the substrates described above, at a melt temperature close to 250° C., and a mold temperature of 18° C., to form an over-molded substrate.

Each over-molded substrate was stamp with a one slit die to create 6 to 8 strips, parallel to the 3" width of the plaque. Each strip was of dimension: 5.2 mm wide and 3 inches long. The free end (end containing the inner scotch layer) of the over-molded substrate was inserted into an air grip device on a 4201 Instron tensile tester, equilibrated at 23° C. and 50 percent RH (Relative Humidity).

Figure 19:
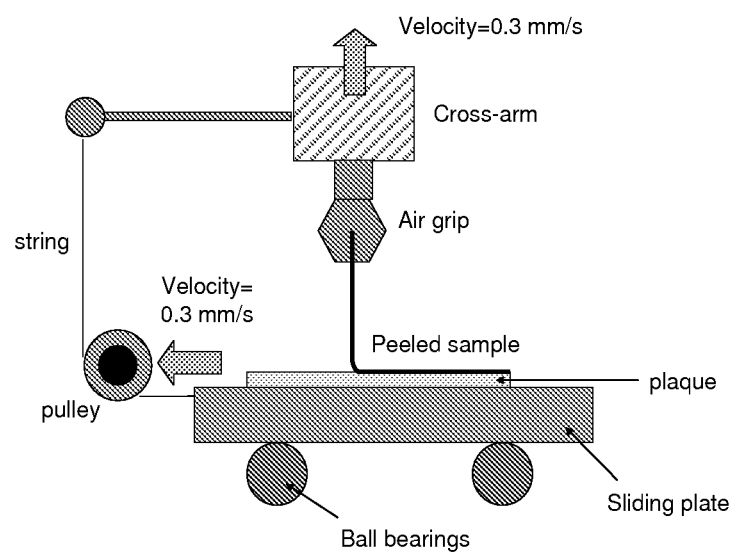
FIG. 19 is a schematic of the instrumentation for the adhesive testing of over-molded substrates.

A schematic of the test equipment is shown in FIG. 19. The substrate plaque was tightly attached to the base of an Instron peel test device, and the sliding plate (see FIG. 19), movable by means of ball bearings, was moved at the same speed as the cross head, using the pulley of the peel test device to translate the vertical motion of the cross arm to a horizontal motion of the sliding plate. This resulted in a full force applied perpendicularly to the plaque. The specific step-up is called the "90 degree peel test," and is referenced in ASTM D6862-04. The speed of the displacement was constant at "0.3 mm/s" force, and each displacement is recorded automatically using Bluehill software available from Instron. The load, reported in Newtons (N), is divided by the width of the stripe to obtain peel strength in N/mm. The mean value and the standard deviation of each peel strength over a range of 10-30 mm is reported, as "mean plus/minus standard deviation," as shown in Tables 15 and 16.

TABLE 15

Peel strength of Compositions for various substrates, part 1

| | Substrate Over-mold Composition | Isoplast 2530 Peel Strength (N/mm) | Polycarbonate Calibre 200-14 Peel Strength (N/mm) | Pellethane 2102-80A Peel Strength (N/mm) |
|---|---|---|---|---|
| CC 4 | Lotadar 8900 | 0.37 ± 0.11 | 1.32 ± 0.18 | 0.022 ± 0.005 |
| CC 5 | EVA 265 | 0.26 ± 0.11 | 3.33 ± 0.09 | 0.091 ± 0.020 |
| 48 | 5% 8407-g-Amine (A) in 8200 | 1.02 ± 0.34 | 0.012 ± 0.002 | 0.61 ± 0.15 |
| 49 | 5% 8407-g-Amine (A) in 9507 | 1.67 ± 0.77 | 0.11 ± 0.04 | 0.39 ± 0.08 |
| 50 | 5% 8407-g-OH in 8100 | 0.017 ± 0.010 | 0.18 ± 0.06 | |
| 51 | 5% 8407-g-OH in 9000 | 0.07 ± 0.11 | | |
| 46 | 5% 8407-g-Amine (B) in 8100 | 1.86 ± 0.41 | 0.11 ± 0.03 | 0.24 ± 0.03 |
| 47 | 5% 8407-g-Amine (B) in 9000 | 4.62 ± 0.26 | 0.35 ± 0.04 | 3.30 ± 0.06 |
| 44 | 5% Affinity-g-Amine in 8100 | 1.61 ± 0.28 | 0.08 ± 0.01 | |
| 45 | 5% Affinity-g-Amine in 9000 | 3.05 ± 0.05 | | 2.30 ± 0.17 |
| 49A | 8407-g-OH | 0.05 ± 0.01 | 0.55 ± 05 | |
| 52 | Amplify GR 216 | 0.90 ± 0.16 | 0.19 ± 0.04 | |
| 48A | 8407-g-Amine (B) | 2.58 ± 0.14 | 0.16 ± 0.02 | |
| CC 9 | ENR 7086/Polybd 2035 63:37 | 0.25 ± 0.04 | 0.44 ± 0.07 | |

TABLE 16

Peel strength of Compositions for various substrates, part 2

| | Substrate Over-mold Composition | PET (Eastar EN-001) Peel Strength (N/mm) | PBT GE Plastics 315-1001 Peel Strength (N/mm) | Nylon Capron 6 Peel Strength (N/mm) |
|---|---|---|---|---|
| CC 4 | Lotadar 8900 | 0.28 ± 0.07 | 0.081 ± 0.012 | 0.038 ± 0.008 |
| CC 5 | EVA 265 | 0.37 ± 0.02 | 0.043 ± 0.014 | 0.029 ± 0.009 |
| 48 | 5% 8407-g-Amine (A) in 8200 | 0.023 ± 0.002 | | 0.019 ± 0.012 |
| 49 | 5% 8407-g-Amine (A) in 9507 | | | 0.064 ± 0.008 |
| 50 | 5% 8407-g-OH in 8100 | | | 0.023 ± 0.009 |
| 51 | 5% 8407-g-OH in 9000 | 0.077 ± 0.011 | 0.026 ± 0.011 | 0.027 ± 0.007 |
| 46 | 5% 8407-g-Amine (B) in 8100 | 0.054 ± 0.004 | 0.048 ± 0.007 | 0.023 ± 0.013 |
| 47 | 5% 8407-g-Amine (B) in 9000 | 0.15 ± 0.02 | 0.12 ± 0.02 | 0.033 ± 0.005 |
| 44 | 5% Affinity-g-Amine in 8100 | 0.19 ± 0.02 | 0.14 ± 0.02 | 0.042 ± 0.021 |
| 45 | 5% Affinity-g-Amine in 9000 | | 0.045 ± 0.012 | 0.046 ± 0.015 |
| CC 6 | Santoprene TPV 191-55PA | | | 0.24 ± 0.06 |
| CC 7 | Santoprene TPV 8291-70PA | | | 0.13 ± 0.02 |
| CC 8 | Santoprene TPV 8271-55B100 | | | 0.082 ± 0.028 |

TABLE 16-continued

Peel strength of Compositions for various substrates, part 2

| | Substrate Over-mold Composition | PET (Eastar EN-001) Peel Strength (N/mm) | PBT GE Plastics 315-1001 Peel Strength (N/mm) | Nylon Capron 6 Peel Strength (N/mm) |
|---|---|---|---|---|
| 49A | 8407-g-OH | 0.02 ± 0.00 | | 0.02 ± 0.01 |
| 52 | Amplify GR 216 | 0.09 ± 0.02 | 0.02 ± 0.01 | 0.90 ± 0.43 |
| 48A | 8407-g-Amine (B) | 0.28 ± 0.02 | | 0.39 ± 0.05 |
| CC 9 | ENR 7086/PolyBD 2035 63:37 | 0.17 ± 0.02 | 0.37 ± 0.03 | 0.17 ± 0.02 |

Six to eight test specimens were tested in each analysis. As seen from the results, the blends of Compositions 44-51 have good adhesion properties to polar substrates, and often have comparable or better adhesion as compared to the pure functionalize polymers of the Comparative Compositions 4-9.

Example 22

Footwear Paint Adhesion

Paints typically used in the Footwear industry were purchased from Kenda Farben S.P.A., Italy. 5 pbw of an isocyanate (NCO) prepolymer also purchased from Kendra was pre-blended with the paint. A paint thickness less than 20 microns is applied to the samples using an airbrush. Samples are then heated in a 110° C. hot oven for 15 minutes.

A cross-hatch paint adhesion test is conducted 24 hours later according to ASTM D 3359-02. A blade device is used to obtain 10×10 2 mm square grids. A TESA Tesafix (04970-00154-00) type tape is pressed onto the sample area. After about 60 second tape is pealed perpendicular with a fast movement off the sample. This is repeated 2 or 3 times as often as paint squares come of the sample. Peeled off squares are counted and percent adhesion is reported.

TABLE 17

Paint adhesion to footwear paints

| | percent paint adhesion | % paint adhesion without NCO |
|---|---|---|
| Engage 8200 | 0 | |
| Lotader 8900 | 40 | |
| EVA 265 | 45 | |
| Engage 8407-g-Amine | 100 | 100 |
| Engage 8407-g-Hydroxyl | 100 | 45 |
| Engage 8407-g-Hydroxyl 25%, 75% Engage 8200 | 100 | |

TABLE 17-continued

Paint adhesion to footwear paints

| | percent paint adhesion | % paint adhesion without NCO |
|---|---|---|
| Engage 8407-g-Hydroxyl 5%, 95% Engage 8200 | 95 | |
| Engage 8407-g-Amine 25%, 75% Engage 8200 | 100 | |
| Engage 8407-g-Amine 5%, 95% Engage 8200 | 95 | |

Example 23

Polyurethane Glue Adhesion to Functionalized Polyolefin Polymers

Composition blends shown in Table 18 were compounded on a ¾" Hakke twin screw extruder. Plaques 0.125" thick were made and subjected to a polyurethane (PU) glue adhesion test used in the Footwear industry. Typically polymer samples used in the footwear industry need to pass 5 N/mm peel strength.

The polymer surface is cleaned with toluene and abraded with sandpaper grade 60. The PET backing and polymer surface are primed with a mixture of MEK, Footwear Adhesive Forestali Poligrip M328, and Desomdur RFE using a paint brush. These are allowed to dry at room temperature followed by heating at 100° C. for 30 seconds. A mixture of the adhesive and Desomdur RFE is then applied to both parts and allowed to dry at room temperature. The polymer plaque is heated in the oven at 110° C. for 5 minutes and the PET backing is heated for 1 minute. The adhesive sides of the PET backing and the polymer are put together and pressed mildly with a hammer. The sandwich is taken to a hot press and pressed between two 2 cm thick foam sheets for 1 minute at 10 bar and room temperature. This sample is then subjected to a peel test and results reported in Table 18.

TABLE 18

Compositions and adhesion of PU glues to blends of functional polymers with polyurethane-impregnated PET fabric, part 1

| Composition | 53 | 54 | 55 | 56 | 57 | 58 | 59 | 60 | 61 | 62 |
|---|---|---|---|---|---|---|---|---|---|---|
| Engage 8200 | 90 | 80 | 60 | 30 | 90 | 80 | 60 | 30 | 0 | 0 |
| Amplify GR 216-g-DEDA | 10 | 20 | 40 | 70 | 0 | 0 | 0 | 0 | 100 | 0 |
| 8407-g DEDA | 0 | 0 | 0 | 0 | 10 | 20 | 40 | 70 | 0 | 100 |
| Adhesion [N/mm] | 7.2 | 5.5 | 3.6 | 4.2 | 7.2 | 6.1 | 7.6 | 9.2 | 4.3 | 8.9 |
| StdDev [N/mm] | 0.6 | 1.2 | 0.3 | 1.2 | 0.5 | 0.5 | 0.3 | 0.4 | 0.6 | 0.6 |

TABLE 19

Compositions and adhesion of PU glues to blends of functional polymers with PU impregnated PET fabric, part 2

| Composition | 63 | 64 | 65 | 66 | 67 |
|---|---|---|---|---|---|
| Engage 8200 | 75 | 50 | 25 | 0 | 100 |
| 8407-g OH | 25 | 50 | 75 | 100 | 0 |
| Adhesion [N/mm] | 9.0 | 7.8 | 7.9 | 9.7 | 3.5 |

Example 24

Overmolding Materials with Functionalized Polyolefin Polymers

Plaques of the functionalized polyolefin polymers are injection molded and then the overmolded materials (for example, Isoplast) are over-molded on top of these plaques. A 90 degree peel test is then performed to generate peel strength data shown in Table 20 in N/mm.

TABLE 20

Injection molding of overmold materials onto blends of functional polymers

| Overmold material<br>Substrate | Isoplast | Pellethane<br>2102-80A | Pellethane<br>2355-80AE | Pellethane<br>2103-70A |
|---|---|---|---|---|
| 5% 8407-g-Amine in Versify 2300 | 5.1 | 3.0 | 4.0 | 2.2 |
| 5% 8407-g-Amine in ENR 7467 | 2.7 | 3.2 | 3.8 | 2.4 |
| 5% 8407-g-Amine in ENR 7086 | 5.2 | 5.4 | 10.0 | 5.0 |
| 5% AffinityGA1950-g-Amine in Versify 2300 | 1.8 | 8.9 | 6.4 | 3.3 |
| 5% AffinityGA1950-g-Amine in ENR 7467 | 2.5 | 2.5 | 2.3 | 2.2 |
| 5% AffinityGA1950-g-Amine in ENR 7086 | 1.1 | 4.6 | 4.8 | 3.2 |
| 5% 8407-g-Amine in ENR 8100 | 5.1 | 4.6 | 3.0 | 2.7 |
| 5% Affinity1950-g-Amine in ENR 8100 | 3.1 | 3.1 | 2.8 | 1.9 |
| 5 wt % 8407-g-MAH in Engage 8100 | 0.1 | 0.1 | 0.1 | 0.4 |
| 5 wt % Polybond3150-g-Amine in ENR 8100 | 2.9 | 5.2 | 1.7 | 3.6 |
| 5 wt % 8407-g-MAH in Versify 2300 | 0.2 | 0.5 | 0.4 | 0.5 |
| 5 wt % PP-g-Amine in Versify 2400 | 5.4 | 1.9 | 3.6 | 4.5 |
| 10 wt % of PP-g-Amine in Versify 2300 | 2.2 | 1.7 | 7.6 | 3.8 |
| 10 wt % of 8407-g-Amine in Versify 2300 | 3.4 | 4.6 | 4.8 | 2.5 |
| 5 wt % GR216-g-Amine in Engage 8200 | 3.9 | 5.9 | 4.0 | 3.8 |
| 5 wt % GR216-g-Amine in Versify 4301 | 0.8 | 2.0 | 3.5 | 4.8 |
| 5 wt % Engage 8407-g-DEDA with 95% ENR 7270 | 5.3 | 6.8 | 5.7 | 5.9 |
| 5 wt % Engage 8407-g-DEDA with 95 wt % Flexomer 1095 | 0.0 | 0.0 | 0.2 | 0.2 |
| 5 wt % Engage 8407-g-DEDA with 95 wt % ENR 8100 | 4.31 | N/M | N/m | N/m |
| 5 wt % Engage 8407-g-DEDA with 95 wt % ENR 7380 | 2.96 | N/M | N/m | N/m |
| 5 wt % Engage 8407-g-DEDA with 95 wt % ENR 8480 | 0.83 | N/M | N/m | N/m |
| 5 wt % Polybond X5104-g-DEDA in 95 wt % Engage 8100 | 0.05 | N/M | N/m | N/m |
| 5 wt % Polybond X5104-g-DEDA in 95 wt % Versify 2300 | 0.36 | N/m | N/m | N/m |
| 5 wt % VERSIFY 2000-g-DEDA in 95 wt % Engage 8100 | 0.69 | N/m | N/m | N/m |
| 5 wt % VERSIFY 2000-g-DEDA in 95 wt % VERSIFY 2300 | 1.21 | N/m | N/m | N/m |
| Neat 8407-g-Amine | 3.3 | 4.4 | 6.5 | 10.0 |
| Neat 8402-g-Amine | 3.3 | 1.1 | 8.7 | 6.8 |
| Neat 8407-g-MAH | too low | too low | too low | too low |
| Neat Engage 8200 | too low | too low | too low | too low |
| 5 wt % OBC 9807.10-g-DEDA with 95 wt % ENR 8100 | 1.3 | 3.5 | 5.3 | 3.9 |
| 5 wt % OBC 9807.10-g-DEDA with 95 wt % VERSIFY 2300 | 2.3 | 9.8 | 9.3 | 9.6 |
| 5 wt % OBC 9817.10-g-DEDA with 95 wt % ENR 8100 | 0.952029329 | | | |

As is evident from the table a wide range of polyolefin elastomers covering a range of crystallinity and MI are suitable as a matrix in which the functional elastomer is blended. Particularly suited are Engage elastomers such as ENR 7086 that have long chain branching. Grafted polyolefins made from very high MI materials such as AffinityGA1950 negatively impact adhesion. In general, blends of POE with functional POE's containing 5-10 wt percent of functional POE are at least equivalent or better in adhesion peel strength than just pure functional POE. They are better than MAH grafted polymers.

Example 25

Paint Adhesion of Functionalized Polyolefins with Other Paint Systems

Sherman Williams G55N2096 Soft Touch polyurethane paint with V66VM100 catalyst typically used on airbag covers was another paint system tested on these samples. A mixing ratio of 3.5:1 by volume is used and a target thickness of application of 1.8 mil was used.

NB coatings 04172R798 2K Black Mono with C775 mono catalyst polyurethane paint system used in a mixing ratio of 100:14 by weight with a target thickness of 1.0 mil was the third paint system that was evaluated. This is also used on exteriors of cars.

A cross-hatch paint adhesion test was carried out on five samples of each lot and percent adhesive failure was noted and an average value reported.

TABLE 21

| | Percentage paint adhesion | |
|---|---|---|
| | Paint | |
| Substrate | NB coatings Paint | Sherman Williams Paint |
| 5 wt % AffinityGA-g-Amine in ENR 7086 | 100 | 100 |
| 10 wt % 8407-g-Amine in 60% 6386 and 30% of D114 | 100 | 100 |
| 8407-g-Amine | 92.5 | 100 |
| 5 wt % Polybond3150-g-Amine in ENR 8100 | 69 | 100 |
| Polybond3150-g-Amine | 38 | 100 |

As is evident from Table 21 particularly suited as the major component of blends that are paintable are Engage™ elastomers such as ENR 7086 that have long chain branching. Grafted polyolefins made from very high MI materials such as AffinityGA1950 promote paintability in blends. But in general, blends of POE with functional POE's containing 5-10 wt percent of functional POE are at least equivalent or better in adhesion peel strength than just pure functional POE. They are better than MAH grafted polymers as well.

All applications, publications, patents, test procedures, and other documents cited, including priority documents, are fully to the extent such disclosure is not inconsistent with this invention and for all jurisdictions in which such incorporation is permitted.

While the illustrative embodiments have been described with particularity, it will be understood that various other modifications will be apparent to and can be readily made by those skilled in the art without departing from the spirit and scope of the invention. Accordingly, it is not intended that the scope of the claims to be limited to the examples and descriptions set forth but rather that the claims be construed as encompassing all the features of patentable novelty which reside in the present invention, including all features which would be treated as equivalents by those skilled in the art to which the invention pertains.

When numerical lower limits and numerical upper limits are listed herein, ranges from any lower limit to any upper limit are contemplated, inclusive.

In the description, all numbers disclosed are approximate values, regardless whether the word "about" or "approximate" is used in connection therewith. Depending upon the context in which such values are described herein, and unless specifically stated otherwise, such values may vary by 1 percent, 2 percent, 5 percent, or, sometimes, 10 to 20 percent. Whenever a numerical range with a lower limit, $R_L$ and an upper limit, $R_U$, is disclosed, any number falling within the range is specifically disclosed. In particular, the following numbers within the range are specifically disclosed: $R=R_L+k^*(R_U-R_L)$, wherein k is a variable ranging from 1 percent to 100 percent with a 1 percent increment, that is, k is 1 percent or 2 percent to 99 percent or 100 percent. Moreover, any numerical range defined by two R numbers as defined in the above is also specifically disclosed.

As used, the term "comprising" is inclusive or open-ended and does not exclude additional unrecited elements, compositional components, or method steps. Accordingly, such terms are intended to be synonymous with the words "has", "have", "having", "includes", "including", and any derivatives of these words.

We claim:

1. A process for preparing a functionalized polyolefin, said process comprising the following steps:
   A) grafting onto the backbone of a polyolefin at least one compound comprising at least one amine-reactive group to form a grafted polyolefin at a temperature from 130° C. to 170° C.; and
   B) reacting a primary-secondary diamine, with the grafted polyolefin, and selected from compounds of structure (I)

   $$H_2N-R_1-NH-R_2 \quad (I),$$

wherein $R_1$ is a divalent hydrocarbon radical; and $R_2$ is a monovalent hydrocarbon radical containing at least 2 carbon atoms, and optionally may be substituted with a heteroatom containing group;
   wherein step B) takes place subsequent to step A) without the isolation of the grafted polyolefin in solid form, and
   wherein both steps A) and B) take place in a melt reaction, and
   wherein the level of primary-secondary diamine is from 2 to 8 mole equivalent of amine to grafted anhydride; and
   wherein the polyolefin is selected from the group consisting of the following:
   high density polyethylene, low density polyethylene, linear low density polyethylene, homogeneously branched linear ethylene/alpha-olefin interpolymers, homogeneously branched substantially linear ethylene/alpha-olefin interpolymers, and combinations thereof, and
   wherein step A takes place in an extruder, and step B takes place in a gear pump.

2. The process of claim 1, wherein the polyolefin is an ethylene/α-olefin copolymer, and wherein the α-olefin is a $C_3$-$C_{20}$ α-olefin.

3. The process of claim 1, wherein the level of primary-secondary diamine is from 4 to 6 mole equivalent of amine to grafted anhydride.

4. The process of claim 3, wherein there is no venting of volatiles between steps A and B.

5. The process of claim 1, wherein the primary-secondary diamine is selected from the group consisting N-ethylethylenediamine, N-phenylethylene-diamine, N-phenyl-1,2-phenylene-diamine, N-phenyl-1,4-phenylenediamine, and N-(2-hydroxyethyl)-ethylenediamine.

6. A process for preparing a functionalized polyolefin, said process comprising the following steps:
   A) grafting onto the backbone of a polyolefin at least one compound comprising at least one amine-reactive group to form a grafted polyolefin at a temperature from 130° C. to 170° C.;
   B) reacting a alkanolamine with the grafted polyolefin; and
      wherein step B) takes place subsequent to step A) without the isolation of the grafted polyolefin in solid form, and
      wherein both steps A) and B) take place in a melt reaction, and wherein the level of alkanolamine is from 2 to 8 mole equivalent of amine to grafted anhydride; and
      wherein the polyolefin is selected from the group consisting of the following:
   high density polyethylene, low density polyethylene, linear low density polyethylene, homogeneously branched linear ethylene/alpha-olefin interpolymers, homogeneously branched substantially linear ethylene/alpha-olefin interpolymers, and combinations thereof and
   wherein step A takes place in an extruder, and step B takes place in a gear pump.

7. The process of claim 6, wherein the alkanolamine is selected from the group consisting of 2-aminoethanol, 2-amino-1-propanol, 3-amino-1-propanol, 2-amino-1-butanol, 2-(2-aminoethoxy)-ethanol and 2-aminobenzyl alcohol.

\* \* \* \* \*